US012673713B2

(12) United States Patent   (10) Patent No.:   US 12,673,713 B2

Dahlström et al.   (45) Date of Patent:   Jul. 7, 2026

(54) LEG FOLDING MECHANISM AND A PUSH CHAIR

(71) Applicant: JIJIBABA LIMITED, London (GB)

(72) Inventors: Björn Dahlström, London (GB); Richard Schlagman, London (GB)

(73) Assignee: JIJIBABA LIMITED, London (GB)

( * ) Notice: Subject to any disclaimer, the term of this patent is extended or adjusted under 35 U.S.C. 154(b) by 133 days.

(21) Appl. No.: 18/037,172

(22) PCT Filed: Nov. 16, 2021

(86) PCT No.: PCT/EP2021/081901

§ 371 (c)(1),
(2) Date: May 16, 2023

(87) PCT Pub. No.: WO2022/101517

PCT Pub. Date: May 19, 2022

(65) Prior Publication Data

US 2024/0101180 A1     Mar. 28, 2024

(30) Foreign Application Priority Data

Nov. 16, 2020   (GB) ..................................... 2018006

(51) Int. Cl.
B62B 7/08      (2006.01)
B62B 5/06      (2006.01)
B62B 7/06      (2006.01)

(52) U.S. Cl.
CPC ............... B62B 7/08 (2013.01); B62B 5/067 (2013.01); B62B 7/062 (2013.01); B62B 2205/06 (2013.01); B62B 2205/20 (2013.01)

(58) Field of Classification Search
CPC   B62B 7/08; B62B 5/067; B62B 7/062; B62B 2205/06; B62B 2205/20; B62B 2205/003; B62B 7/086; B62B 9/20; B62B 7/044; B62B 7/06; B62B 9/12; B62B 2205/18
See application file for complete search history.

(56) References Cited

U.S. PATENT DOCUMENTS 8,870,213 B1 *   10/2014   Xu .............................. B62B 7/08
                                                    280/647
9,193,373 B2 *   11/2015   Fjelland .................... B62B 7/10
(Continued)

FOREIGN PATENT DOCUMENTS

CA       2208115 A1      12/1998
CN   102205848 A  *  10/2011
(Continued)

*Primary Examiner* — James A Shriver, II
*Assistant Examiner* — Ian Bryce Shelton
(74) *Attorney, Agent, or Firm* — Dykema Gossett PLLC

(57)   ABSTRACT

There is provided a leg folding mechanism, such as a leg folding mechanism for a push chair, the leg folding mechanism comprising a core member having a longitudinal axis and, preferably, first and second axially spaced core guides; a first leg member rotatably mounted on the core member, preferably at the first core guide; a second leg member rotatably mounted on the core member, preferably at the second core guide a shuttle disposed within the core member and moveable within the core member to cause movement of the legs as the shuttle moves within the core.

26 Claims, 38 Drawing Sheets

(56) References Cited

U.S. PATENT DOCUMENTS

| | | | | | |
|---|---|---|---|---|---|
| 10,106,185 | B2 * | 10/2018 | Plested | ................... | B62B 7/068 |
| 10,926,825 | B2 * | 2/2021 | Neugebauer | ........... | B62B 9/005 |
| 11,027,763 | B2 * | 6/2021 | Liao | ........................ | B62B 7/062 |
| 11,577,132 | B2 * | 2/2023 | Payne | .................... | B62B 3/001 |
| 2006/0267303 | A1 * | 11/2006 | Golias | ...................... | B62B 3/02 |
| | | | | | 280/47.34 |
| 2009/0121455 | A1 * | 5/2009 | Kretschmer | ........... | B62B 7/062 |
| | | | | | 280/642 |
| 2013/0234418 | A1 * | 9/2013 | Reimers | ................... | B62B 3/02 |
| | | | | | 280/641 |
| 2014/0064829 | A1 * | 3/2014 | Li | .......................... | B62B 9/005 |
| | | | | | 403/81 |
| 2018/0043917 | A1 * | 2/2018 | Plested | .................. | B62B 7/062 |
| 2019/0111989 | A1 * | 4/2019 | Neugebauer | ........... | B62K 5/027 |
| 2020/0172142 | A1 * | 6/2020 | Young | .................... | B62B 7/142 |
| 2020/0283051 | A1 * | 9/2020 | Liao | ........................ | B62B 7/062 |
| 2021/0052957 | A1 * | 2/2021 | Payne | .................... | B62B 3/025 |
| 2022/0111882 | A1 * | 4/2022 | Dziak | .................... | B62B 7/062 |
| 2023/0347961 | A1 * | 11/2023 | Spour | ................... | B62B 5/0043 |

FOREIGN PATENT DOCUMENTS

| | | | | | | |
|---|---|---|---|---|---|---|
| CN | 107757688 | A | * | 3/2018 | ........... | B62B 27/062 |
| CN | 108995699 | A | * | 12/2018 | .............. | B62B 7/08 |
| CN | 109606451 | A | * | 4/2019 | ............. | B62B 7/062 |
| CN | 209351449 | U | * | 9/2019 | | |
| CN | 201822112274 | U | | 9/2019 | | |
| CN | 209776525 | U | * | 12/2019 | ............. | B62B 7/062 |
| DE | 202008013777 | U1 | * | 4/2009 | ............. | A47C 1/026 |
| DE | 202018104948 | U1 | * | 12/2018 | .............. | B62B 7/06 |
| EP | 1503095 | A1 | * | 5/2005 | ............ | B62B 7/062 |
| GB | 2430181 | A | | 3/2007 | | |
| WO | 1999050123 | A1 | | 10/1999 | | |
| WO | 2020058753 | A1 | | 3/2020 | | |
| WO | 2020058754 | A1 | | 3/2020 | | |

* cited by examiner

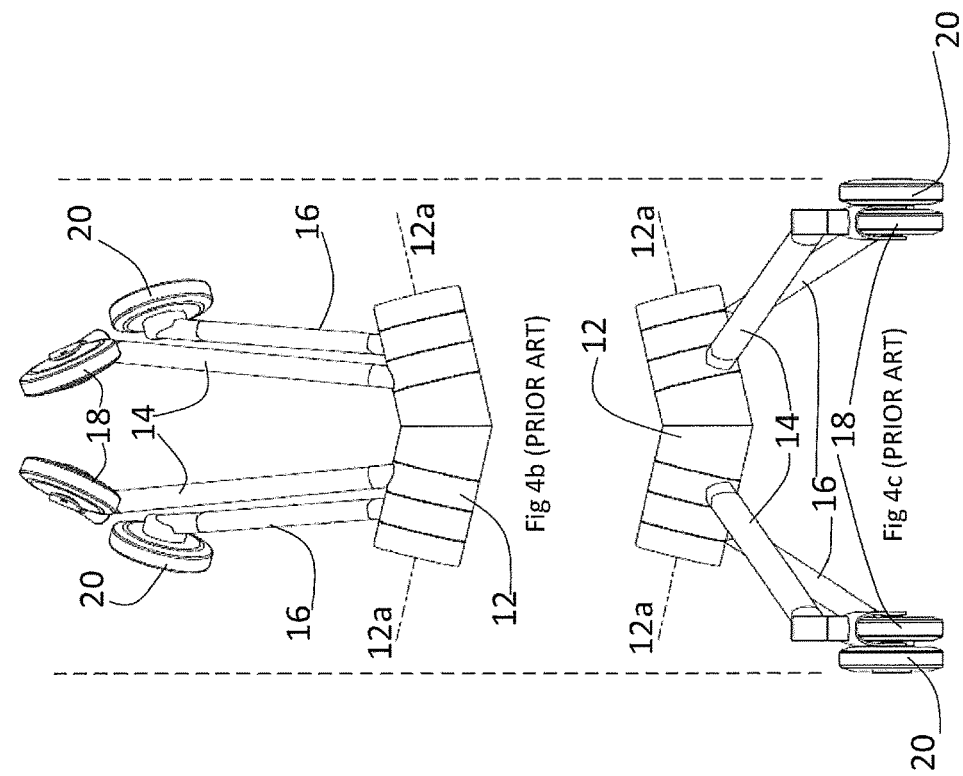
Fig 4b (PRIOR ART)
Fig 4c (PRIOR ART)
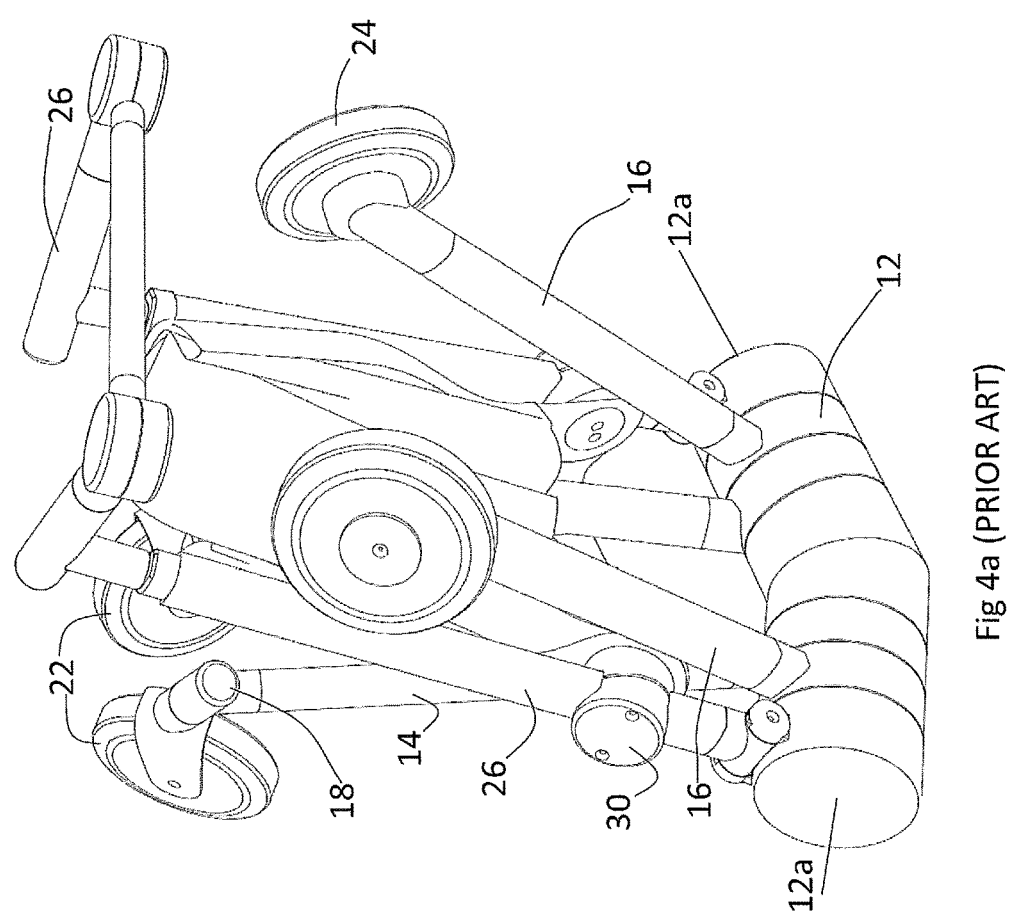
Fig 4a (PRIOR ART)

—300

RETRACTED RUBBERBAND ALT SPRING BALANCES OUT WEIGHT TO ASSIST MOTOR

STRECHED RUBBERBAND ALT SPRING

327

12

UPWARD FORCE FROM STRECHED RUBBERBAND ALT SPRING

DOWNWARD FORCE FROM WEIGHT OF LEG

326

324

350

348

342

346

RETRACTABLE
HANDLE

340

CONNECTION RODS

344

Current Design

S-shaped slot or recess in shuttle shuttle

Magnetic Design

Magnetic Strip

352 shuttle

Magnetic Connection

354

Leg

Slot

Leg Position 1

Leg Position 2

The motor rotates the shuttle to lift the legs. Each shuttle may need its own motor.

Magnetic Connection on leg end

Shuttle member rotates

Female and male connection point
(i.e. hook and catch)

Leg

Solid shuttle member

360

356

358

Flat Surface

Core Guide

Square Core

LEG FOLDING MECHANISM AND A PUSH CHAIR

CROSS-REFERENCE TO RELATED APPLICATION

This application is a national stage filing based upon International application No. PCT/EP2021/081901, filed 16 Nov. 2021, which claims the benefit of priority to Great Britain application No. 2018006.3, filed 16 Nov. 2020.

This invention relates to a leg folding mechanism for a push chair or the like and a push chair. In particular, but not exclusively, the invention relates to a motorised leg folding mechanism for such a push chair.

BACKGROUND

Push chairs are well known for transporting small children and modern push chairs can also be used and adapted for the carriage of babies. In this application, the term push chair is intended also to include what are also commonly referred to as strollers or buggies and is also intended to describe a system comprising a chassis to which can be added a seat or a removable cot or other enclosure suitable for the transport of a baby or a small child. Non-limiting examples of the types of assembly or seat that can typically be added to the chassis includes what are commonly referred to as midi-seats, carry cots, car seats, hammock seats. The term seat assembly as used herein can refer to any of these.

One of the desired features of a pushchair is that it can be folded to a compact dimension, so making it easier to carry and to stow in a car or other transport means, such as a bus, train or aircraft.

Many push chairs are known to fold and stow into smaller dimensions, most only fold into smaller sizes in one or two dimensions. Many examples can be found in the shops and in general use. WO2020/058753 and WO2020/058754, both filed by the current Applicant, describe foldable push chairs that overcome disadvantages of prior designs, such as those involving pivoted linkage mechanisms, by having wheel-supporting legs that are coupled together and rotate in opposite directions around a central body assembly during a folding or unfolding operation. The central body assembly and the legs are configured so that the legs extend forwardly and rearwardly for the wheels to engage the ground when in an unfolded, open state, and such that when actuated to rotate to a folded state the respective wheels are drawn upwardly, in said opposite directions, to a more compact, narrower arrangement. In order to ensure the push chair folds neatly and consistently, the forwardly extending legs and rearwardly extending legs are connected together by gearing means that ensure they rotate in synchronism.

It is known for push chairs, or other similar foldable wheeled devices such as wheelchairs, to incorporate one or more motors for providing propulsive drive to assist in moving the device across the ground. Such motors may be incorporated directly into wheels, such as within a wheel hub to provide a direct-drive wheel, or may be located remotely from the wheels with drive forces being transmitted thereto via a drive train.

It is also known to incorporate motors to assist in folding or unfolding push chairs. One example is described in CN102205848A, which uses a rack and pinion mechanism to fold a forward-extending set of legs towards a rearward-extending set of legs. Another example is described in CN201822112274U, which describes a folding push chair that incorporates a motor to rotate a seat assembly relative to a leg assembly, in which forward-extending legs are brought towards rearward-extending legs via a pivot linkage.

However, such motorised folding mechanisms are typically heavy, cumbersome and may require complex linkages. Moreover, they typically only provide a basic motorised hinged fold that itself only reduces the push chair size in one dimension when in the folded state.

It is an object of the present invention to overcome at least some of the disadvantages of the known prior art by providing a simple, robust leg folding mechanism that can easily be modified to incorporate motorised actuation.

BRIEF SUMMARY OF THE DISCLOSURE

According to a first aspect of the present invention, there is provided a leg folding mechanism for a push chair, the leg folding mechanism having a core member having a longitudinal axis and first and second axially spaced core guides, such as slots; a first rotatable hub for connection to a first leg member and rotatably mounted on the core member at the first core guide; a second rotatable hub for connection to a second leg member and rotatably mounted on the core member at the second core guide; a shuttle disposed within the core member and axially translatable relative thereto; wherein a first engagement portion from one or other of an internal surface of the first hub and an external surface of the shuttle engages with the first core guide to matingly engage with a corresponding first surface, such as a substantially helical surface on the other of the internal surface of the first hub and the external surface of the shuttle, and a second engagement portion from one or other of an internal surface of the second hub and an external surface of the shuttle engages with the second core guide to matingly engage with a corresponding second surface, such as a substantially helical surface on the other of the internal surface of the second hub and the external surface of the shuttle, such that in response to axial translation of the shuttle the first and second hubs are caused to rotate. The first and second surfaces are preferably helical which enables a simple and robust manner to cause rotational movement of the hubs in response to movement of the shuttle that includes an axial component, i.e. axial movement.

A leg folding mechanism is provided core guides are provided on or as part of a core and are arranged to guide, control or restrain the movement of hubs or legs around the core such that, say, axial movement of an associated shuttle within the core can cause rotation of the hubs or legs around the core member. It is preferred that the core guides are provided in the form of slots that pass through the core and thereby provide a convenient path for the hub to engage with the shuttle moving within the core. However, it is not necessary that the guides are slots within the core. The guides could for example be recessed grooves, ridges or other such features to constrain or control the movement of the hubs as the shuttle moves.

In an embodiment, the leg folding mechanism comprises an actuator configured to urge the shuttle to translate within the core member.

In an embodiment, the shuttle is arranged to move relative to the core having an axial component of movement.

In an embodiment, the shuttle is disposed within the core member and is longitudinally axially translatable but rotationally fixed relative thereto.

In an embodiment, the shuttle includes at least one longitudinal rib on an exterior surface thereof and the core member includes at least one corresponding longitudinal groove in an internal surface thereof to allow axial translation of the shuttle.

In an embodiment, the first and second substantially helical surfaces are on the shuttle and comprise respective first and second slots in the exterior surface thereof, and the corresponding matingly engaging internal surfaces of the hubs comprise respective first and second pegs.

In an embodiment, the first and second pegs are each stepped, having a relatively wide root portion proximal to the inner surface of the associated hub and a relatively narrow tip portion distal to the inner surface of said hub, whereby the root portions each engage sides of the respective core slots to prevent axial movement of said hubs on the core member, and whereby the tip portions engage sides of the respective helical slots to cause said rotations of the hubs. In another example the pegs have a constant radius along their entire length. As explained above, in the example in which pegs are used that are shaped and sized to engage with the shuttle it is preferred that the core guides are provides as core slots that pass through the core. However other core guides can be used as long as they enable the interaction of the engagement portion on the hubs or legs with a corresponding portion on the shuttle.

In an embodiment, the first and second substantially helical slots are oriented oppositely, whereby axial translation of the shuttle causes the first hub to rotate in an opposite direction to the second hub.

In an embodiment, the first and second substantially helical slots include at least one straight end portion, parallel to the longitudinal axis.

In an embodiment, the first and second substantially helical slots each comprise an S-shaped curve between end portions thereof.

In an embodiment, the core member is substantially tubular and the first and second core slots are circumferential slots, which are preferably rotationally offset from one another.

In an embodiment, the leg folding mechanism further comprises an end cap removably attached to an end of the core member.

In an embodiment, the shuttle is substantially tubular.

In an embodiment, the actuator comprises a drive shaft at least partially housed within the shuttle and the core member and engaged with an internal portion of the shuttle, whereby rotation of the drive shaft is converted into axial translation of the shuttle within the core member.

In an embodiment, the drive shaft is the drive shaft of a motor fixedly connected to the core member.

In an embodiment, the motor is fixedly connected to the endcap.

In an embodiment, the drive shaft comprises a worm wheel and the associated internal portion of the shuttle comprises an axially oriented matingly threaded aperture.

In an embodiment, the leg folding mechanism, further comprises:
  a third axially spaced core slot extending through a surface of the core member in a plane perpendicular to the longitudinal axis;
  a third hub for connection to a third leg member and rotatably mounted on the core member at the third core slot; and
  a third projection from one or other of an internal surface of the third hub and an external surface of the shuttle, which passes through the third core slot to matingly engage with a corresponding third substantially helical surface on the other of the internal surface of the third hub and the external surface of the shuttle, such that the axial translation of the shuttle as the actuator is operated is also converted into rotation of the third hub member.

In an embodiment, any or all of the engagement portions are magnetic.

In an embodiment, any or all of the engagement portions comprise a cam and a cam follower.

In an embodiment, an S-shaped rib is provided on the shuttle and the cam follower is provided on the internal surface of each hub, the cam followers arranged to be follow the rib on the shuttle as it translates.

In an embodiment, the shuttle is arranged to move in straight linear axial direction relative to the core.

According to a second aspect of the present invention, there is provided a folding push chair comprising: a subframe; a handle assembly connected to the subframe for manoeuvring the push chair; and a seat assembly connected to the subframe; wherein the subframe comprises a leg folding mechanism according to the first aspect of the present invention and/or any of the embodiments.

In an embodiment, the folding push chair has three or more hubs.

In an embodiment, the folding push chair has a first leg having a proximal end connected to the first hub and having a first wheel assembly mounted at a distal end;
  a second leg having a proximal end connected to the second hub and having a second wheel assembly mounted at a distal end; and a third leg having a proximal end connected to a third hub and having a third wheel assembly mounted at a distal end;
  wherein the second hub is disposed centrally between the first and third hubs, and wherein the second leg extends forwardly away from the handle assembly and the first and third legs extend rearwardly beneath the chair assembly when in the open configuration, or vice versa, for the respective wheel assemblies to engage the ground; wherein upon operation of an actuator in a first direction the leg folding mechanism is urged to rotate the legs from the open configuration to a folded configuration upwardly away from the ground towards the seat assembly.

In an embodiment, operation of the actuator in a second direction, opposite to the first, the leg folding mechanism is urged to rotate the legs from the folded configuration to the open configuration downwardly away from the seat assembly towards the ground.

In an embodiment, the seat assembly is collapsible and wherein the first and third legs rotate in a first direction whilst the second leg rotates in an opposite direction, whereby when in the folded configuration the seat assembly is disposed in a collapsed condition between the first and third legs on a rearward side and the second leg on the forward side.

According to a third aspect of the present invention, there is provided a folding push chair comprising: a subframe; a handle assembly connected to the subframe for manoeuvring the push chair; and a seat assembly connected to the subframe; wherein the subframe comprises: a first leg folding mechanism according to the first aspect of the present invention and/or any of the embodiments; a first leg having a proximal end connected to the first hub and having a first wheel assembly mounted at a distal end; a second leg having a proximal end connected to the second hub and having a second wheel assembly mounted at a distal end; a second leg folding mechanism according to the first aspect of the present invention and/or any of the embodiments; a third leg having a proximal end connected to the first hub of the second leg folding mechanism and having a third wheel assembly mounted at a distal end; a fourth leg having a proximal end connected to the second hub of the second leg folding mechanism and having a fourth wheel assembly mounted at a distal end; wherein the second and third legs extend forwardly away from the handle assembly and the first and fourth legs extend rearwardly beneath the chair assembly when in the open configuration for the respective wheel assemblies to engage the ground; wherein upon operation of an actuator in a first direction the leg folding mechanism urges rotation of the legs from the open configuration to a folded configuration upwardly away from the ground towards the seat assembly.

In an embodiment, operation of the actuator in a second direction, opposite to the first, urges the leg folding mechanism to rotate the legs from the folded configuration to the open configuration downwardly away from the seat assembly towards the ground.

In an embodiment, the seat assembly is collapsible and wherein the first and fourth legs rotate in a first direction whilst the second and third legs rotate in an opposite direction, whereby when in the folded configuration the seat assembly is disposed in a collapsed condition between the first and fourth legs on a rearward side and the second and third legs on the forward side.

In an embodiment, the first and second leg folding mechanisms are arranged symmetrically.

In an embodiment, the core members of the respective first and second leg folding mechanisms are interconnected at a centre of the subframe.

In an embodiment, the axes of the first and second core members are co-axially arranged.

In an embodiment, the first and second leg folding mechanisms are disposed in a V-shaped arrangement.

According to a fourth aspect of the present invention, there is provided a handle assembly for a moveable item such as a push chair comprising a subframe and a seat assembly, the handle assembly being for connection to the subframe or the seat assembly, the handle assembly comprising: first and second arms for connection to the subframe or seat assembly, and a handle crossbar assembly coupled to the first and second arms, wherein the handle crossbar mechanism has a first section which when presented to a user is a first height with respect to the seat assembly and a second section which when presented to a user is at a second different height with respect to the seat assembly.

In an embodiment, the handle crossbar assembly is has a step defining a different height for the first and second sections.

In an embodiment, the turreted crossbar assembly has a central section at a first height and side sections at a second different height with respect to the seat assembly.

In an embodiment, the first and second arms for connection to the subframe or seat assembly are extendable arms.

In an embodiment, the first and second arms are telescopically arranged to be extendable.

In an embodiment, the first and second arms are pivotally mounted to the subframe or the seat assembly.

In an embodiment, the handle crossbar assembly is rotatably coupled to the first and second arms at distal ends of the arms such that as a unit the handle crossbar assembly can be pivoted with respect to the first and second arms.

In an embodiment, the handle crossbar assembly is able to be pivoted from a first position relative to the first and second arms and a second position relative to the first and second arms and to be lockable in each of the first and second positions.

In an embodiment, the handle crossbar assembly has at least three sections, the step providing a central section pivotally connected to side sections.

In an embodiment, the step is central and the side sections define lower steps, such that when in use the central step provides an engagement region for one-handed control of the push chair by a user.

In an embodiment, pivoted connections are provided in transition regions between the central step and the side steps.

According to a fifth aspect of the present invention, there is provided a leg folding mechanism for a push chair, the leg folding mechanism comprising central chassis extending generally perpendicular to a forward direction of travel of the push chair, the central chassis having controllable legs to rotate around the chassis; an actuator for driving rotation of the legs around the chassis to move from a folded to unfolded position or vice versa; a housing coupled to the chassis and containing the actuator and being arranged to drive the rotation of the legs between a folded and unfolded position or vice versa.

In an embodiment, the housing is arranged coupled to the housing and extends vertically upwards from the chassis extending generally perpendicular to a forward direction of travel.

In an embodiment, the housing is generally elongate and has a cross section that is circular, elliptical or polygonal.

In an embodiment, the housing is arranged centrally with respect to the central chassis.

In an embodiment, the housing contains a motor having an output shaft and a gear connected to the output shaft arranged to engage gears in the central chassis to drive the rotation of the legs between a folded and unfolded position or vice versa.

In an embodiment, the leg folding mechanism further comprises the features of any or all of the leg folding mechanism of the first aspect of the present invention and/or any embodiments.

In an embodiment, the leg folding mechanism further comprises a core member having a longitudinal axis and first and second axially spaced circumferential core slots; a first rotatable hub for connection to a first leg member and rotatably mounted on the core member at the first core slot; a second rotatable hub for connection to a second leg member and rotatably mounted on the core member at the second core slot; a shuttle disposed within the core member and axially translatable relative thereto; wherein a first engagement portion from one or other of an internal surface of the first hub and an external surface of the shuttle passes through the first core slot to matingly engage with a corresponding first substantially helical surface on the other of the internal surface of the first hub and the external surface of the shuttle, and a second engagement portion from one or other of an internal surface of the second hub and an external surface of the shuttle passes through the second core slot to matingly engage with a corresponding second substantially helical surface on the other of the internal surface of the second hub and the external surface of the shuttle, such that in response to axial translation of the shuttle the first and second hubs are caused to rotate, wherein the actuator and arranged to drive the movement of the shuttle.

According to a further aspect of the present invention, there is provided a leg folding mechanism for a push chair, the mechanism comprising: a central body portion; a plurality of legs connected to the central body portion, each leg being rotatable about the central body portion; a plurality of motors each controllable to cause one or more of the legs to rotate relative to the central body portion to control the folding or unfolding of the one or more legs.

In an embodiment, a dedicated motor is provided for each of the legs, the dedicated motor being controllable to cause the folding or unfolding of the leg to which it is connected.

In an embodiment, a central control unit is coupled to each of the motors and arranged to provide control signals to a respective motor to control the folding and unfolding of a connected leg.

In an embodiment, the leg folding mechanism, comprises at least three legs wherein at least one of the legs is arranged to rotate around the central body portion in a direction opposite form the other leg or legs.

In an embodiment, each of the legs is mounted to a hub arranged to rotate around the central body portion.

In an embodiment, the central body portion is generally V-shaped.

According to a further aspect of the present invention, there is provided a leg folding mechanism for a push chair, the leg folding mechanism comprising a core member having a longitudinal axis and, preferably, first and second axially spaced core guides; a first leg member rotatably mounted on the core member, preferably at the first core guide; a second leg member rotatably mounted on the core member, preferably at the second core guide; a shuttle disposed within the core member and moveable within the core member to cause movement of the legs as the shuttle moves within the core.

A leg folding mechanism is provided that can be used for a push chair or any other suitable device. The leg folding mechanism is well suited for use in a system in which legs are arranged to rotate in opposite directions around the core member. This can be achieved, as described below, by provision of a shuttle that is configured to interact with the legs or hubs in a desired way as it moves within the core. For example, in one example slots or engagement regions can be provided on the shuttle which are shaped, sized or configured to engage with corresponding engagement regions on a leg or a hub.

In an embodiment, the shuttle is at least partly axially translatable within the core, and arranged such that upon axial movement of the shuttle, the legs are caused to rotate around the core.

In an embodiment, the leg folding mechanism includes first and second hubs arranged on the core to which the legs are connected and movement of the shuttle causes movement of the hubs, thereby causing rotation of the legs around the core.

In an embodiment, the shuttle has an engagement portion to engage with a corresponding portion on a leg or hub such that upon movement of the shuttle the legs or hubs are caused to rotate around the core.

In an embodiment, the engagement portion on the shuttle comprises one or more of a slot, a ridge, a cam or a magnetic strip and a corresponding engagement region is provided on the hub or leg so as to be driven by the shuttle upon movement of the shuttle. The movement of the shuttle within the core can be driven by one or more motors and can be axial and/or rotational or a combination of the two.

In an embodiment, the central body portion is generally V-shaped.

As described herein, detailed embodiments are disclosed in which hubs are rotatably mounted on the core and engagement between the hubs and the core are arranged so as to cause rotation of the hubs (and connected legs) as the shuttle moves within the core. The details of the various embodiments described herein can be used to provide a leg folding mechanism in accordance with this aspect of the present invention, i.e. a leg folding mechanism for a push chair, the leg folding mechanism comprising a core member having a longitudinal axis and first and second axially spaced core guides; a first leg member rotatably mounted on the core member at the first core guide; a second leg member rotatably mounted on the core member at the second core guide; a shuttle disposed within the core member and moveable within the core member to cause movement of the legs as the shuttle moves within the core.

In accordance with a further aspect of the present invention, there is provided a leg folding mechanism for a push chair, comprising:

a substantially hollow core member having a longitudinal axis and first and second axially spaced slots extending through a surface thereof in a plane perpendicular to the longitudinal axis; a first hub for connection to a first leg member and rotatably mounted on the core member at the first core slot; a second hub for connection to a second leg member and rotatably mounted on the core member at the second core slot, wherein the second hub is rotatable relative to the first hub; a shuttle disposed within the core member and axially translatable but rotationally fixed relative thereto; an actuator configured to urge the shuttle to translate axially within the core member; wherein a first projection from one or other of an internal surface of the first hub and an external surface of the shuttle passes through the first core slot to matingly engage with a corresponding first substantially helical surface on the other of the internal surface of the first hub and the external surface of the shuttle, and a second projection from one or other of an internal surface of the second hub and an external surface of the shuttle passes through the second core slot to matingly engage with a corresponding second substantially helical surface on the other of the internal surface of the second hub and the external surface of the shuttle, such that the axial translation of the shuttle as the actuator is operated is converted into rotations of the first and second hubs.

The mechanism provides a neat, compact and robust way to control the folding of a set of legs relative to one another. The respective legs rotate about a common axis. The mechanism can be made small and light-weight, for incorporation into a folding push chair or the like, which is particularly advantageous in terms of manoeuvrability and the ability to collapse into small dimensions.

The shuttle may include at least one longitudinal rib on an exterior surface thereof and the core member may include at least one corresponding longitudinal groove in an internal surface thereof to rotationally fix the shuttle with respect to the core but to allow the axial translation. This is a simple and convenient way to fix the shuttle rotationally yet to allow axial translation as required for the fold operation. It is easy to manufacture and service.

According to certain embodiments, the first and second substantially helical surfaces are on the shuttle and comprise respective first and second slots in the exterior surface thereof, and the corresponding matingly engaging internal surfaces of the hub members comprise respective first and second pegs. The first and second pegs may each be stepped, having a relatively wide root portion proximal to the inner surface of the associated hub and a relatively narrow tip portion distal to the inner surface of said hub, whereby the root portions each engage sides of the respective core slots to prevent axial movement of said hubs on the core member, and whereby the tip portions engage sides of the respective helical slots to cause said rotations of the hubs.

This arrangement provides a particularly strong and easy to manufacture mechanism. In particular where the shuttle has a tubular form, it is straightforward to form the required helical slots through its outer wall and the mating pegs can easily be incorporated in to the hubs. In certain embodiments, the slots may be in the form of grooves cut from the outer surface of the shuttle, i.e. not passing all the way through the outer wall.

According to other embodiments, the first and second substantially helical surfaces may instead comprise respective first and second ridges on the exterior surface of the shuttle, and the corresponding matingly engaging internal surfaces of the hub members comprise respective first and second followers.

According to yet other embodiments, the first and second substantially helical surfaces are on the inner surfaces of the respective hubs and the associated first and second projections are on the external surface of the shuttle.

Embodiments where the helical surfaces are formed on the shuttle may be preferred because the axial width of the hubs can be kept to a minimum where the inner surfaces thereof do not have to accommodate the helical surfaces and the profile of the helical surfaces can be optimised on the shuttle to provide optimum smooth conversion of the axial motion into the rotations of the hubs.

The first and second substantially helical surfaces may be oriented oppositely, whereby axial translation of the shuttle causes the first hub to rotate in an opposite direction to the second hub.

The first and second substantially helical slots may include at least one straight end portion, parallel to the longitudinal axis. As such, when the corresponding projection is received in the straight end portion, rotation of the associated hub relative to the shuttle and, by extension, the core member, is prevented. The hub is therefore locked in position. Either or both ends of the substantially helical slots may include such a straight end portion, thereby locking the hubs in either or both of an open or a closed configuration.

The first and second substantially helical slots may each comprise an S-shaped curve between end portions thereof. The purpose of the curve is to provide a smooth operation; balancing the amount of force required to rotate the hubs by a given amount.

The core member may be substantially tubular—i.e. having a cylindrical outer surface, to provide an easy to manufacture part that can readily accommodate the rotatable mounting of the associated first and second hubs thereabout. The hubs and core member may thus have a close interengagement with no voids and thus no risk of trapping articles between them. The first and second core slots may thus comprise circumferential slots, which may preferably be rotationally offset from one another.

The leg folding mechanism may further comprise an end cap removably attached to an end of the core member. The end cap may form a protective and/or decorative function and in particular may seal the interior of the core member to mitigate ingress of dirt and moisture. The end cap may also have a structural function, providing additional strength and/or rigidity to the assembly and forming a mounting point for components thereof.

Preferably, the shuttle is substantially tubular. As such, the shuttle may have a hollow interior that can be used to house components of the mechanism.

According to certain embodiments, the actuator comprises a drive shaft at least partially housed within the shuttle and the core member and engaged with an internal portion of the shuttle, whereby rotation of the drive shaft is converted into axial translation of the shuttle within the core member. Such an arrangement provides a compact and convenient mechanism for actuating the shuttle ergo the rotations of the hubs. Also, the core member and the shuttle may act as an effective housing for the actuator, thereby protecting it from possible knocks and damage.

The drive shaft may be the drive shaft of a motor fixedly connected to the core member. As such, the actuation may be motorised. The motor may be partly or fully housed within the core and shuttles, protected from the outside environment. Benefits of the mechanism are particularly apparent where applied in conjunction with a motorised actuation because the motor and associated drive train can be safely and neatly housed within the mechanism itself.

Where the mechanism includes an end cap, the motor may be fixedly connected to the end cap. This provides a convenient way to secure the motor to the core member. The end cap may, in some embodiments, be removable to provide access to the interior of the core member for servicing of the mechanism.

The drive shaft may comprise a worm wheel with the associated internal portion of the shuttle comprising an axially oriented matingly threaded aperture. This provides a robust and reliable arrangement for actuation of the mechanism.

It will be appreciated that the actuation of the drive shaft may instead be manual, for example by turning a crank or by some other mechanical arrangement that converts one type of manually actuated movement into rotation of the drive shaft, such as folding of a handle portion of the push chair being converted by pivots and levers, which may be incorporated in to the structure of the push chair.

Another possible means for actuation may comprise a piston, such as a hydraulic or gas-powered piston, or a cable or lever, or a longitudinal spring to urge the shuttle to translate axially.

According to some embodiments, the leg folding mechanism further comprises:

a third axially spaced core slot extending through a surface of the core member in a plane perpendicular to the longitudinal axis;

a third hub for connection to a third leg member and rotatably mounted on the core member at the third core slot; and a third projection from one or other of an internal surface of the third hub and an external surface of the shuttle, which passes through the third core slot to matingly engage with a corresponding third substantially helical surface on the other of the internal surface of the third hub and the external surface of the shuttle, such that the axial translation of the shuttle as the actuator is operated is also converted into rotation of the third hub member.

According to a further aspect of the invention, there is provided a folding push chair comprising:

a subframe;

a handle assembly connected to the subframe for manoeuvring the push chair when in an open configuration; and a seat assembly connected to the subframe;

wherein the subframe comprises:

a leg folding mechanism as defined in the preceding paragraph;

a first leg having a proximal end connected to the first hub
member and having a first wheel assembly mounted at
a distal end;

a second leg having a proximal end connected to the
second hub member and having a second wheel assem-
bly mounted at a distal end; and a third leg having a
proximal end connected to the third hub member and
having a third wheel assembly mounted at a distal end;

wherein the second hub is disposed centrally between the
first and third hubs, and wherein the second leg extends
forwardly away from the handle assembly and the first
and third legs extend rearwardly beneath the chair
assembly when in the open configuration for the
respective wheel assemblies to engage the ground; and wherein operation of the actuator in a first direction urges
the leg folding mechanism to rotate the legs from the
open configuration to a folded configuration upwardly
away from the ground towards the seat assembly.

In certain embodiments, the central second leg may
instead extend rearwardly in the open configuration, with the
first and third legs extending forwardly.

Furthermore, operation of the actuator in a second direc-
tion, opposite to the first, may urge the leg folding mecha-
nism to rotate the legs from the folded configuration to the
open configuration downwardly away from the seat assem-
bly towards the ground.

The seat assembly may be collapsible and the first and
third legs may rotate in a first direction whilst the second leg
rotates in an opposite direction, whereby when in the folded
configuration the seat assembly is disposed in a collapsed
condition between the first and third legs on a rearward side
and the second leg on the forward side.

A push chair according to the second aspect may be
beneficial in providing a popular three-wheeled form and in
which folding of all three legs is enabled via a single
compact, light-weight and robust mechanism, all three legs
rotating about a common axis.

According to a further aspect of the invention, there is
provided a folding push chair comprising:

a subframe;

a handle assembly connected to the subframe for manoeu-
vring the push chair when in an open configuration; and a seat assembly connected to the subframe;

wherein the subframe comprises:

a first leg folding mechanism according to the first aspect
defined above;

a first leg having a proximal end connected to the first hub
and having a first wheel assembly mounted at a distal
end;

a second leg having a proximal end connected to the
second hub and having a second wheel assembly
mounted at a distal end;

a second leg folding mechanism according to the first
aspect defined above;

a third leg having a proximal end connected to the first
hub of the second leg folding mechanism and having a
third wheel assembly mounted at a distal end;

a fourth leg having a proximal end connected to the
second hub of the second leg folding mechanism and
having a fourth wheel assembly mounted at a distal
end;

wherein the second and third legs extend forwardly away
from the handle assembly and the first and fourth legs
extend rearwardly beneath the chair assembly when in
the open configuration for the respective wheel assem-
blies to engage the ground;

wherein operation of the actuator in a first direction urges
the leg folding mechanism to rotate the legs from the
open configuration to a folded configuration upwardly
away from the ground towards the seat assembly.

The second and third legs may be inboard of the first and
fourth legs or vice versa.

Furthermore, operation of the actuator in a second direc-
tion, opposite to the first, may urge the leg folding mecha-
nism to rotate the legs from the folded configuration to the
open configuration downwardly away from the seat assem-
bly towards the ground.

The seat assembly may be collapsible and the first and
fourth legs may rotate in a first direction whilst the second
and third legs rotate in an opposite direction, whereby when
in the folded configuration the seat assembly is disposed in
a collapsed condition between the first and fourth legs on a
rearward side and the second and third legs on the forward
side.

The first and second leg folding mechanisms may be
arranged symmetrically.

The core members of the respective first and second leg
folding mechanisms may be interconnected centrally of the
subframe.

The third aspect thus provides a four-wheeled form of
push chair, having respective pairs of legs which are each
foldable relative to one another via separate mechanisms
typically symmetrically arranged on either side of the push
chair.

According to some embodiments, the axes of the first and
second core members are co-axially arranged.

According to other embodiments, the first and second leg
folding mechanisms are disposed in a V-shaped arrange-
ment. One advantage of such an arrangement is that it
provides for a more compact fold for a given width of
wheelbase. To provide a sufficiently stable push chair when
in the open configuration, the wheels must be spaced by a
certain transverse distance. With a co-axial arrangement of
the first and second leg folding mechanisms, the wheels
would remain at that set transverse distance when the leg
folding mechanisms are actuated to rotate the legs to the
folded configuration. However, the V-shaped arrangement
provides for the wheels to be drawn inwardly as the legs are
rotated to the folded configuration.

BRIEF DESCRIPTION OF THE DRAWINGS

Embodiments of the invention are described hereinafter
with reference to the accompanying drawings, in which:

FIG. 4a shows a perspective view of the known push chair
of FIG. 1 in a folded state; FIG. 4b shows a plan view of the
folded chassis; and FIG. 4c shows a front view of the chassis
in the unfolded state;

FIGS. 1*a* to 8*b* are included to provide context to the present invention. The leg folding mechanism of the present invention may be applied to many different forms of push chair and other devices, as set out below. For convenience, embodiments of the invention are described as applied to a push chair of the general type disclosed in the Applicant's own prior art WO2020/058753 and WO2020/058754, the entire contents of which are also incorporated herein in their entirety.

Figure 9A:
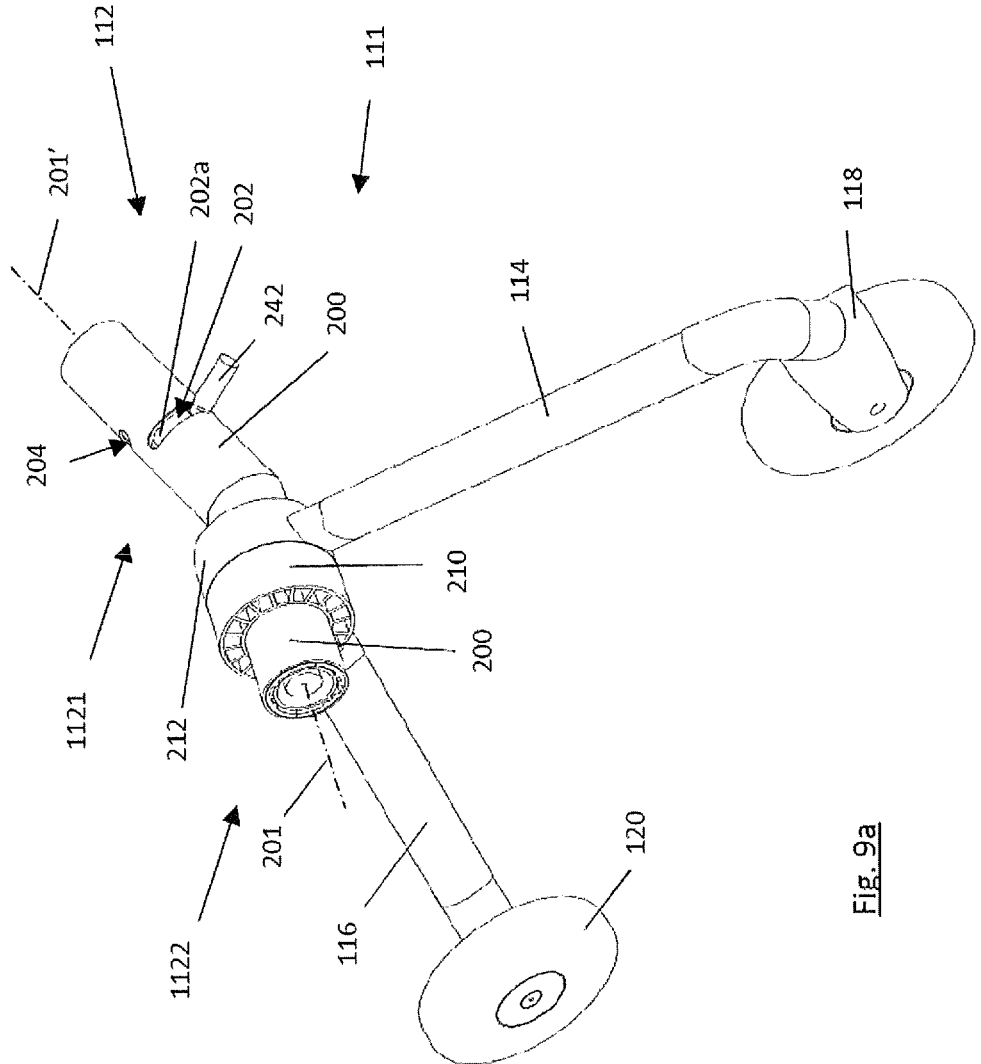
Figure 9B:
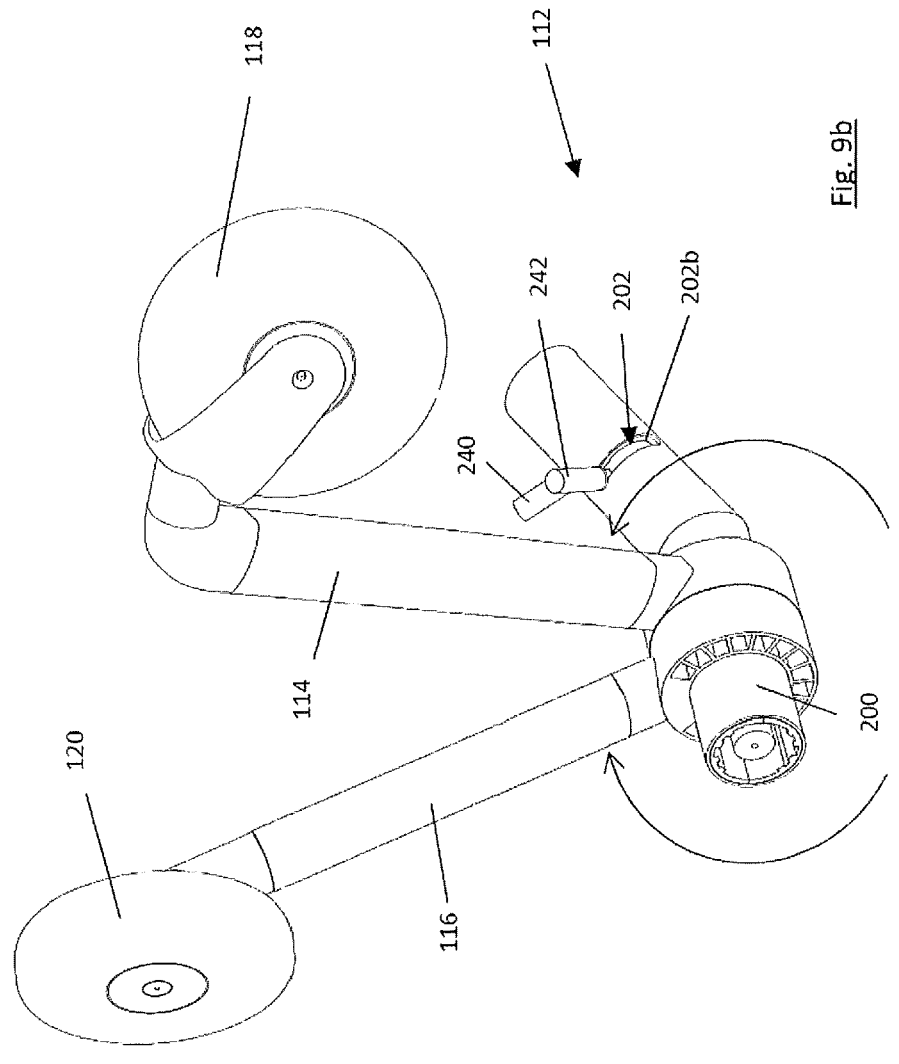
Figure 10:
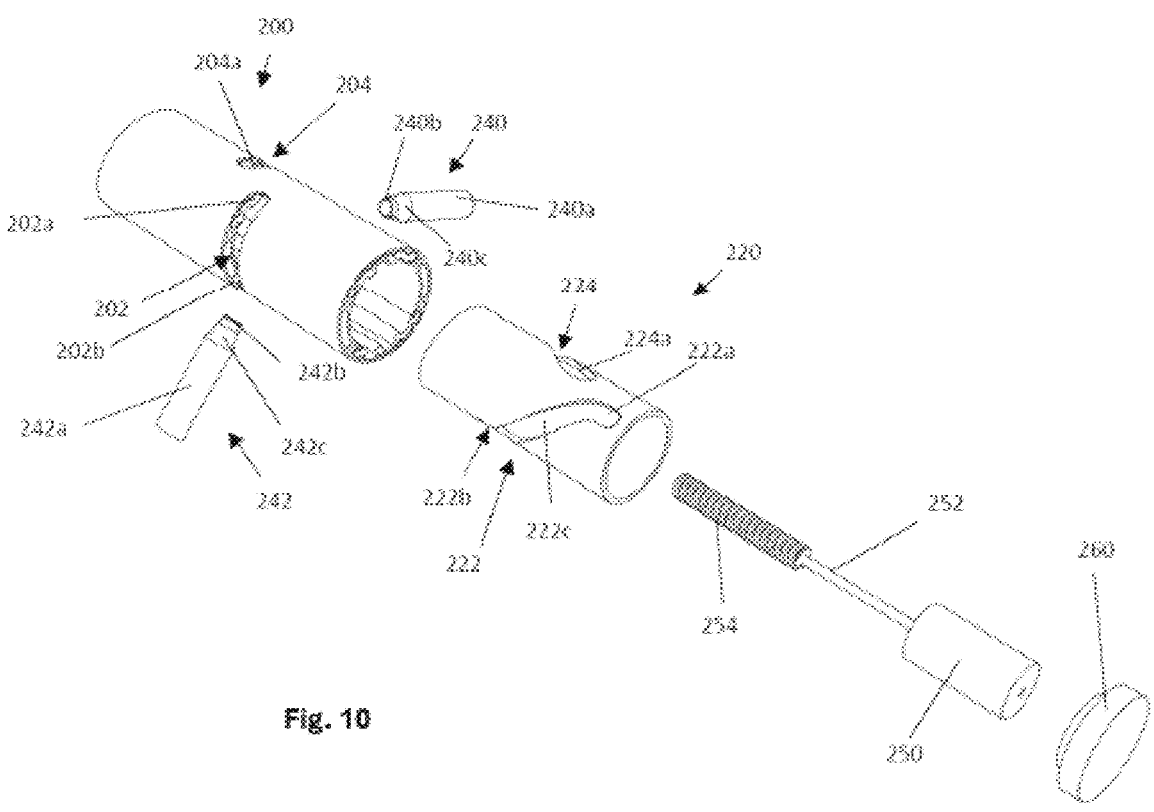
Figure 11:
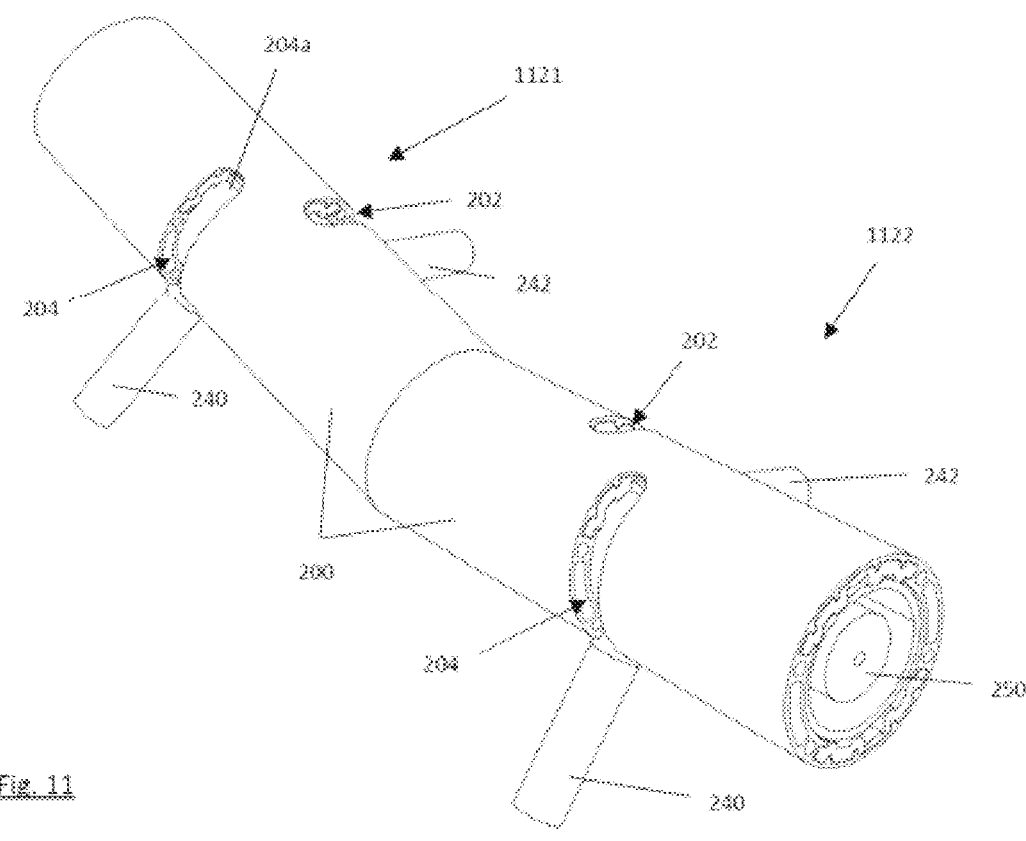
Figures 12A, 12B:
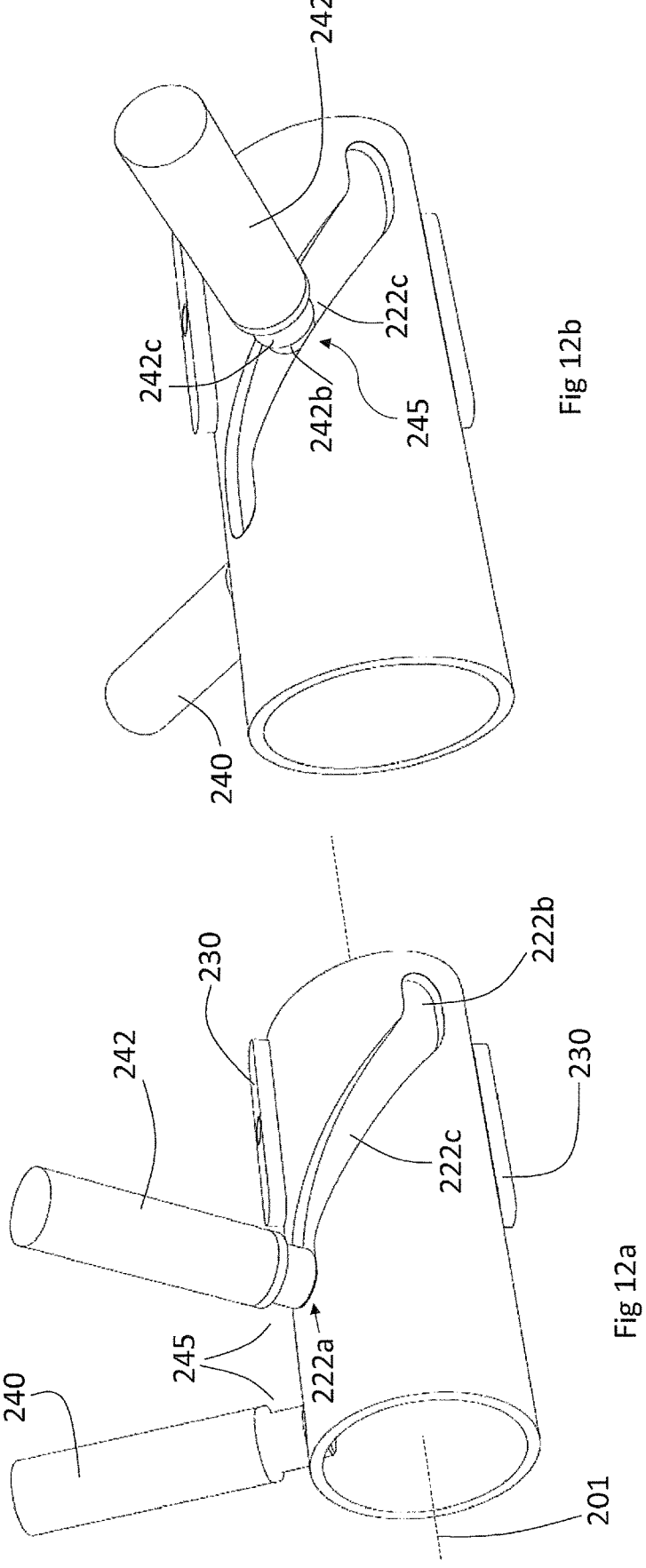
Figure 12C:
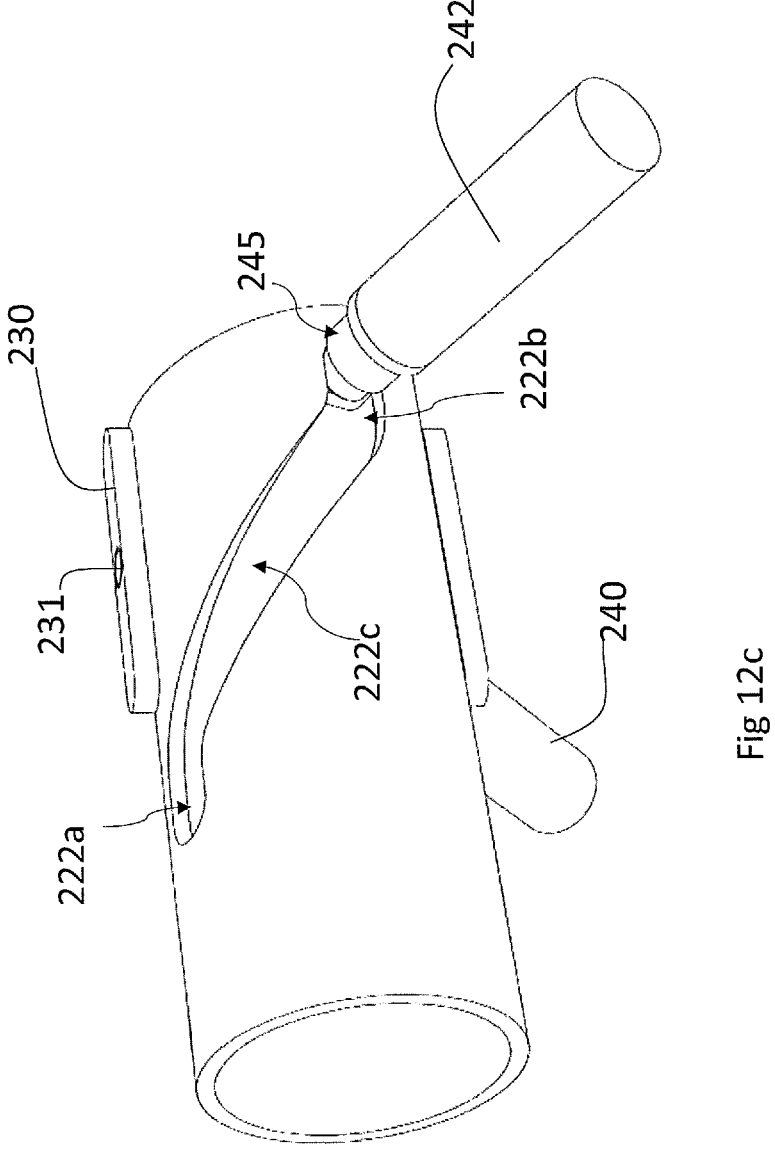
Figures 13A, 13B:
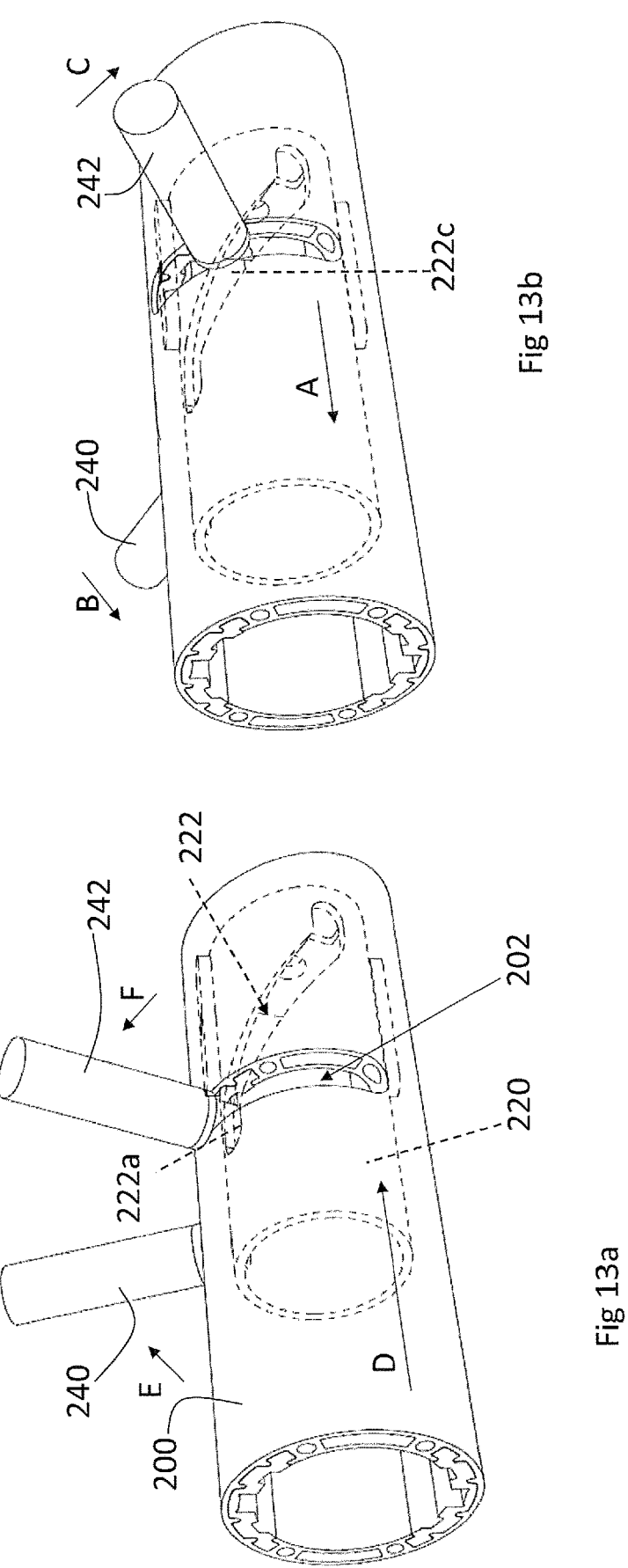
Figure 13C:
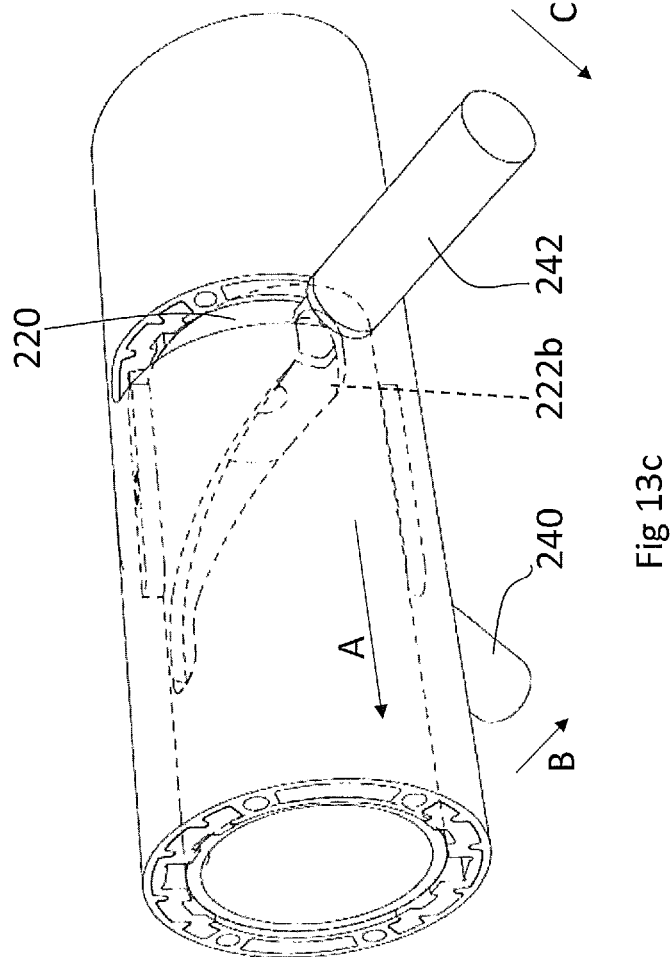
Figure 14:
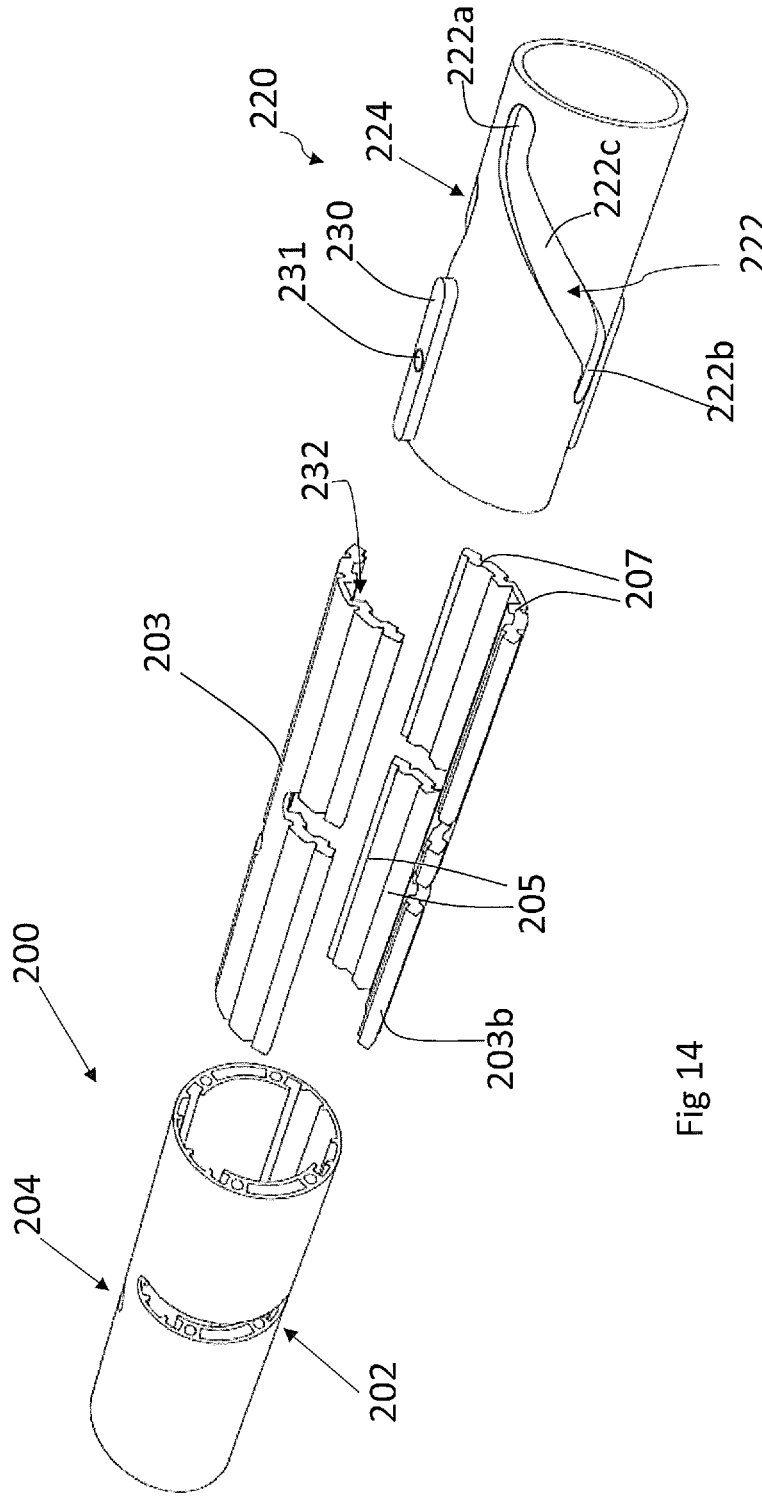
Figure 15:
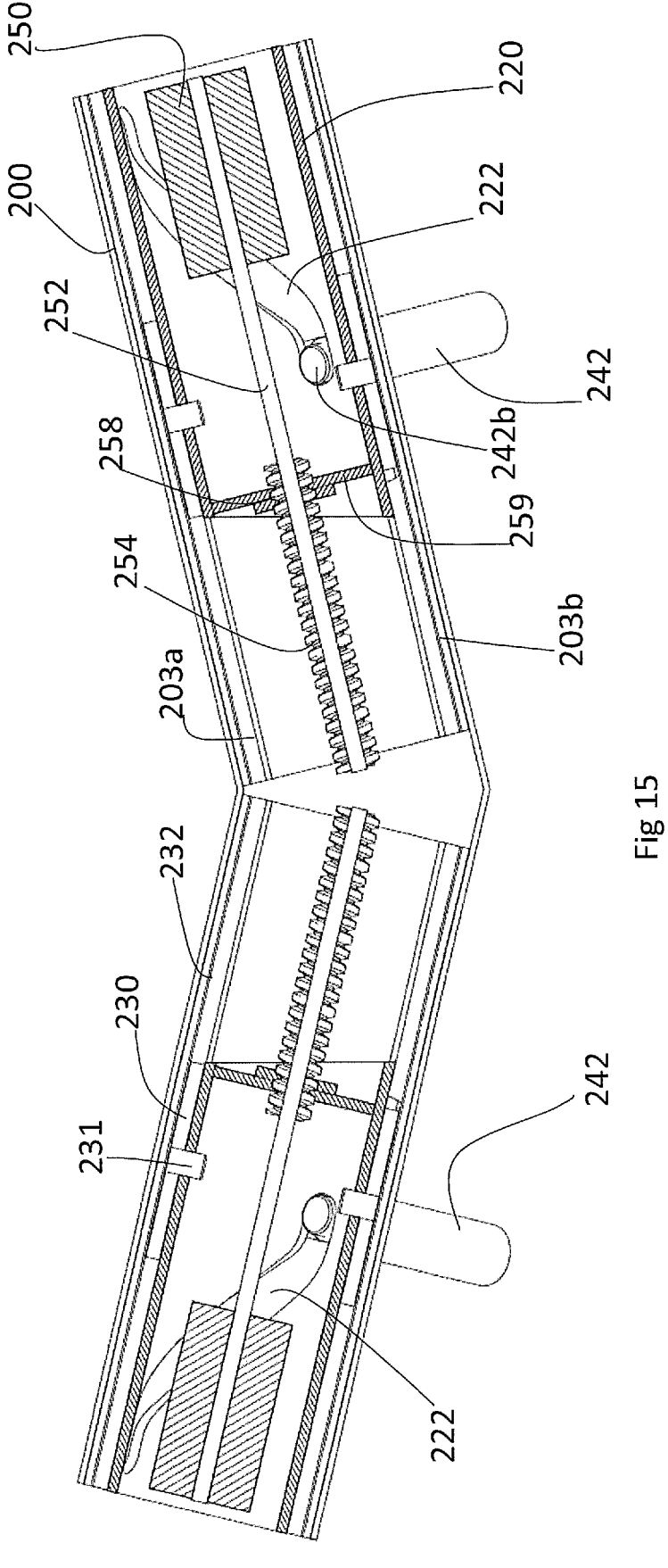
Figure 16:
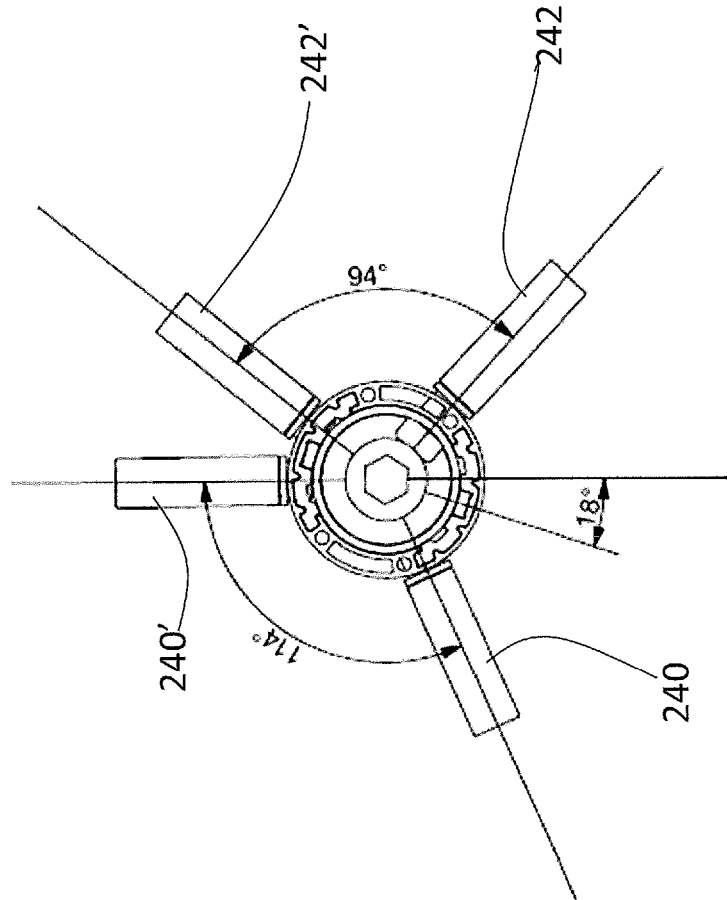

Embodiments of the present invention are further described hereinafter with reference to the accompanying drawings, in which:

FIGS. 9*a* and 9*b* are schematic perspective views of a chassis for a folding push chair according to the present invention in respective unfolded and folded states, with parts omitted to show how wheel-supporting legs of the chassis are actuated to rotate about a central core member;

FIG. 10 is an exploded view of components of the chassis;

FIG. 11 is a schematic perspective view corresponding to FIG. 9*a* but from an opposite angle and with the leg assemblies omitted;

FIGS. 12*a* to 12*c* are schematic perspective views of operation of a shuttle of the chassis to actuate rotation of wheel-supporting legs between folded and unfolded states (legs omitted for clarity);

FIGS. 13*a* to 13*c* are corresponding schematic perspective views of operation of the shuttle and its interaction with the associated core member of the chassis to actuate rotation of wheel-supporting legs between folded and unfolded states (legs omitted for clarity);

FIG. 14 is an exploded view of components of the core member and the shuttle;

FIG. 15 is a cross-sectional view through a vertical plane of the chassis; and FIG. 16 is a side plan view of part of the chassis, showing the range of motion of the legs.

Figure 17:
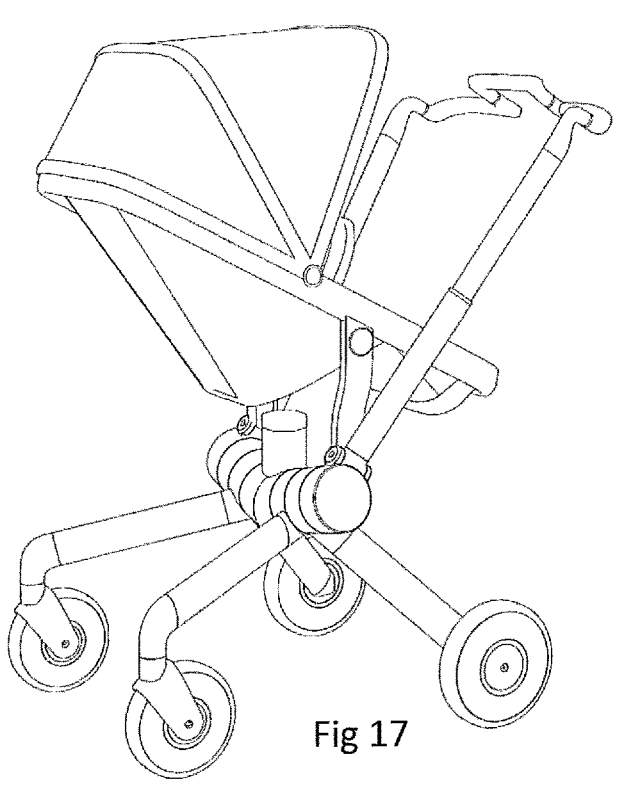
Figure 18:
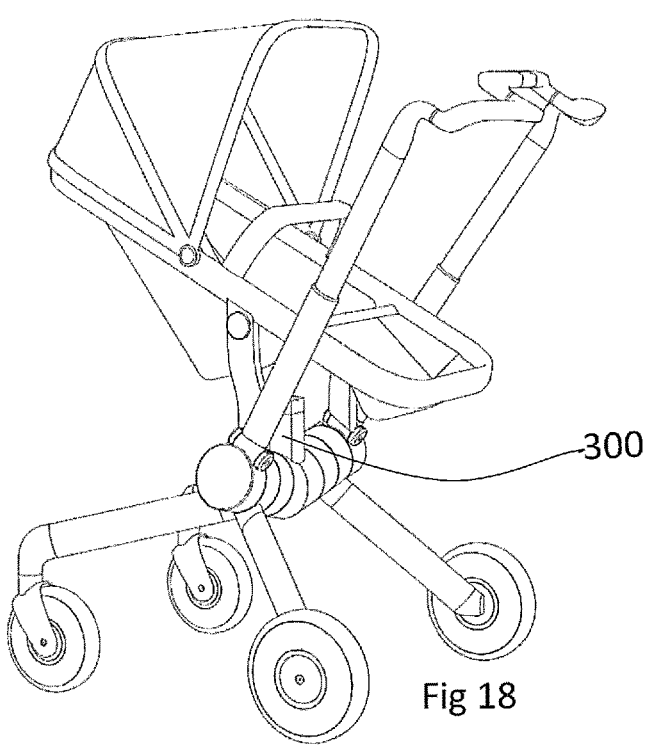
Figure 18B:
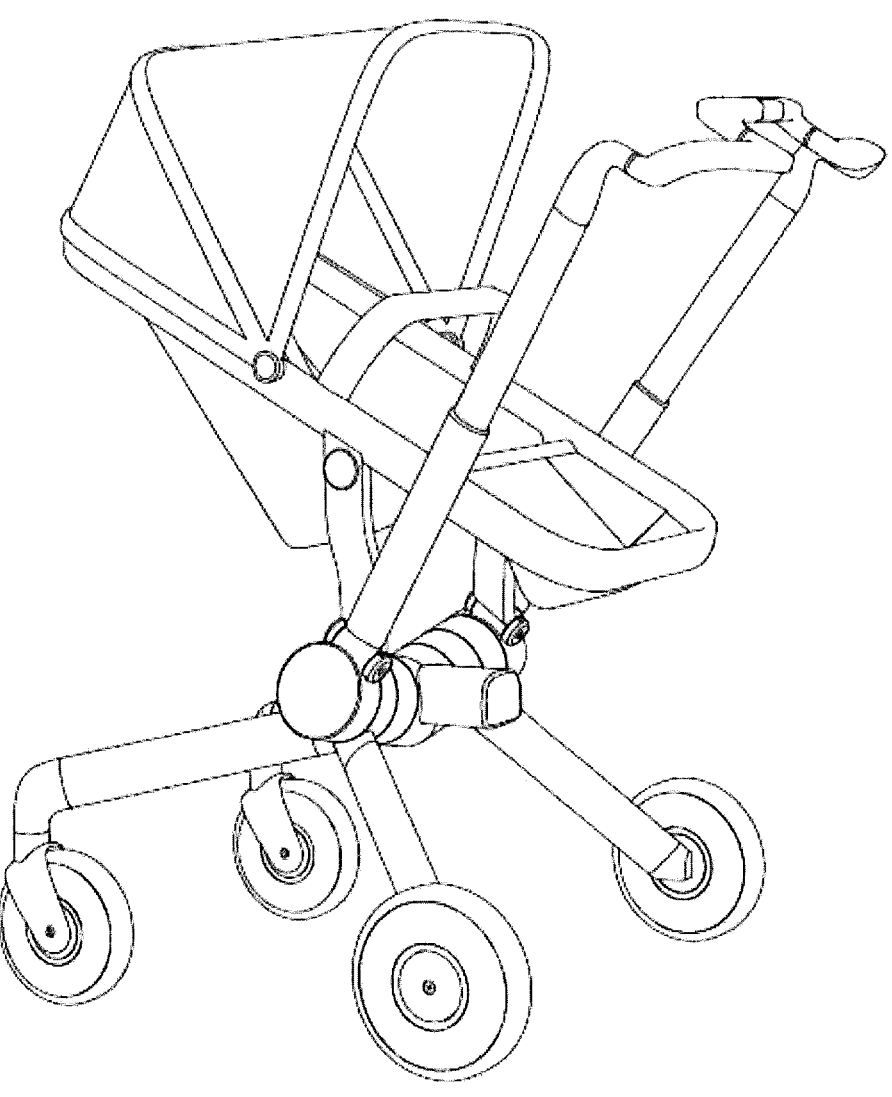
Figure 19:
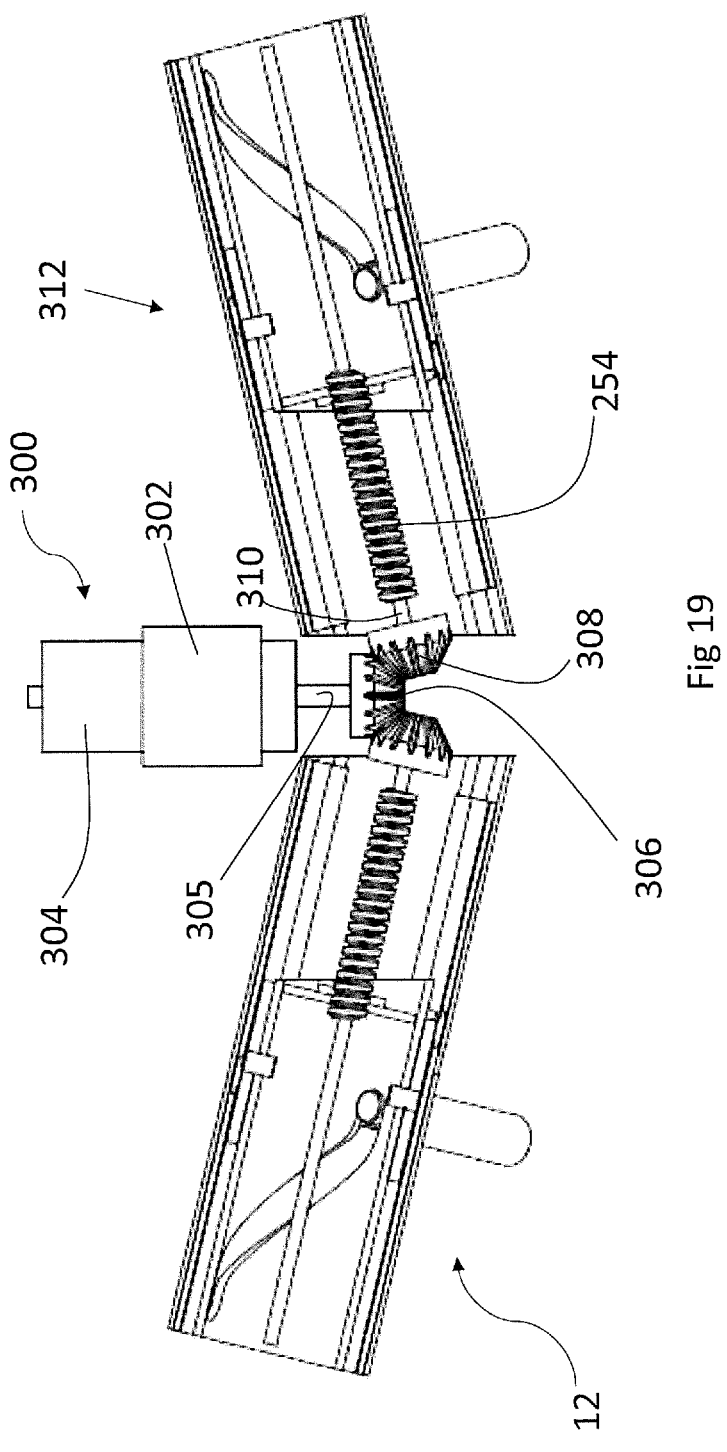
Figure 20:
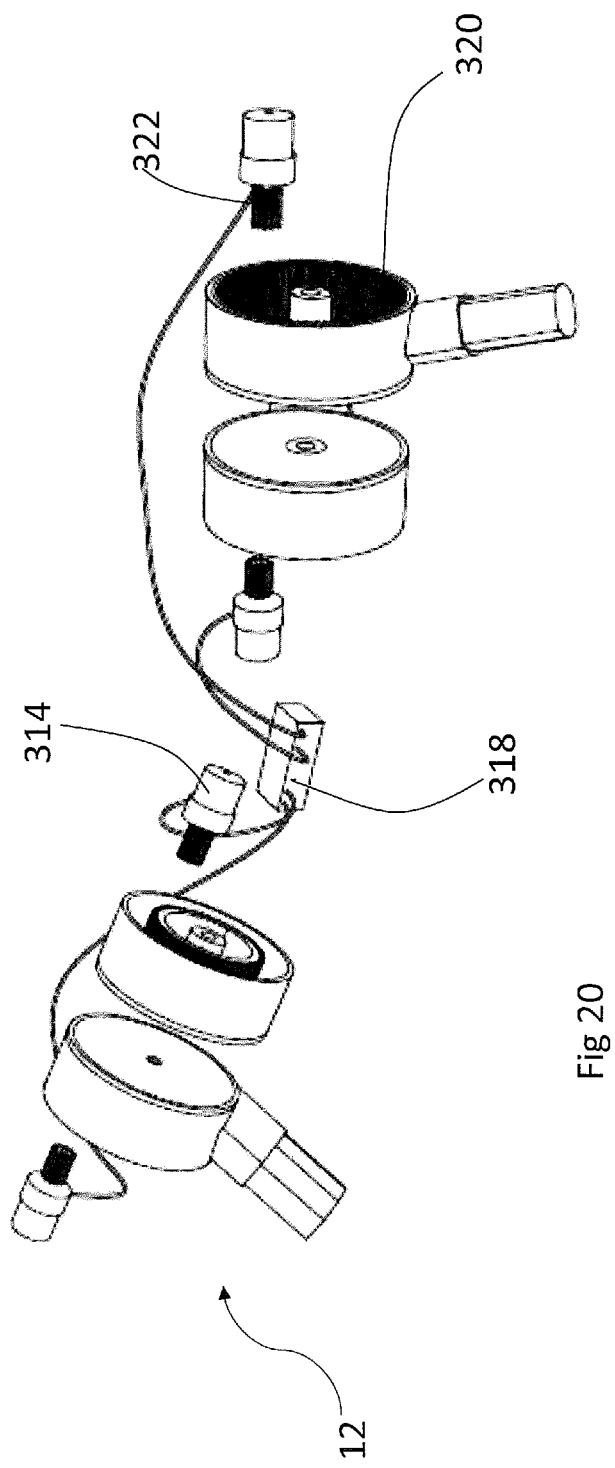
Figures 21A, 21B:
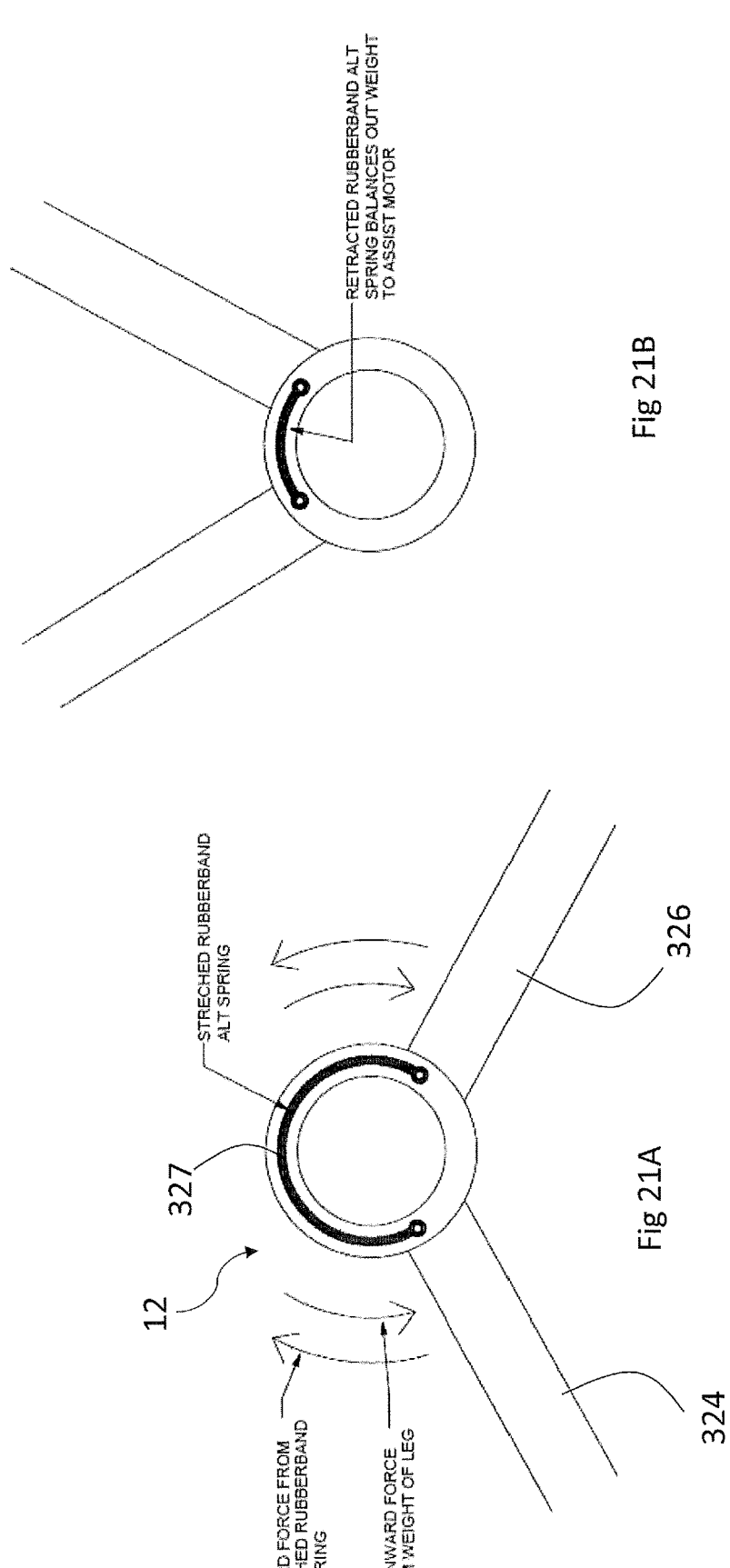
Figure 22:
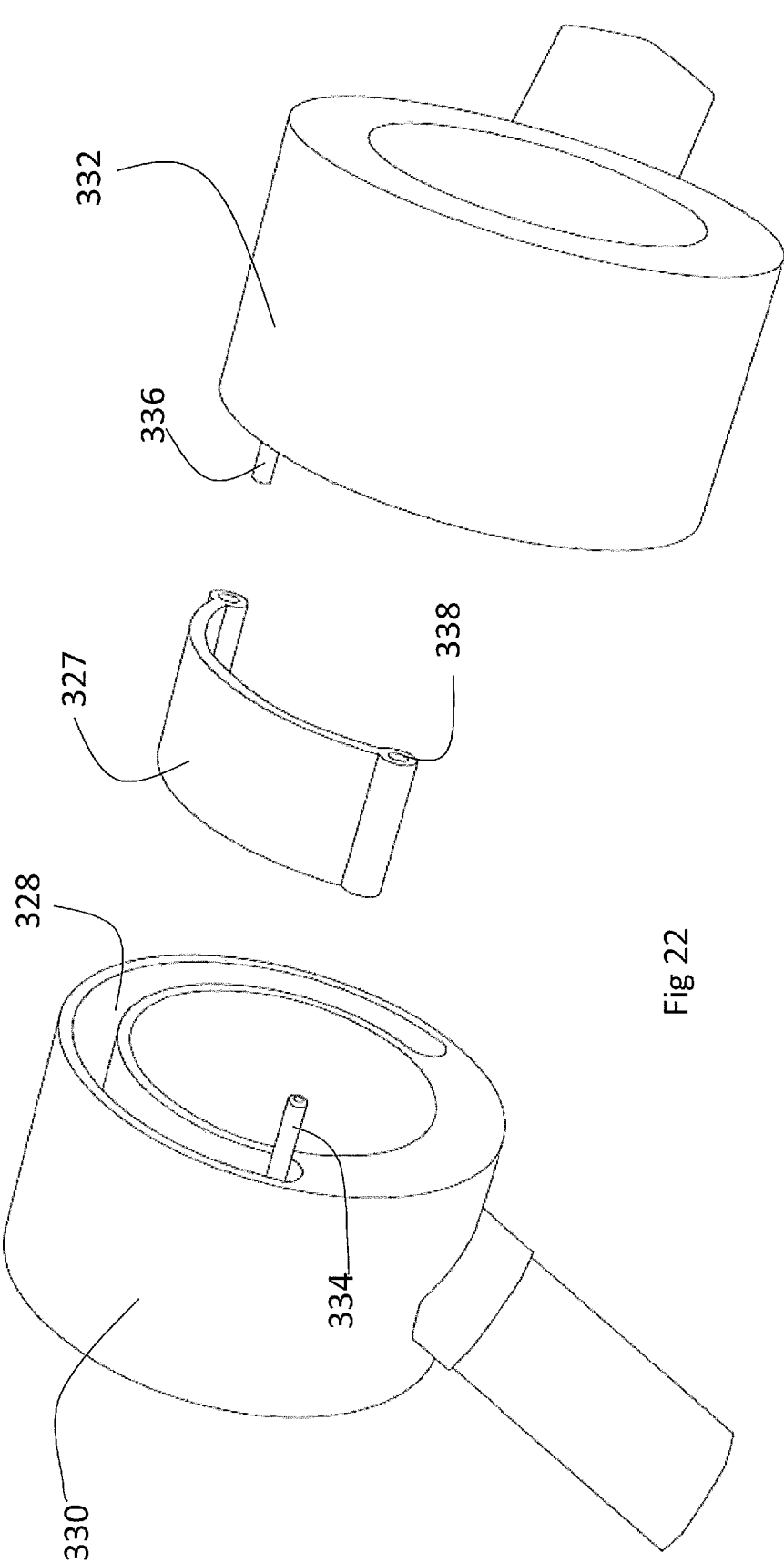
Figures 24A, 24B:
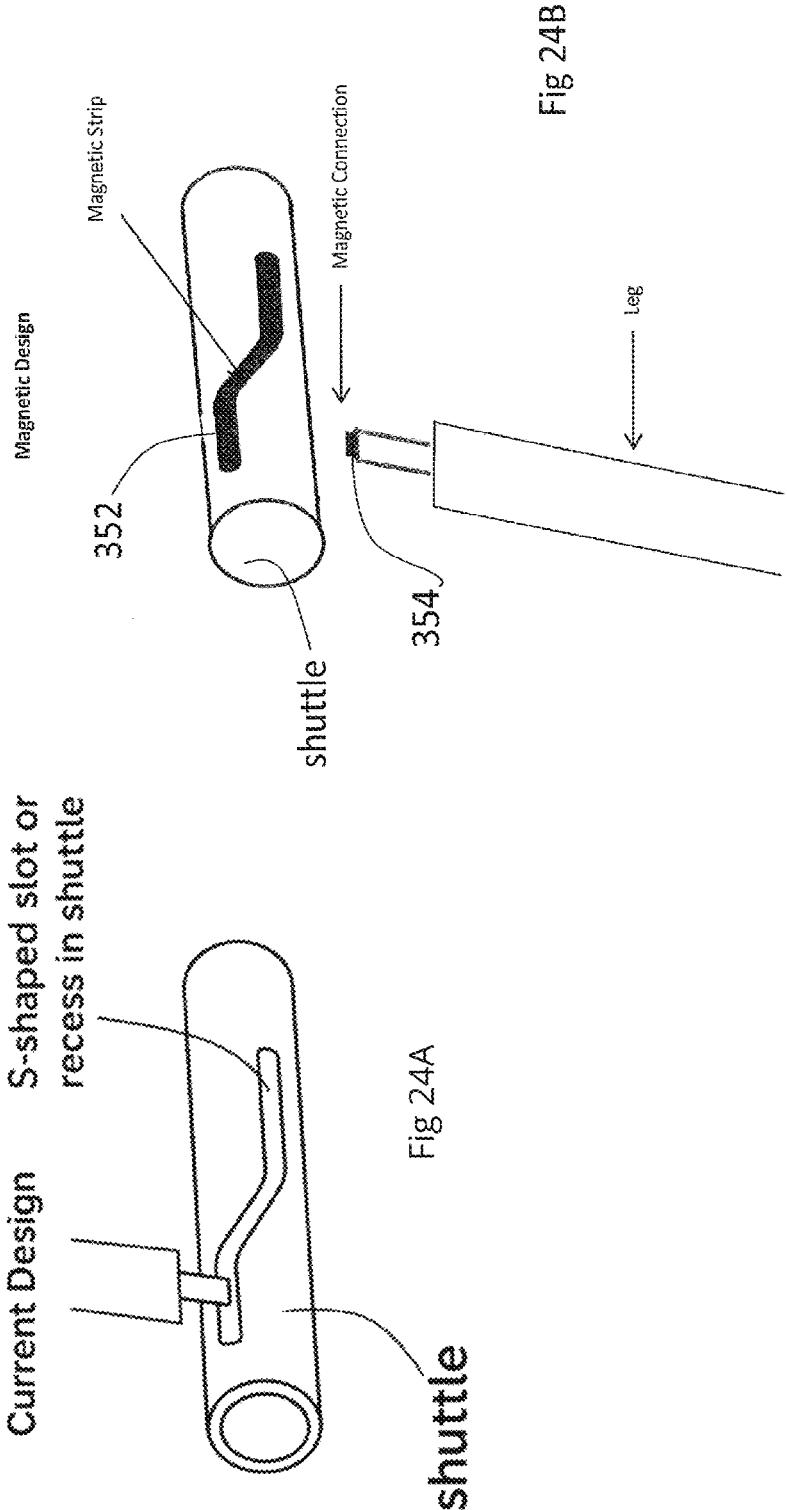
Figures 25A, 25B:
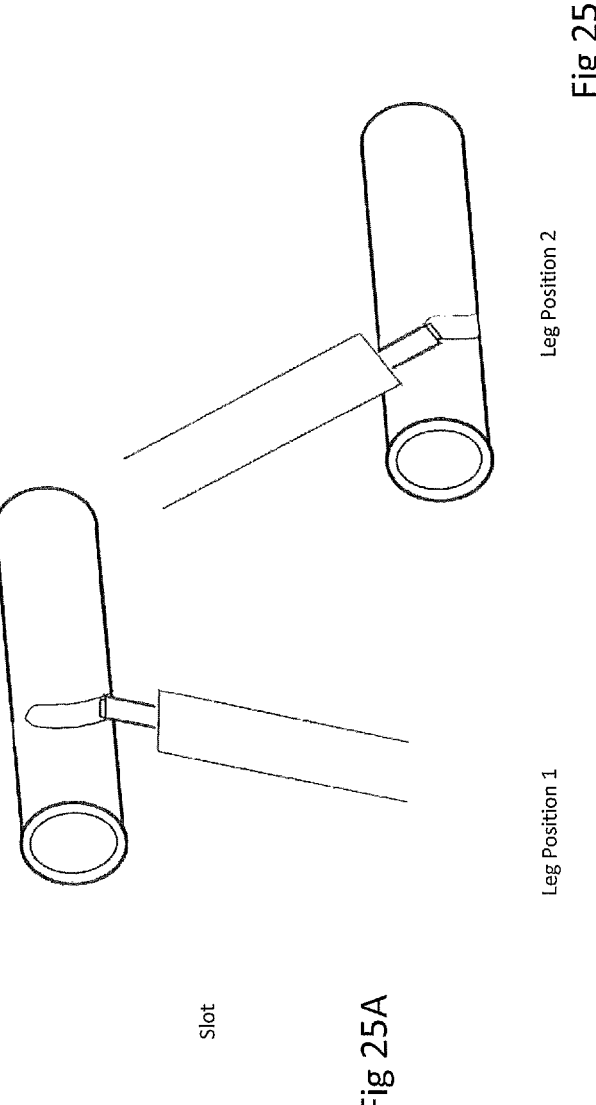
Figures 26A, 26B:
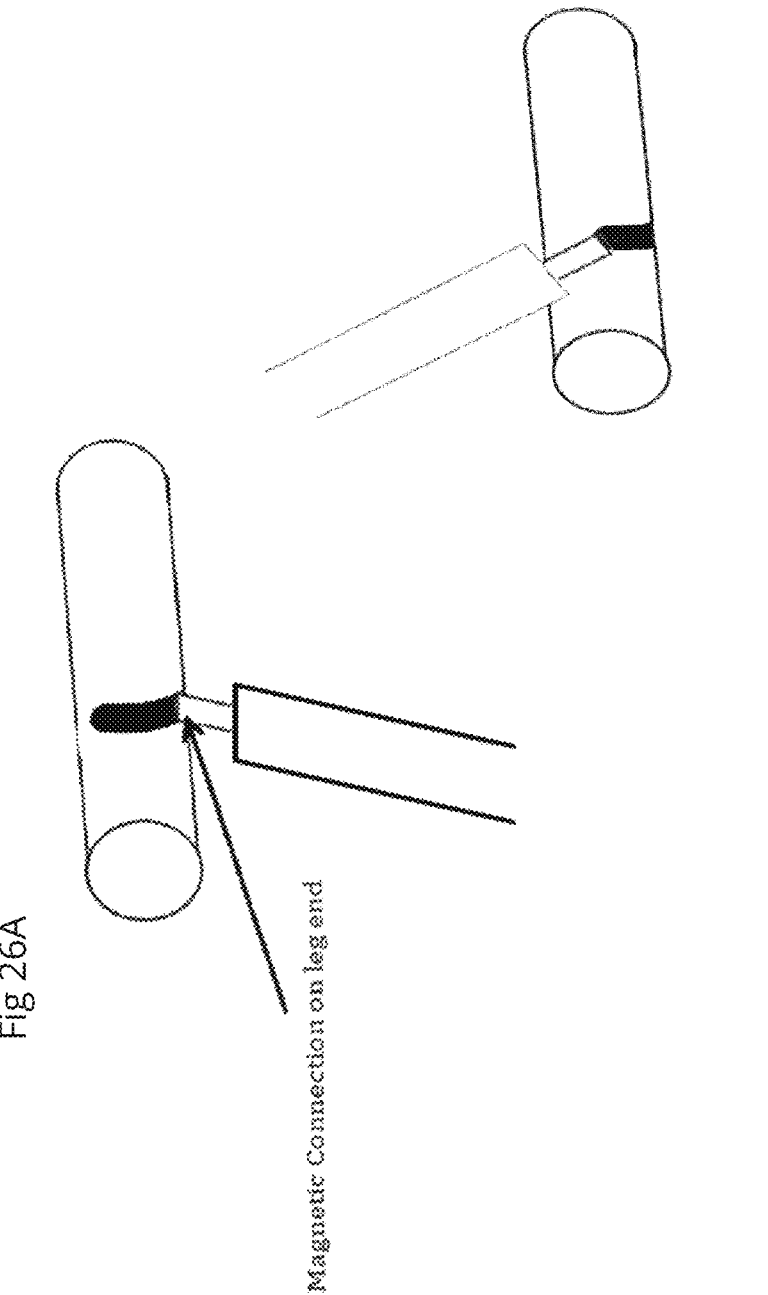
Figure 27:
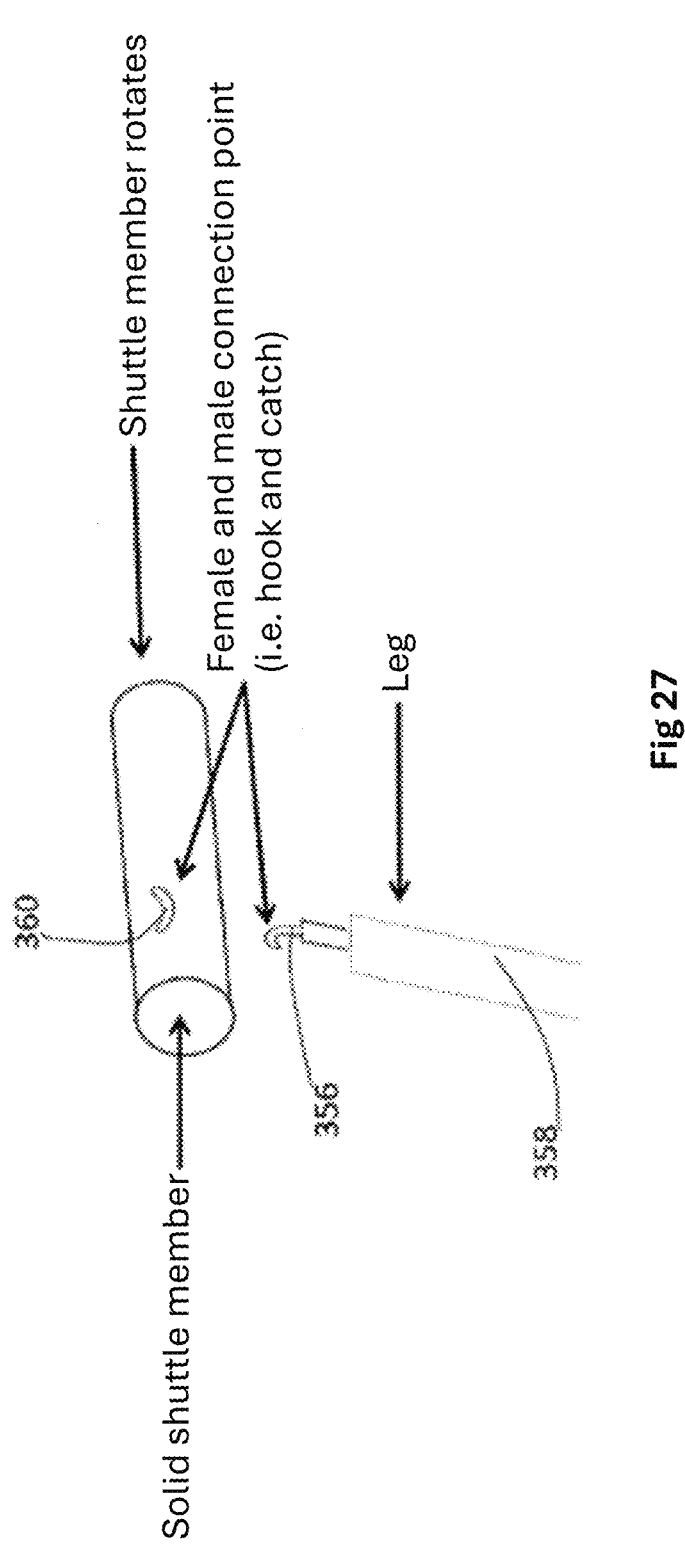
Figure 28:
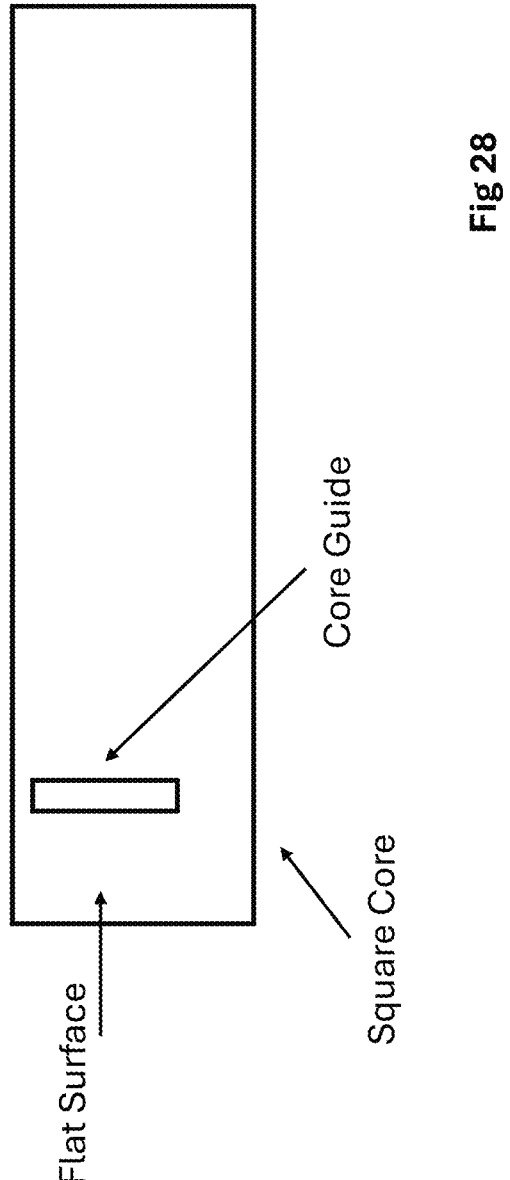
Figure 29:
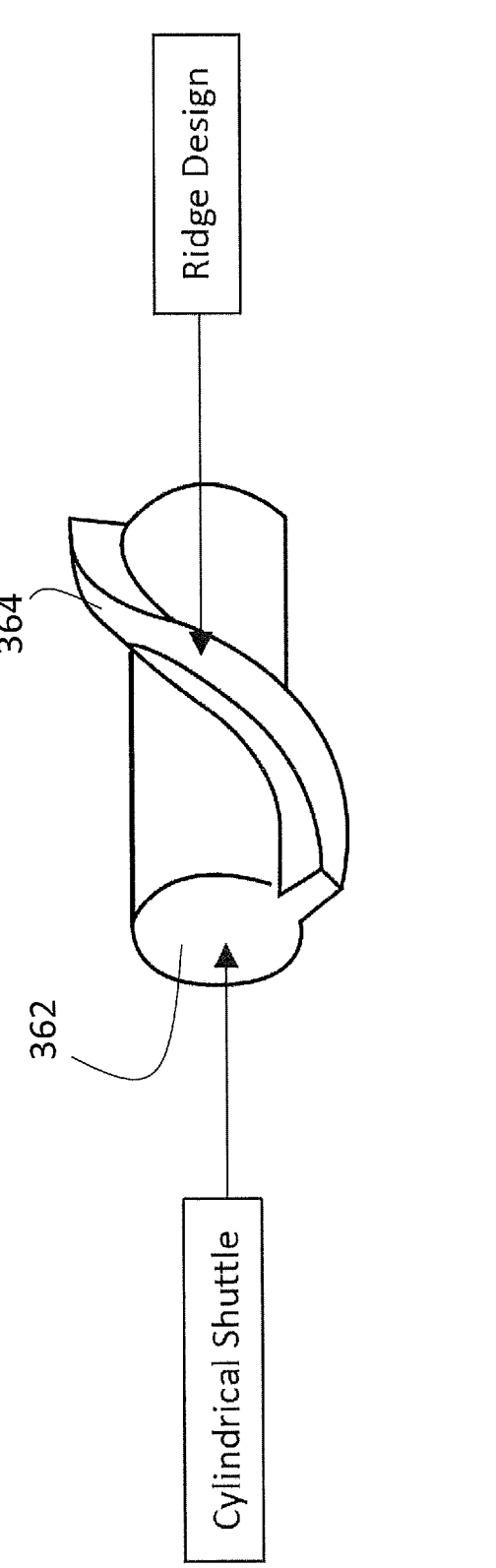
Figure 30:
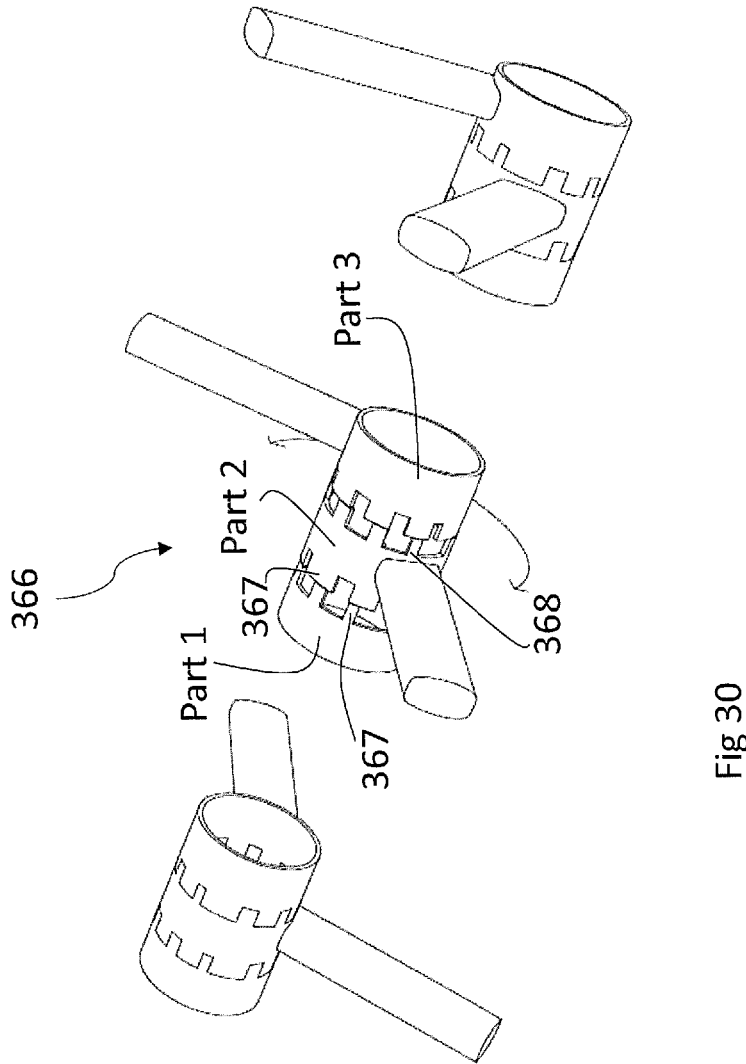

FIGS. 17 and 18 show schematic views of a push chair;

FIG. 18B shows a schematic view of a push chair;

FIG. 19 shows a schematic view of a vertical cross section through the chassis of the push chair of FIGS. 17 and 18;

FIG. 20 shows a schematic view of a motor configuration for use in the chassis of a push chair;

FIGS. 21*a* and 21*b* show examples of a rubber power assistance device in the chassis of a push chair;

FIG. 22 is a schematic view of the rubber component of FIGS. 21*a* and 21*b* shown in exploded format;

FIG. 23 shows a further example of a push chair;

FIGS. 24*a* and 24*b* show schematic views of components of the chassis of a push chair;

FIGS. 25*a* and 25*b* show views of the leg positions of a leg of a push chair;

FIGS. 26*a* and 26*b* show alternative examples of legs of a push chair;

FIG. 27 shows an alternative example for the connection of a leg of a push chair to the push chair chassis;

FIG. 28 shows a schematic example of a core having a flat-side, e.g. a square cross-sectioned core;

FIG. 29 is a schematic view of a shuttle for use in a leg folding mechanism;

FIG. 30 shows a view of a locking device for a push chair chassis;

FIGS. 31A to D show examples of a handle assembly for use in a device such as a push chair;

FIG. 32A to 32E show further exemplary details of a handle for use in a device such as a push chair

DETAILED DESCRIPTION

For the purposes of the present description, the invention will be described in the context of a folding push chair. It will be understood, however, that the invention may equally be applied to similar collapsible wheeled devices, such as wheelchairs, golf buggies or carts, shopping trolleys, hand-carts, baby walkers or walkers for the elderly or infirm, or the like, or to similar devices that have other means for engaging the ground than wheels, such as skids. The skilled person would also appreciate that the teachings of the invention may be extended beyond such moveable devices to static collapsible structures, such as tables, chairs or tripods.

Figure 1B:
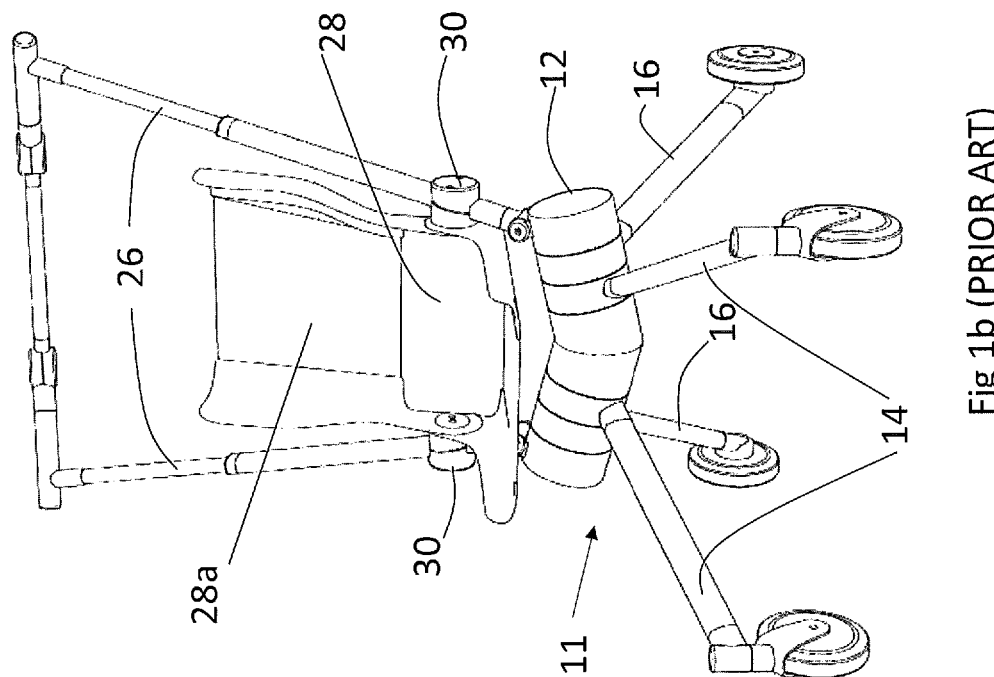
FIGS. 1a-1d show a push chair assembly according to the
prior art disclosed in WO2020/058753 and WO2020/058754
in its unfolded state.
Figure 1A:
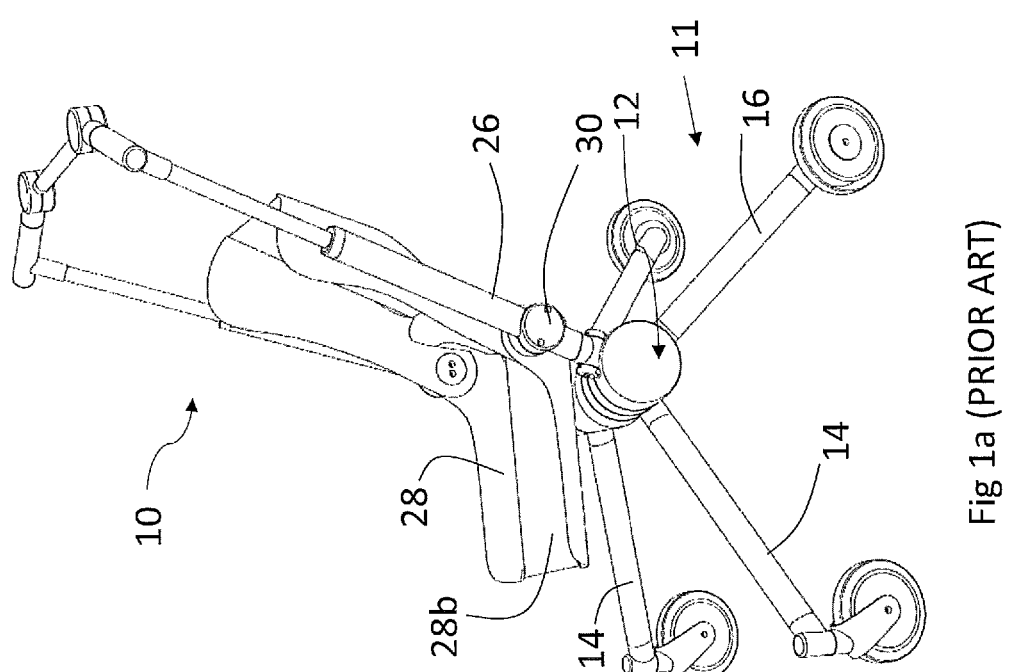
Figure 1D:
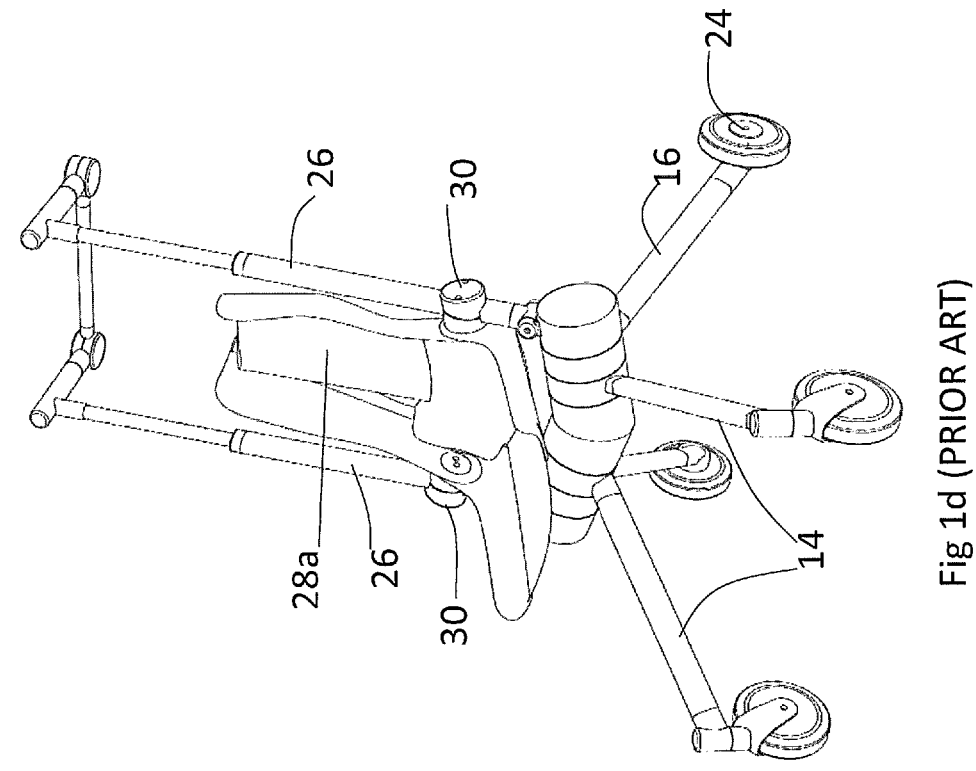
Figure 1C:
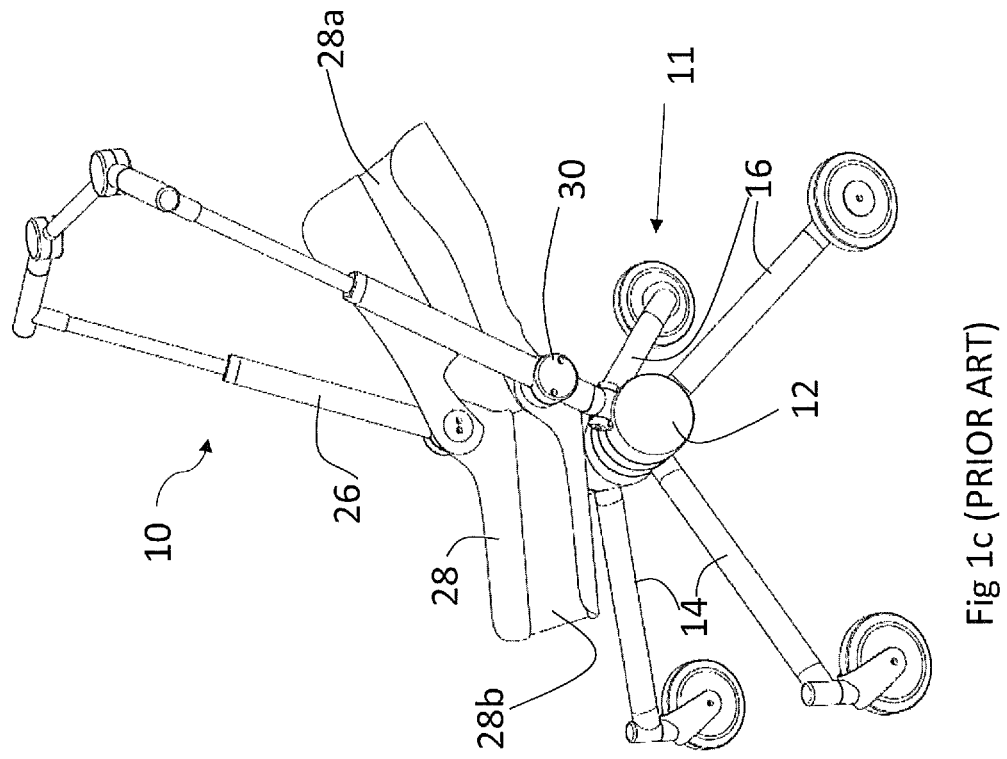

FIGS. 1*a* to 1*c* show a push chair 10 in an unfolded state. The push chair 10 generally comprises a subframe in the form of a chassis assembly 11, a handle assembly 26 connected thereto, and a seat assembly 28. The seat assembly 28 is mounted on the handle assembly 26 by seat mounting means 30. As can be seen, normally the seat back 28*a* will be in a substantially upright position, but can be reclined at least partially (or fully) as shown in FIG. 1*c*. The seat base 28*b* will typically remain in a generally horizontal position when the push chair 10 is in the unfolded state. The handle assembly 26 can be moved from a fully open configuration, as seen in FIGS. 1*a* to 1*c*, towards a closed or collapsed configuration. FIG. 1*d* illustrates the handle assembly 26 in a partially collapsed state, with a corresponding folding of the seat back 28*a* towards a collapsed condition. The constructional details of the handle and seat assemblies 26, 28 are not material to the present invention and are described merely to provide context to the chassis assembly 11, in which the invention is embodied.

A pair of forward extending wheel-supporting legs 14 and a pair of rearward extending wheel-supporting legs 16 are rotatably mounted on a central body portion 12 of the chassis assembly 11. At distal ends of the forward extending legs 14 are front wheel assemblies 18 and at distal ends of rearward extending legs 16 are rear wheel assemblies. Normally, the rear wheel assemblies 20 are arranged so that rear wheels 24 can rotate about a substantially horizontal axis. Front wheel assemblies 18 include front wheels 22 that can rotate about the normally horizontal axis and are additionally arranged so that they can rotate about a substantially vertical axis, so providing a potential steering facility in order to increase the manoeuvrability of the push chair 10. It will be appreciated, however, that the wheel assemblies may take many different forms.

Figure 2:
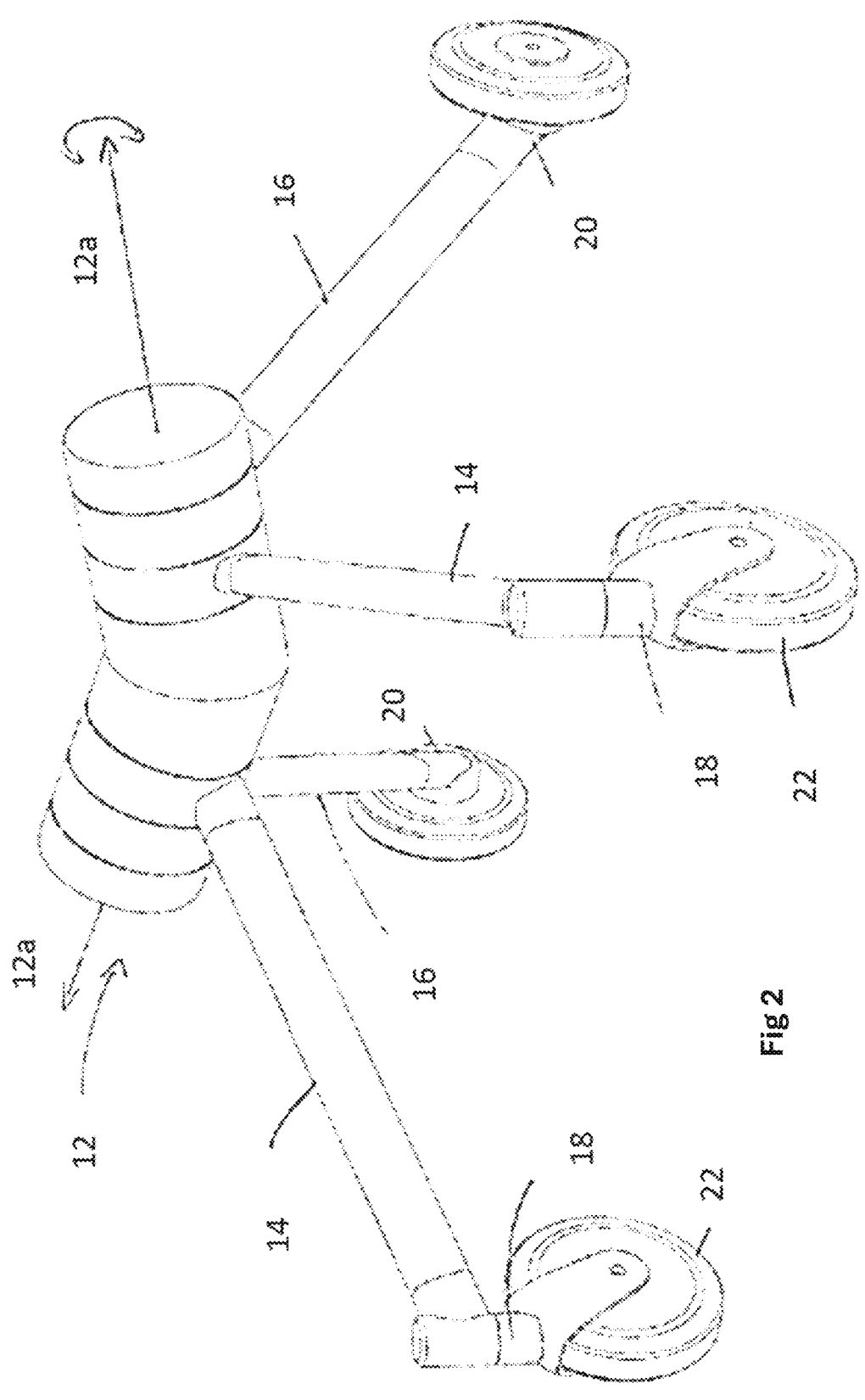
FIG. 2 shows just a chassis of the push chair of FIG. 1,
omitting seat and handle assemblies, showing the wheel-
supporting legs and central body assembly of the chassis in
its unfolded state.
Figure 3B:
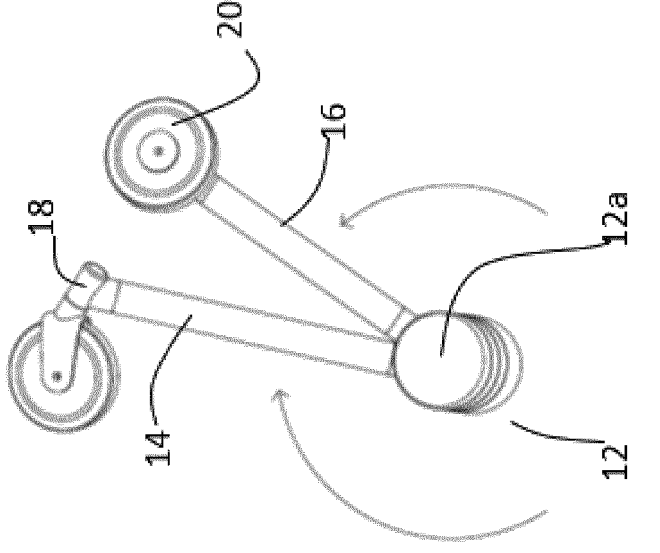
FIGS. 3a and 3b show how the chassis of FIG. 2 folds,
with the legs in an unfolded, open, ground-engaging state in
FIG. 3a and in a folded, closed, collapsed state in FIG. 3b.
Figure 3A:
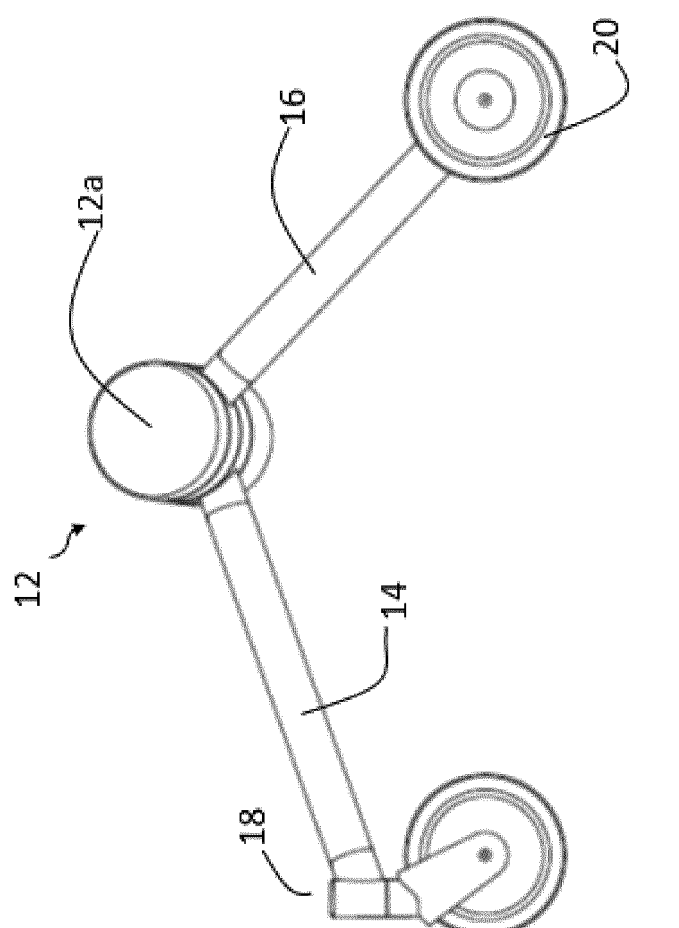

FIGS. 2 and 3*a* and 3*b* focus on the chassis assembly 11 and the rotating movement of the legs. FIG. 2 shows the central body portion 12 in the form of a "V" shape extending transversely across the chassis 11 in a direction substantially perpendicular to a normal direction of travel—i.e. when pressure is applied to the handle assembly 26 to urge the push chair forwardly. The central body portion 12 is substantially symmetrical, with one set of legs 14, 16 mounted on and extending from a first arm of the V on a left-hand half thereof, and another set of legs 14, 16 mounted on and extending from a second arm of the V on a right-hand half thereof.

A particular advantage of mounting the wheel supporting legs 14, 16 on a V-shaped body portion 12 is that it facilitates the folding of the push chair assembly into a smaller volume than might be possible with other and known arrangements without compromising the strength or utility of the unfolded push chair. More particularly, it enables the push chair of the present invention to be folded so that it is smaller in all three dimensions when folded than in the unfolded state, so enabling it to be more easily stored or transported than a similar design in which the central chassis extends only in a straight line.

FIG. 3a shows the first, left-hand (when viewed from the rear) arm of the V-shaped central body portion 12 with the associated forward extending leg 14 and rearward extending leg 16 in the open, unfolded position. FIG. 3b shows how the two legs 14, 16 can be rotated about a longitudinal axis 12a of the arm, which is oriented substantially transverse to the forward/rearward direction of the push chair, to fold and form a compact folded arrangement. During the folding movement, the forward leg 14 is rotated clockwise as viewed in FIG. 3b, to raise the associated front wheel assembly 18 upwardly away from the ground towards the handle assembly 26 whereas the rearward leg 16 is rotated oppositely, in an anti-clockwise direction, to raise the associated rear wheel assembly 20 upwardly away from the ground towards the handle assembly 26, such that the front and rear wheel assemblies 18, 20 are brought close together in the folded state.

FIG. 4a shows a perspective view of the folded push chair 10, which as can be seen has particularly compact dimensions. FIG. 4b shows a front plan view of the folded push chair chassis 11, with the seat and handle assemblies 26, 28 omitted for clarity. FIG. 4c shows the push chair chassis in the unfolded condition from the same front view as FIG. 4b. As can be seen from the dotted lines extending from the outer track of the rear wheels 20 in FIG. 4c into FIG. 4b, in the folded condition, the lateral, transverse width of the folded push chair is noticeably less than in the unfolded state.

Figures 5A, 5B, 5C:
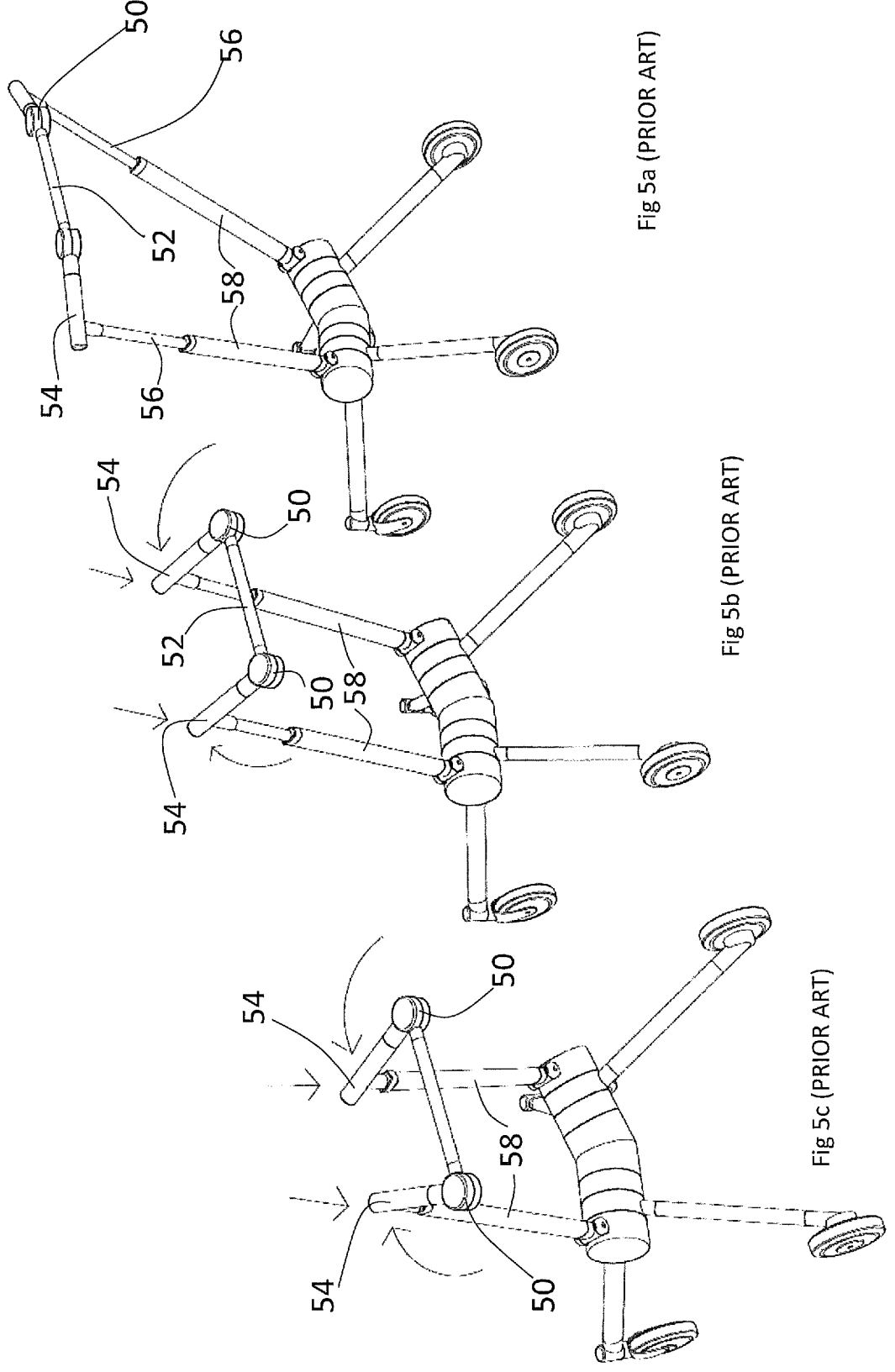
FIGS. 5a-c show a known arrangement for a folding
handle assembly of the push chair of any of the preceding
Figures.
Figure 6:
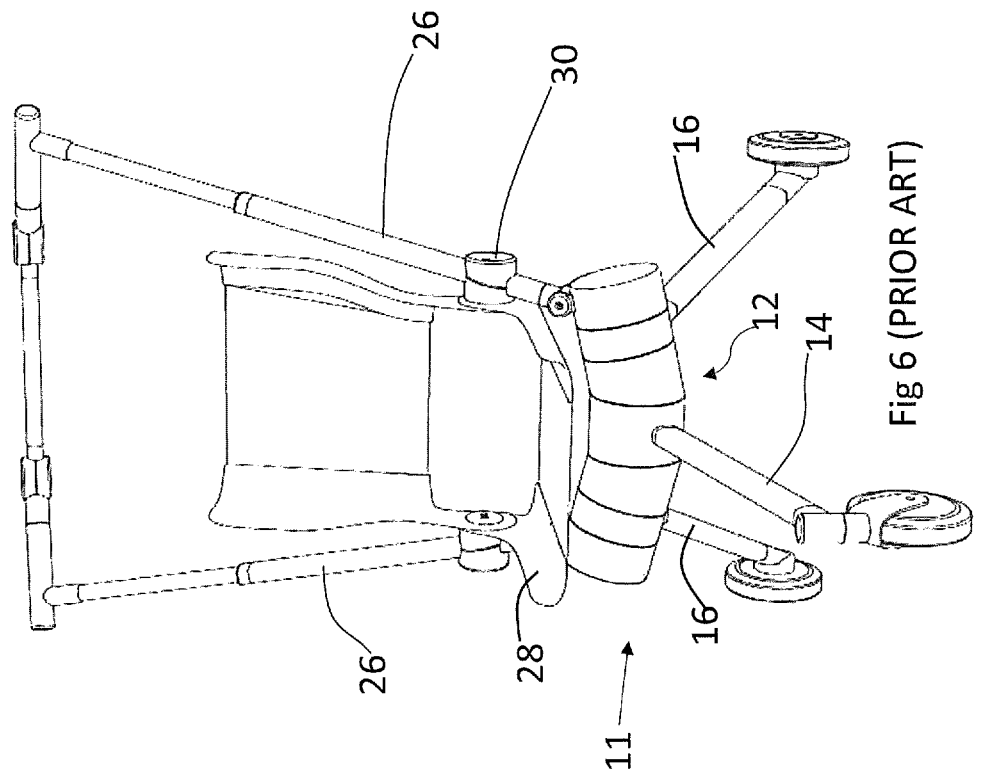
FIG. 6 shows an example of another known push chair, similar in construction to that of FIG. 1 but having only three wheels and associated legs.

FIGS. 5a-c show a general view of the handle assembly 26. From these drawings it can be seen that the handle assembly is provided with multiple articulation points which enable it to be folded to a more compact dimension and in particular a narrower width than the unfolded push chair. FIG. 5a shows the handle in a fully extended position. FIG. 5b shows an intermediate folded position, and FIG. 5c shows a second intermediate folded position.

In FIG. 5a, articulation parts 50 enable the handle to extend across a top part of the push chair 10 and are seen to be extended to maintain the handle in a generally open position. In FIG. 5b, the articulation parts can be seen to be rotating the handle to a more compact arrangement as side handle pieces 54 are rotated inwards as shown in the figures. Also, the handle can be reduced in height. Upper handle arms 56 are arranged to be nested telescopically with lower handle arms 58 and so the upper part 56 will slide into the lower part 58 during the folding process. The reverse operation occurs during the unfolding. A number of different detailed schemes can be envisaged for arranging for the upper and lower parts to cooperate slidably to reduce the height of the handle assembly and latch in place in either or both of the upper and lower positions.

Latching arrangements can be incorporated to the handle assembly 26 to ensure it remains in its folded or unfolded state.

The concept of a single central body portion 12 with forward and rearward extending legs can also be applied to a three-wheeled design of push chair 10 as shown in FIGS. 6 to 8b. Constructional details of the seat and handle assemblies 26, 28 may be substantially the same as those of the four-wheeled design. However, the chassis assembly 11 is modified. It can be seen that in this three-wheeled arrangement, a single forwardly extending leg 14 is disposed centrally between a pair of rearwardly extending legs 16.

Figure 7A:
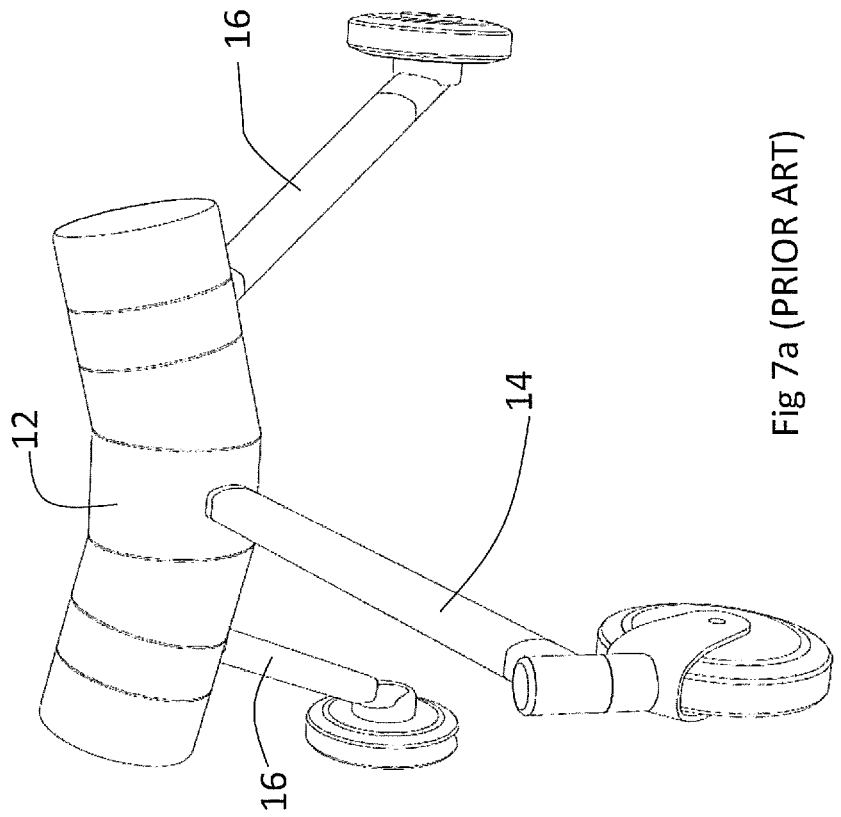
FIGS. 7*a* and 7*b* show a chassis of the push chair of FIG. 5 in respective unfolded and folded states.
Figure 7B:
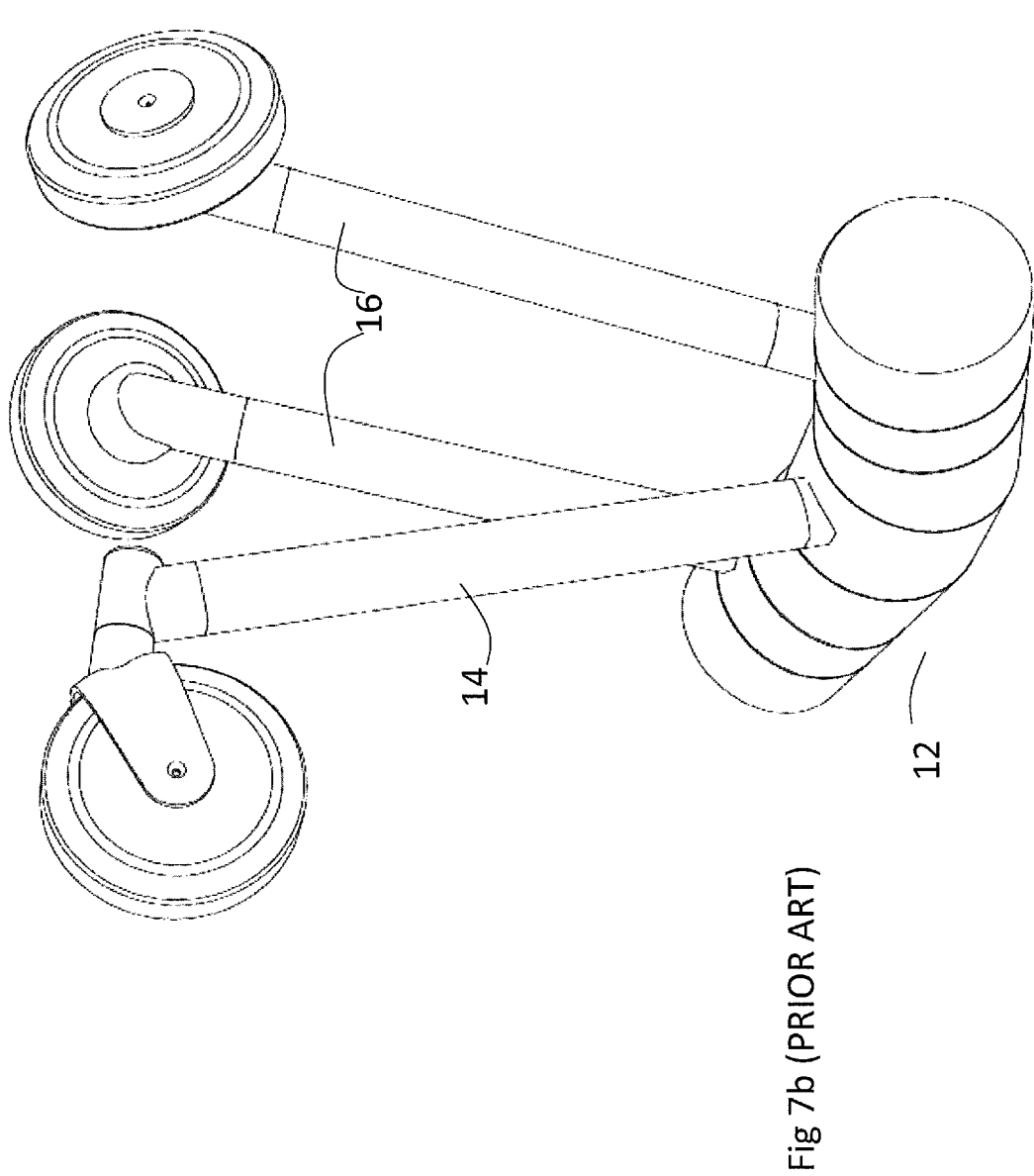

FIG. 7a shows the three-wheeled chassis assembly alone, without the handle and seat mounting means, in an open, unfolded state, and FIG. 7b correspondingly shows a perspective side view of the chassis 11 in a folded state.

Figure 8A:
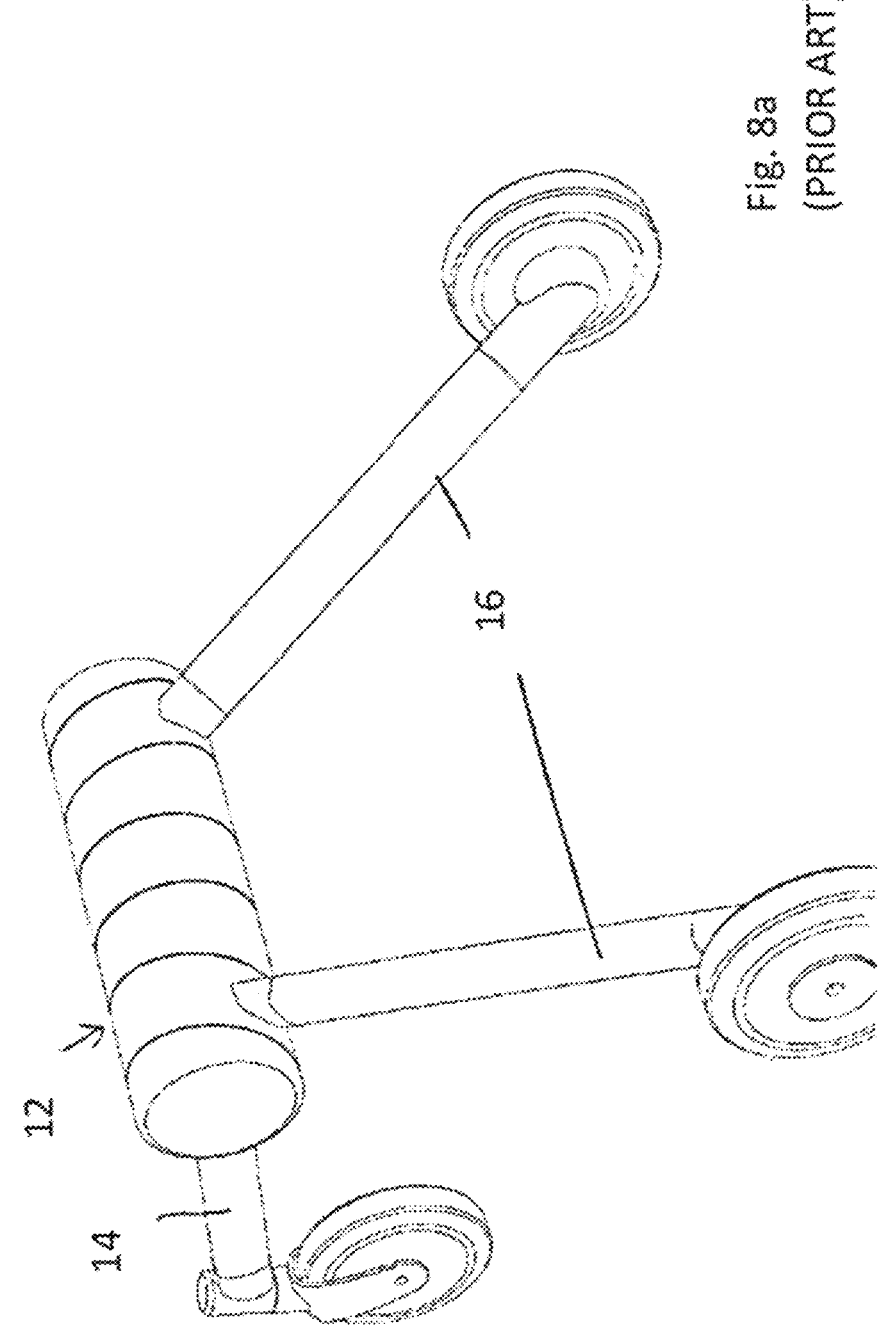
FIGS. 8*a* and 8*b* show an alternative three-wheeled chassis, with a linear central body assembly, in respective unfolded and folded states.
Figure 8B:
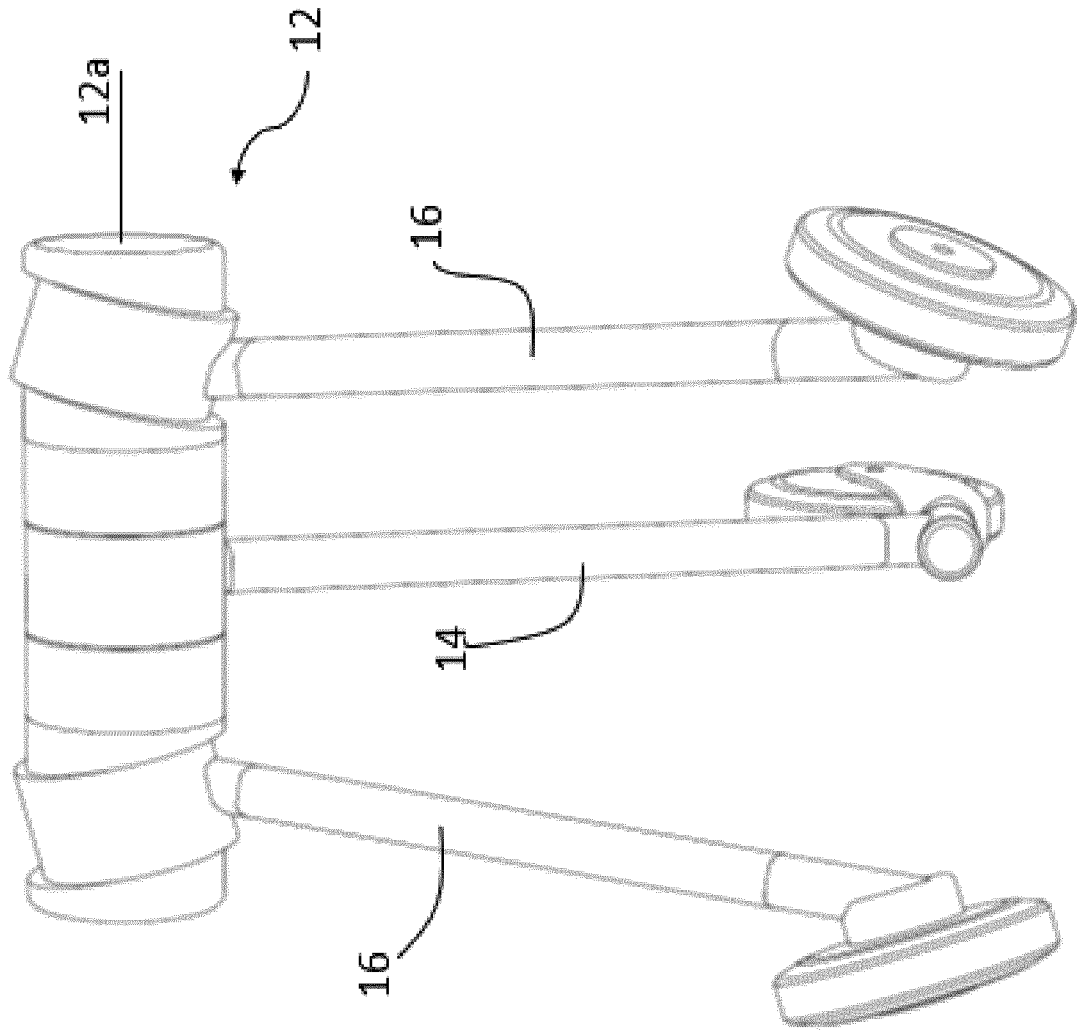

Another version of a three-wheeled (or legged) design is shown in FIGS. 8a and 8b, in which rather than having a V-shaped central body portion 12, the central body portion 12 is linear, with both halves on a common axis. It will be appreciated in general and throughout that each leg can have any desired number of individual wheels on it and when reference is made to a three wheeled version etc what is being referred to is a three-legged version. Each leg can have a single, a double or even more individual wheels attached to it. It will be appreciated that the leg folding mechanism can include as many legs as desired. For example, when used with a double stroller, a legs can be provided for stability.

FIG. 8a illustrates another version of a three-wheeled (or legged) design, in which the V-shaped body portion 12 is replaced by a linear body portion 12 having a single linear axis. Whilst the Figure only shows a three-wheeled (or legged) chassis 12, it is readily apparent it could be easily adapted to a four-wheeled (or legged) design.

FIG. 8b shows the chassis of FIG. 8a folded to its compact dimensions. In order to ensure compact dimensions of a folded push chair, the rearward extending legs 16 can be mounted on the central body portion 12 such that the plane of rotation of the legs is not perpendicular to the longitudinal axis 12a of the central portion. If mounted in this manner, the legs do not extend perpendicularly from the axis 12 but are splayed outward at an angle to it so that in the extended position the lateral track distance between the wheels is greater than the distance between the wheels when folded, as can be seen in FIG. 8a. When the legs are rotated and folded, as shown in FIG. 8b, it can be seen the folded dimensions of the push chair are more compact than in the unfolded state.

Whereas in the known arrangements of WO2020/058753 and WO2020/058754, the respective forward and rearward legs 14, 16 are connected together by gearing means to ensure they rotate in synchronism, the present invention uses a different mechanism for actuation and control of the folding and unfolding operations, as set out in FIGS. 9a to 14 and as described below. Other features of a push chair 10 incorporating such a leg folding mechanism may be as described in respect of FIGS. 1 to 8b or may take other compatible forms as would be understood by the skilled person.

A leg folding mechanism according to embodiments of the present invention is shown schematically in FIGS. 9a to 16. The leg folding mechanism is typically for a push chair, and has a core member 200 having a longitudinal axis and first and second axially spaced core guides (in this case, slots 202). A first leg is provided rotatably mounted on the core member at the first core guide, and a second leg member is provided rotatably mounted on the core member at the second core guide. A shuttle 220 is provided within the core member and moveable within the core member to cause movement of the legs as the shuttle moves within the core. In the example shown, the shuttle is arranged to move axially within the core member 200, although in other examples, as described below the shuttle can be arranged to rotate within the core member 200.

In the example shown, the leg folding mechanism takes the form of a chassis assembly 111 comprising a V-shaped central body portion 112 extending transversely across the chassis 111 in a direction substantially perpendicular to a normal direction of travel—i.e. when pressure is applied to the handle assembly 26 to urge the push chair 10 forwardly as the wheels are engaged with the ground. As illustrated, an angle formed between the two halves of the V-shape is 153 degrees, but it will be understood that this angle may be within a range from about 180 degrees, corresponding to a linear, co-axial arrangement, to about 90 degrees, preferably within a range of about 120 to 170 degrees, more preferably in a range of about 145 to 160 degrees. The central body portion 112 is substantially symmetrical, with one set of legs (not shown) mounted on and extending from a first arm 1121 of the V on a left-hand half (as viewed from the rear) thereof, and another set of legs 114, 116 mounted on and extending from a second arm 1122 of the V on a right-hand half thereof. For simplicity, construction and operation of just one half will be described.

In FIG. 9*a*, the forward and rearward legs 114, 116 are shown in their open, unfolded configuration for the associated front and rear wheel assemblies 118, 120 to engage the ground. The wheel assemblies 118, 120 are connected to respective distal ends of the associated forward and rearward legs 114, 116. In FIG. 9*b*, the legs are shown moved to a folded configuration. During the folding movement, the forward leg 114 is rotated anti-clockwise as viewed in FIG. 9*b*, to raise the associated front wheel assembly 118 upwardly away from the ground towards the handle assembly 26 (not shown) whereas the rearward leg 116 is rotated oppositely, in a clockwise direction, to raise the associated rear wheel assembly 120 upwardly away from the ground towards the handle assembly 26, such that the front and rear wheel assemblies 118, 120 are brought close together in the folded state. In an unfolding operation, the opposite movements occur. The mechanism that allows this folding through relative rotational movement of the forward and rearward legs 114, 116 is described below.

Each arm 1121, 1122 comprises a substantially tubular core member 200 having a longitudinal axis 201; 201' and first and second core guides in the form, in this example of slots 202, 204 axially spaced from one another and each extending around respective portions of the outer surface of the core member 200. The first slots 202 are offset inwardly of the second slots 204. The first slots 202 face substantially forwardly of the push chair and extend from an upper side of the core member through approximately 114 degrees, as best shown by reference to FIG. 16. It will be understood that this is merely an exemplary angle and that the angle, which defines a range of motion of the forward leg 114 as detailed below, may be any angle about 30 and 160 degrees, more preferably between about 90 and 140 degrees, even more preferably between about 110 and 120 degrees. The second slots 204 face substantially rearwardly of the push chair, extending from an upper side of the core member through approximately 94 degrees in the opposite sense to the first slots. It will be understood that this is also merely an exemplary angle and that the angle, which defines a range of motion of the rearward leg 116 as detailed below, may be any angle about 30 and 160 degrees, more preferably between about 70 and 120 degrees, even more preferably between about 90 and 100 degrees.

As seen in, say, FIG. 9A, proximal end of the rearward leg 116 is connected to a first hub 210 that is rotatably mounted on the core member 200 at a position overlying the second core guide or slot 204. A proximal end of the forward leg 114 is connected to a second hub 212 that is rotatably mounted on the core member 200 at a position overlying the first slot 202. The first and second hubs 210, 212 are rotatable relative to each other to move the associated forward and rearward legs 114, 116 between folded and unfolded configurations. In the illustrated embodiment, the legs rotate simultaneously in opposite directions, each starting and stopping at the same time. Thus, where the legs rotate about the same angle, their rate of rotation is the same. In other embodiments, the legs could rotate at different rates, for example where they have different ranges of motion. It will also be understood that the legs could alternatively rotate in the same direction, typically at differing rates.

Looking at the example shown in FIGS. 13A to 13C it will be understood that the core guides are in the form of core slots 202 and 204 that are formed in the core and are provided axially offset to correspond to the positions at which the hubs are mounted. In this example, since interaction between the hubs and the shuttle (arranged to move within the core) is by means of the pegs 242, the guides 202 and 204, are provided as slots that extend all the way through the core seen clearly in, say, FIG. 11. In other examples where the interaction between the hubs and the shuttle is different, such as for example a magnetic interaction, as shown in and described with reference to FIGS. 24B, the core guides need not be slots that extend all the way through the core. They could be recesses that serve to limit the axial movement of the hubs, or ridges that similarly function to constrain the axial movement of the hubs such as the shuttle moves, its axial movement is converted into rotational movement of the hubs or legs.

In a more general sense an engagement region on or of the shuttle is provided that engages with a hub or leg so as to cause rotation of the hub or shuttle, or vice versa for the hub.

As best seen in FIGS. 10 and 15, a substantially tubular shuttle 220 is disposed within the hollow core member 200. In this example, the shuttle 220 is axially translatable but rotationally fixed relative to the associated core member 200 by virtue of interengaging features.

As best seen in FIGS. 13 to 15, the interengaging features may be in the form of at least one, but preferably two or more longitudinal ribs 230 on an exterior surface of the shuttle 220 and at least one corresponding longitudinal groove 232 in an internal surface the core member 200. The or each longitudinal rib 230 may be formed integrally with the shuttle 220 or may be securely, fixedly attached thereto, for example by a securing bolt 231. By being formed as a separate part, manufacture of the shuttle and rib is facilitated. For serviceability, the attachment may be releasable so that the rib 230 can be replaced if worn or damaged. Also, the rib 230 may be formed of a different material to the shuttle 200. Typically, the shuttle 220 may be of a hard metal, such as steel, titanium or an alloy with similar properties for strength and durability. It will be appreciated that other materials with the requisite properties may be used instead, with options including certain injection mouldable polymers and fibre-reinforced composites. The rib 230 is also typically formed of a similar material also, but may instead be formed from a low-friction polymer, such as nylon, POM, acetal, polyacetal, Delrin®, Hostaform®, Kepital® or Tenac®, or the like for its low-friction properties.

For similar reasons, the core 200 may be mostly metallic construction, such as extruded aluminium for lightness and strength, but include inserts 203*a*, 203*b* of a different material secured on an inner surface to take advantage of the material properties and to allow replacement. It will be appreciated that other materials with the requisite properties may be used instead, with options including but not limited to certain injection mouldable polymers and fibre-reinforced composites. The inserts may be nylon, POM, acetal, poly-acetal, Delrin®, Hostaform®, Kepital® or Tenac®, or the like for low-friction and good wear properties, for example. Alternatively, the inserts 203*a*, 203*b* may be formed of a metal, or may be omitted entirely. In such embodiments, suitable lubrication, such as grease, would be needed. To further mitigate drag, the inner surface of the core member 200, whether it be formed as a unitary extrusion or as a composite part with inserts 203*a*, 203*b*, preferably has a ribbed profile, with longitudinally arranged peaks 205 and troughs 207 either side of the longitudinal groove(s) 232. The peaks 205 support the outer surface of the shuttle 220 as it is translated axially within the core member 200 with a minimum surface-to-surface contact. Small particles, such as dirt, can be accommodated within the grooves 207 to mitigate effects of such particles on smooth operation of the mechanism. In other embodiments, the interengaging features may take the form of a groove on the outer surface of the shuttle 220 and a corresponding rib protruding from the inner surface of the core member 200, with consequential alterations to the construction as appropriate.

An end cap 260 is removably attached to an outer end of the core member 200, for example by a snap-fit connection or by suitable fasteners. The end cap 260 provides a protective and/or decorative function and in particular seals the interior of the core member 200 to mitigate ingress of dirt and moisture.

The shuttle 220 is in the form of a hollow tubular member and includes first and second substantially S-shaped slots 222, 224 through its outer surface. The first S-shaped slot 222 has an upper portion 222*a* that aligns with the upper end 202*a* of the first circumferential slot 202 of the core member 200 when the shuttle 220 is in an axially inward position corresponding to the folded state of the leg assemblies. Correspondingly, the second S-shaped slot 224 has an upper portion 224*a* that aligns with the upper end 204*a* of the second circumferential slot 204 when the shuttle is in an axially inward position. At the opposite ends, the first S-shaped slot 222 has a lower portion 222*b* that aligns with the lower end 202*b* of the first circumferential slot 202 when the shuttle 220 is in an axially outward position corresponding to the unfolded state of the leg assemblies, and the second S-shaped slot 224 has a lower portion 224*b* that aligns with the lower end 204*b* of the second circumferential slot 204. Between the upper and lower portions, each S-shaped slot 222, 224 extends in a substantially helical manner about the outer surface of the shuttle 220. The first S-shaped slot 222 thus includes an intermediate helical portion 222*c* and the second S-shaped slot 224 includes an intermediate helical portion 224*c*.

The slot in the shuttle is shaped so as to cause rotational movement of the hubs (and legs) as the shuttle moves in the core. S-shape is this to be understood in this context as being capable of producing such movement. Thus, the slot need not be the shape of an actual "S". S-shape slot is preferably formed so as to extend all the way through the shuttle but could also be formed as a recessed region on the shuttle in the desired shape, e.g. an S-shape. As explained herein, the S-shaped slot more generally may be considered a shaped engagement region that is arranged to engage with corresponding engagement portions, regions or parts of the hubs. Where a magnetic interaction between the shuttle and the hubs or legs is used (see FIG. 24B), the engagement region on the shuttle is a magnetic strip and is not necessarily recessed. In another example, the engagement region on the shuttle is simply a part of the surface of the shuttle, i.e. not recessed. It could for example be defined by one or more ridges on the shuttle.

In a more general sense engagement region on or of the shuttle is to be understood as meaning any part of the shuttle that engages with the hub or leg so as to cause rotation of the hub or shuttle, or vice versa for the hub.

First and second stepped pegs 240, 242 are fixedly secured to and project from inner surfaces of the respective first and second hubs 210, 212. As best seen in FIGS. 10 and 12, each peg includes a substantially cylindrical body or root portion 240*a*, 242*a*, a first reduced diameter tip portion 240*b*, 242*b* at an end adjacent the core member 200, distal to the inner surface of said hub, and an intermediate portion 240*c*, 242*c* with a diameter between that of the root portion and the first reduced diameter tip portion. The root portions 240*a*, 242*a* may be formed integrally with the hubs 210, 212 or may be separately connected thereto by suitable fixing means. The pegs 240, 242 may be formed of a strong, hard metal such as steel. In some embodiments, the distal ends of the pegs may include an end cover portion 245 that defines the first reduced diameter tip portions 240*b*, 242*b* and, optionally, the intermediate portions 240*c*, 242*c*. The end cover portion 245 may be removably attached to the associated peg 240, 242 and may be formed of the same or a different material, which may be a harder material. Beneficially, the covers may thus be replaced if worn. In certain embodiments, the end cover portions may instead be formed of a low-friction material.

The tip portions 240*b*, 242*b* are sized to pass through the associated circumferential core guides such as slots 202, 204 underlying the respective hubs 210, 212 to be received in the associated S-shaped slots 222, 224 of the shuttle 220. The tip portions may be considered engagement regions or portions since in use they engage with the shuttle. The tip portion 242*b* of the innermost peg 242 thus passes through the first circumferential slot 202 to be received in the first S-shaped slot 222. Likewise, the tip portion 240*b* of the outermost peg 240 passes through the second circumferential slot 204 to be received in the second S-shaped slot 224. The tip portions 240*b*, 242*b* are sized to match the width of the associated S shaped slots 222, 224 and engage with the side surfaces thereof in a camming engagement. In certain embodiments, the end cover portion 245 may be rotatably attached to the associated peg 240, 242 so that it may turn relative to the peg when engaging with the side surfaces of the slots 222, 224, to minimise friction. It will be appreciated that the core guides are described herein as circumferential core guides since they are provided on the core and in typical examples extend for at least a part of the circumference of the core. The core guides are similarly circumferential irrespective of the shape of the core and its cross section. For example, if the core is provided having a square or rectangular cross section the core guides will similarly be considered circumferential as they extend around at least part of a transverse cross section of the core (see, for example FIG. 28, showing a side of an exemplary core in which the core has flat sides and is, say square in cross section. The core guide in this example is provided on one of the flat sides of the core).

It will be understood that alternative forms for the pegs 240, 242 may be employed, with corresponding changes to the profiles of the associated slots. For example, the distal end may be the same diameter as or wider than the body portion, with the intermediate portion comprising a groove. This would provide a more substantial tip, for added strength.

As shown by reference to FIGS. 12*a* to 13*b* in particular, in operation, actuation of the shuttle 220 to translate axially within the core member 200 urges the respective pegs 240, 242 to rotate due to the camming engagements of the tip portions 240*b*, 242*b* and the associated S-shaped slots 222, 224.

It will be appreciated that what is important in terms of converting the movement of the shuttle into rotation of the hubs is that the S-shaped slot in this example drives the movement of the hubs by virtue of the interaction between the hubs and the shuttle (the s-shaped slot in the shuttle). The movement of the shuttle thus need not be strictly axial, i.e. meaning that it undergoes no rotational movement at all. Indeed, it can be both rotational and axial so long as it includes an axial component and in use, via interaction of the hubs with the S-shaped slot, causes rotation of the hubs and subsequently the legs connected to the hubs.

The intermediate diameter portions 240*c*, 242*c* of the pegs 240, 242 are sized to match the width of the associated circumferential slots 202, 204 and engage the sides thereof such that lateral movement of the pegs 240, 242 is prevented, limiting to just the rotational motion caused by the interaction with the S-shaped slots 222, 224. In some embodiments, the circumferential slots 202, 204 and the S-shaped slots 222, 224 may have substantially matching widths, in which case the pegs 240, 242 need only have one reduced diameter portion, i.e. the tip portion 240*b*, 242*b*— there being no need for an intermediate portion 240*c*, 242*c*.

Because the innermost peg 242 is connected to the second hub 212, which is in turn connected to the forward leg assembly 114, rotational movement of the associated forward leg assembly 114 is guided by the engagement of the intermediate diameter portion 242*c* of the innermost peg 242 with the first circumferential slot 202 and the camming engagement of the tip portion 242*b* of the innermost peg 242 with the first S shaped slot 222. Similarly, rotational motion of the rearward leg assembly 116 is guided by the engagement of the intermediate diameter portion 240*c* of the outermost peg 240 with the sides of the second circumferential slot 204 and the camming engagement of the tip portion 240*b* of the outermost peg 240 with the second S-shaped slot 224. Thus, axial movement of the shuttle 220 is converted to rotational movement of the leg assemblies 114, 116. Where the mechanism is configured to rotate the leg assemblies 114, 116 in opposite directions, as in the illustrated embodiments, the respective helical portions 222*c*, 224*c* wind in opposed senses about the shuttle 200.

FIGS. 9*a*, 12*a* and 13*a* show parts of the leg folding mechanism in the folded configuration, with the pegs 240, 242 rotated to their fully upright positions at the upper ends of the respective first and second circumferential slots 202, 204 and at upper ends of the respective first and second S-shaped slots 222, 224—i.e. in the upper portions 222*a* and 224*a* respectively. In this position, the shuttle 220 is in an innermost position, see FIG. 13*a*. As shown, the upper portions 222*a* and 224*a* each comprise a short, straight end portion, parallel to the longitudinal axis 201. These function to lock the corresponding pegs 240, 242 ergo the leg assemblies 114, 116 in the folded configuration, preventing rotational movements thereof unless the shuttle 220 is purposely moved.

In an unfolding operation, if the shuttle 220 is actuated to slide outwardly, in the direction of arrow A in FIGS. 13*b* and 13*c*, the engagement of the S-shaped slots 222, 224 with the intermediate portions 240*c*, 242*c* of the respective pegs 240, 242 causes the pegs to rotate in the direction of arrows B and C, through an intermediate position shown in FIGS. 12*b* and 13*b*, towards the fully open configuration, as shown in FIGS. 9*a*, 11, 12*c* and 13*c*, with the pegs 240, 242 rotated to their fully lowermost positions at the lower ends of the respective first and second circumferential slots 202, 204 and at lower ends of the respective first and second S-shaped slots 222, 224—i.e. in the lower portions 222*a* and 224*a* respectively. In this position, the shuttle 220 is in an outermost position, see FIG. 13*c*. As shown, the lower portions 222*b* and 224*b* each comprise a short, straight end portion, parallel to the longitudinal axis 201. These function to lock the corresponding pegs 240, 242 ergo the leg assemblies 114, 116 in the open, unfolded configuration, preventing rotational movements thereof unless the shuttle 220 is purposely moved. The folding operation is a reverse of the unfolding operation; the shuttle 220 is actuated to slide in the opposite direction, i.e. inwardly, in the direction of arrow D in FIG. 13*a*, causing rotation of the respective pegs 240, 242 in the direction of arrows E and F towards the fully folded configuration.

The full range of motion of the pegs 240, 242 is shown clearly in FIG. 16, which is a view perpendicular to the axis 201, 201'. The pegs referenced 240, 242 are shown in the open, unfolded configuration, pointing generally downwardly for engaging the ground in use. The same pegs, but referenced 240', 242' are also shown in the folded configuration, rotated upwardly. The front peg 240, 240' moves through a 114 degree range of motion, whereas the rear peg 242, 242' moves through a 94 degree range of motion in this example. The design of the slots 202, 204 may be altered according to the desired ranges of motion for the respective pegs. The front and rear pegs could move through the same (but opposed) range of motion.

It will be understood that the orientations of the S-shaped slots may be reversed, with the innermost position of the shuttle corresponding to the folded configuration and vice versa.

It will be understood that the inclusion of longitudinally extending end portions to function as a locking mechanism is particularly convenient and dispenses with the need for a separate means for locking the push chair in either or both of the folded and unfolded configurations. However, it will also be understood that alternative locking means may be provided instead or as well.

The skilled person will appreciate that the motion of the leg assemblies 114, 116 is determined by the profiles of the respective curves of the S-shaped slots 222, 224. Rather than a purely helical curve in the intermediate portions 222*c*, 224*c* of the slots 222, 224, the parts closer to the end portions 222*a*, 224*a* and 222*b*, 224*b* may be shallower than in the middle portion so as to provide a smooth start and finish to the conversion of the axial motion of the shuttle 220 to rotation of the leg assemblies 114, 116, yet to enable a full range of rotation with as little axial motion of the shuttle as possible, to maintain a narrow profile to the leg-folding mechanism. In other words, rather than the helical portions of the slots having a constant pitch, the pitch may be greater in the middle portion than at the end portions. A greater pitch converts to more rotation of the leg assemblies 114, 116 for a given axial translation of the shuttle 220. A practical upper limit to the pitch has been found to be about 45 degrees from the longitudinal axis 201.

Actuation of the shuttle 220 may be achieved by many suitable mechanisms, as would be appreciated by the skilled person, such as actuation of a pneumatic or hydraulic piston, by cable or lever actuation, or via a longitudinal spring. Particular advantages can be provided, however, when actuation is done via a rotating drive shaft. With reference to FIGS. 10 and 15, a drive shaft 252 extends from a motor 250 which is fixedly connected to the core member 200 via the end cap 260. The motor 250 may be partly or, preferably, fully housed within the core and shuttle members, protected from the outside environment. The drive shaft 252 is at least partially housed within the shuttle 220 and the core member 200 and typically has a worm wheel 254 rotationally fixed to an end thereof for engagement with a correspondingly threaded internal portion 258 of the shuttle 220, whereby rotation of the drive shaft 252 is converted into axial translation of the shuttle 220 within the core member 200. The threaded internal portion 258 of the shuttle 220 may be in the form of a threaded aperture in the centre of an end wall 259 spanning across the interior of the hollow shuttle. The end wall may be centrally reinforced about the aperture.

Such an arrangement provides a compact and convenient mechanism for actuating the shuttle, ergo the rotations of the leg assemblies 114, 116. In particular, the motor 250 and, optionally, the associated power supply, may be fully enclosed within the hollow core member 200 and tubular shuttle 220, thus acting as an effective housing, thereby protecting it from possible knocks and damage and providing a compact, robust, aesthetically pleasing and safe motorised folding and unfolding mechanism. Power supply, e.g. rechargeable battery, may be housed in a separate unit, which may be secured to any convenient location on the push chair, such as on the chassis assembly. The battery may be rechargeable through any suitable means, such as a power jack, a USB connection, or an induction coil. Actuation of the motor 250 may be triggered by a remote switch (not shown) at any convenient location, such as on the handle assembly 26. Actuation signals may be transmitted from the switch to the motor 250 over a wired or wireless connection. The switch could be a virtual switch, such as incorporated into an app on a mobile phone, whereby operation of the folding/unfolding mechanism could be controlled via the app.

It will be appreciated that the actuation of the drive shaft may instead be manual, for example by turning a crank or by some other mechanical arrangement that converts one type of manually actuated movement into rotation of the drive shaft, such as folding of a handle portion of the push chair being converted by pivots and levers, which may be incorporated in to the structure of the push chair. A manual actuation method may be provided as a back-up to motorised operation.

Whereas the depicted embodiments utilise projections in the form of pegs from the inner surfaces of the hubs, and corresponding helical slots 222, 224 on the shuttle 220, it will be understood that in other embodiments which are not shown, the camming interaction may be in the form of projections extending from the shuttle surface to be tracked by respective followers on the inner surface of the hubs. Also, whereas the pegs 240, 242 are shown as being substantially cylindrical in form, other shapes could instead be used. In other embodiments (not shown), the camming interaction may be provided by helical surfaces in the form of first and second helical ridges on the outer surface of the shuttle engaging with mating followers on a distal faces of pegs projecting from the inner surface of the associated hub. In yet other embodiments (also not shown), the first and second substantially helical surfaces may be on the inner surfaces of the respective hubs and the associated first and second projections are on the external surface of the shuttle.

In the foregoing, a leg folding mechanism for a four-wheeled push chair 10 has been described, wherein first and second arms 1121 and 1122 of the V-shaped central body portion 112 comprise mirrored leg folding mechanisms each accounting for rotational movement of a pair of forwardly- and rearwardly-extending legs 114,116. It will be understood, however, that appropriate modifications can be made to the illustrated embodiments to provide similar functionality to three-wheeled push chairs of the type depicted in FIGS. 6, 7*a* and 7*b* or of the type depicted in FIGS. 8*a* and 8*b* with a linear central body portion instead, or indeed to a four-wheeled version with a linear central body portion, wherein the axes 201, 201' of the first and second arms 1121, 1122 are co-axially arranged.

In the examples described herein three or four wheeled push chairs are envisaged although this is not to be considered limiting. The arrangement of the legs on the central body or chassis is preferably that some of the legs are arranged to rotate one way with respect to the body or chassis and other of the legs are arranged to rotate the other way. The precise configuration of the direction of folding is not limited to any specific example. Preferably in one example of a three wheeled leg folding mechanism the central wheel and leg is arranged to fold in the opposite direction from the two outer wheels/legs. In a four wheeled example of a leg folding mechanisms it could be that the two outer legs fold one way e.g. forward, and the two inner legs fold the other way, e.g. backwards. It could also be that the two legs on one side e.g. the left side of the leg folding mechanism fold one way, and the two legs on the other side fold the other way. As a general rule any possible configuration of the direction of folding of the legs can be provided.

For example, to provide folding of three legs, the core member 200 may further include a third axially spaced and circumferentially extending slot, and the mechanism further including a third hub for connection to a third leg member and rotatably mounted on the core member at the third circumferentially extending slot, and a third projection, for example in the form of a third peg from the internal surface of the third hub, which passes through the third circumferential slot to matingly engage with a corresponding third substantially helical surface on the external surface of the shuttle, such that the axial translation of the shuttle as the actuator is operated is also converted into rotation of the third hub member.

It is also conceivable to use a single motor to actuate both arms 1121, 1122 of a symmetrical folding mechanism. In such an embodiment, the pair of motors 250 would not be included at the respective outer ends of the arms, but just a single motor would be mounted centrally, whereby rotation of an output drive thereof would be transmitted into corresponding rotations of respective drive shafts extending outwardly from the centre within each arm 1121, 1122. One convenient arrangement would be to have the motor mounted with its output drive at 90 degrees to the chassis assembly 111, to be connected to the respective drive shafts via a gearbox.

Whereas the shuttle 220 has been described as a hollow tubular member, it will be appreciated that it could comprise a substantially solid member, although that would mean the drive shaft and motor could not be housed within the hollow interior thereof. It will also be understood that although a generally cylindrical form is convenient for manufacture and for interengagement with the core member 200, the shuttle could have a non-round cross-sectional shape.

As mentioned above, whereas the leg-folding mechanism has been described in the context of a particular arrangement for a folding push chair, it could be applied to other folding leg mechanisms more generally. In such alternative arrangements, the range of motion may be different, and could be as much as about 360 degrees or as little as about 10 degrees.

FIG. 17, as explained above, shows a schematic view of a push chair. Components similar to those described above with reference to, say, FIGS. 1 to 16 will not be described again in detail. It is noted that the arrangement of a push chair shown in FIGS. 17 and 18 includes a V-shaped chassis. For the purpose of understanding the content of FIGS. 17 and 18, it will be understood that the aspects to be described apply equally to other shaped chassis, including, for example a linear chassis as shown in FIGS. 8a and 8b. V-shaped, as used herein, means that it includes arms that are not co-axial and does not strictly mean that it need be an actual letter "V". For example as long as the shape includes arms that are not coaxial shapes that would more readily be identified by a letter U or indeed any other such shape could be included.

The push chair includes a power and motor housing 300 arranged projecting from the central body portion 12. The power and motor housing 300 is typically cylindrical, elliptical or polygonal in cross section and projects in a selected direction from the central body portion 12. In the example shown, it projects vertically upwards (with respect of the floor upon which the push chair is positioned. In other examples, it can project in different directions relative to the general orientation of the central body portion 12 and/or the floor surface upon which the push chair is positioned.

Thus, in general there is shown a leg folding mechanism for a push chair, in which the leg folding mechanism comprises simply a central chassis extending generally perpendicular to a forward direction of travel of the push chair. The central chassis has controllable legs arranged to rotate around the chassis. An actuator for driving rotation of the legs is provided within the power and motor housing 300 and is able to move the legs from a folded to an unfolded position or vice versa.

As shown, in this example, the power and motor housing 300 is arranged coupled to the central chassis and extends vertically upwards from the chassis. The power and motor housing 300 could be arranged to extend in any desired direction relative to the chassis or the ground. For example, it could be arranged to be on an underside of the chassis, i.e. pointing downwards towards the ground in use.

The housing 300 is preferably arranged centrally with respect to the central chassis. This is convenient when collapsing the leg folding mechanism to a folded configuration.

The power and motor housing 300 is arranged to house a power source (not shown) and a motor which is arranged to interact with appropriate components within the central body portion 12 to enable control of the device.

FIG. 19 shows a cross section through the central body portion or chassis 12 of a push chair. The power and motor housing 300, shown schematically, includes a motor 302 and a power source 304. An outer housing or case is typically provided but is not shown in FIG. 19. The motor 302 is connected to an output shaft 304, itself coupled to a gear such as a bevel gear 306 arranged to interact with corresponding gears 308 provided on the drive shafts 310 of the arms 312 of the central body portion 12.

In other ways, the system shown in FIG. 19 and, FIGS. 17 and 18, operates in a similar manner to that described above with reference to, say FIGS. 10 and 11. However instead of the motor being arranged axially within the arms 312 of the central body portion 12, it is provided within the power and motor housing 300. The worm wheel 254 is driven in a corresponding manner and accordingly the operation of the device is substantially the same as that described above with reference to FIGS. 10 and 11.

An advantage of the arrangement of the power and motor housing 300 of FIGS. 17 to 19, is that a single motor can be conveniently provided to drive rotation of the worm wheel 254 in each of the arms of the central body portion. Providing a single motor arranged to drive both of the arms enables a reduced part count and simplification of control.

The power source 304 provided in the power and motor housing 300 is preferably a rechargeable power source and a recharging connector (not shown) is preferably provided to enable a user to plug the power and motor housing 300 into a power source, such as with a USB connector or other such power source, to recharge the battery and ensure that the leg folding mechanism as a whole remains charged.

FIG. 18B shows an example of a push chair including a power and motor housing 300 arranged projecting from the central body portion or chassis 12. In this example the power and motor housing 300 extends backwards, i.e. is directed towards the region where a pusher of the chair would in normal use be positioned.

FIG. 20 shows a further example of a motor control system for use with a push chair having a central body portion or chassis 12. In this example, four separate motors 314 are provided, each coupled by a connector 311 to a central control unit 318. The central control unit 318 typically includes a microprocessor arranged to coordinate and control the operation of the individual motors 314, each of which is preferably arranged to control the folding or unfolding of a single one of the legs.

In the example shown in FIG. 20, four motors are provided since this is for an arrangement in which four legs are provided. However, it will be understood that the arrangement can equally be provided with a push chair in which three legs are provided and accordingly only three motors will be needed.

A gearing arrangement 320 is provided on hubs to which each of the wheel legs is ultimately connected, and a drive gear 322 is coupled to the output shaft (not shown) of each of the motors 314. Thus, under control of the control unit 318, each of the motors is driven to control its associated leg via the geared interaction between the output gears 322 and the inner gears 320 on the hubs. The provision of independent control for each of the legs of the push chair provides a system in which the control is mechanically distinct and accordingly enables each of the legs to be independently controlled and have its height varied independently.

FIGS. 21a and 21b show an example of an arrangement for reducing the workload on the motors by, in effect, adding a counterweight to the legs.

FIG. 21a shows a schematic cross section through the central body or chassis 12 in which two legs 324 and 326 are shown schematically connected.

Under normal operation of the push chair, as described above, to either fold the legs or unfold the legs, the motor or motors is driven so as to interact with the gearing arrangement of the legs and therefore cause rotation of hubs and the legs connected to the hubs, to either fold or unfold the legs.

FIGS. 21a and 21b show an example of an elastomeric or spring biasing element 327, which may be referred to generally as a "rubber band" provided as part of the assembly. Shown schematically, it will be understood that when the legs are opened, i.e., moved downwards typically, the band 327 extends thereby storing potential energy in the form of elastic potential energy. When the legs are then closed (see FIG. 21b) the stored elastic potential energy in the rubber band 327 can be used in addition to the power of the motors or motor to assist closing of the push chair.

FIG. 22 shows a slightly more detailed schematic view of the arrangement. Components that would typically be included within the interior of the central body or chassis 12 (already described in detail above) are not shown, i.e., the motor and gearing, but rather simply the rubber band element 327 is shown arranged to be provided within a substantially annular recessed portion 328 within the wheel hub 330. It will be appreciated that the wheel hub 330 of one of the legs will, when the central body portion 12 is assembled, be adjacent to the wheel hub 332 of another of the legs.

Engagement pins 334 and 336 are provided respectively on the wheel hubs 330 and 332. The rubber band or elastomeric biasing element 327 is provided with openings 338 into which the pins 334 and 336 are arranged to fit. It can thus be understood that in the contracted position (as shown in FIG. 22) the elastomeric biasing element 327 is in a rest state and does not store any elastic potential energy. This corresponds to the cross sectional view shown in FIG. 21b.

When the legs are rotated in such a way that the pins 334 and 336 are caused to move circumferentially apart from each other, the elastomeric biasing element 327 is stretched, thereby storing elastic potential energy.

The effect of the provision of an elastomeric biasing element 327 is such that additional power is given to the assembly. This ensures that it is possible to use a smaller or less powerful motor to achieve the same closing power. Thus, energy consumption can be reduced without loss of functionality.

Figure 23A:
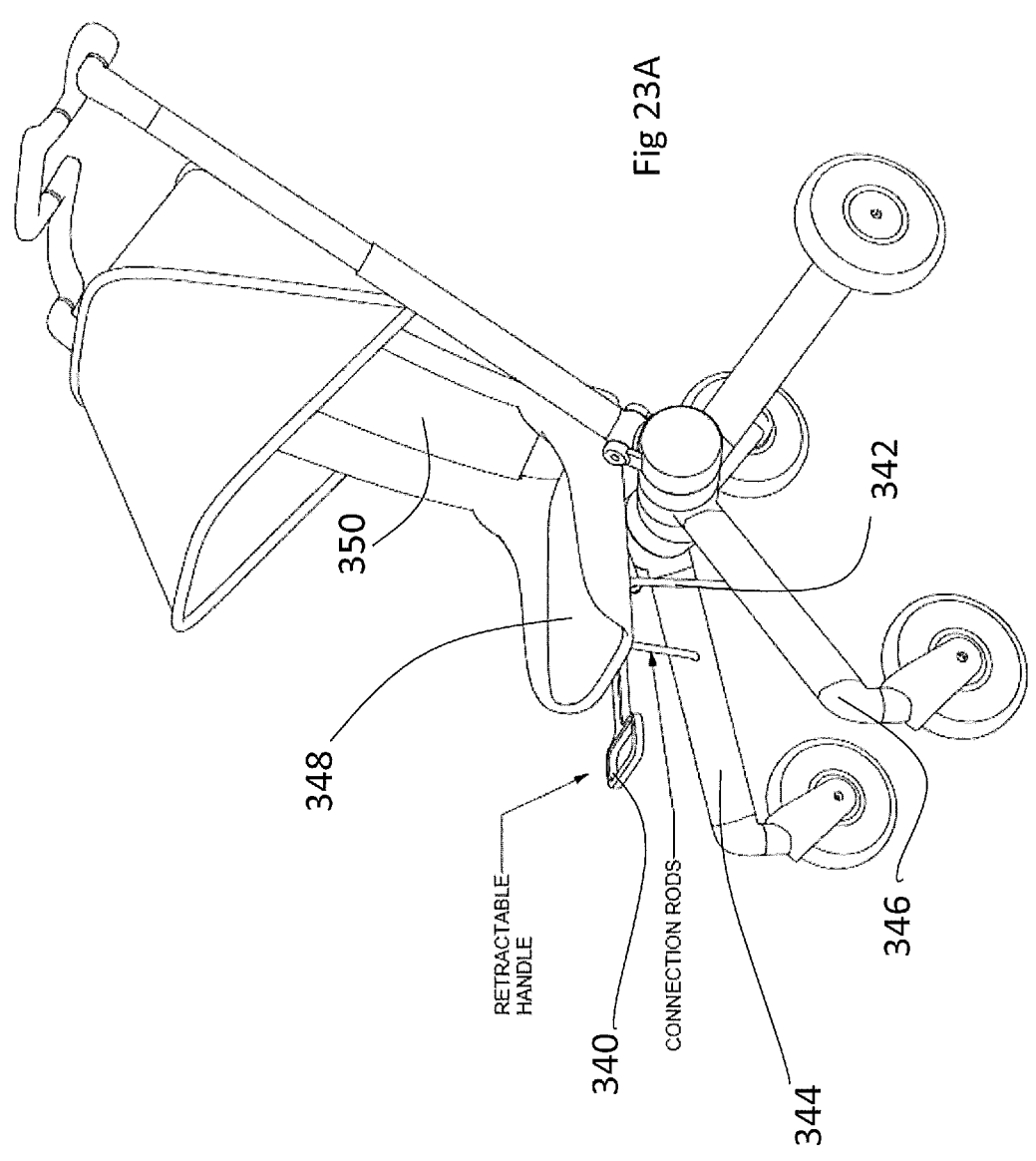

FIG. 23 shows a further example of a push chair. In this example the push chair is provided optionally, without a motor at all. Rather, a retractable handle 340 is provided which enables manual control and retraction of the push chair. The push chair in this example, comprises connecting rods 342 coupled to legs 344 and 346. A latch mechanism (not shown) is provided connected to the handle and is arranged in its open configuration to latch open the push chair such that it assumes the position shown in FIG. 23a.

According to an aspect of the invention, there is provided leg folding mechanism for a push chair and a push chair including such a leg folding mechanism, the leg folding mechanism comprise a central body and three or more legs extending therefrom or connected thereto, wherein at least two of the legs are arranged to rotate in different directions around the central body when moving from an open to a closed configuration or vice versa, the leg folding mechanism including a manually operable actuator to cause or enable the leg folding mechanism to be moved from an open to a closed configuration or vice versa.

Preferably the leg folding mechanism including the manually operable actuator includes an elastomeric biassing member, e.g. such as that described herein with reference to FIGS. 21 and 22, to aid closing or opening of the leg folding mechanism.

Preferably the leg folding mechanism includes a latch actuatable by a user to enable opening or closing of the leg folding mechanism.

Figure 23B:
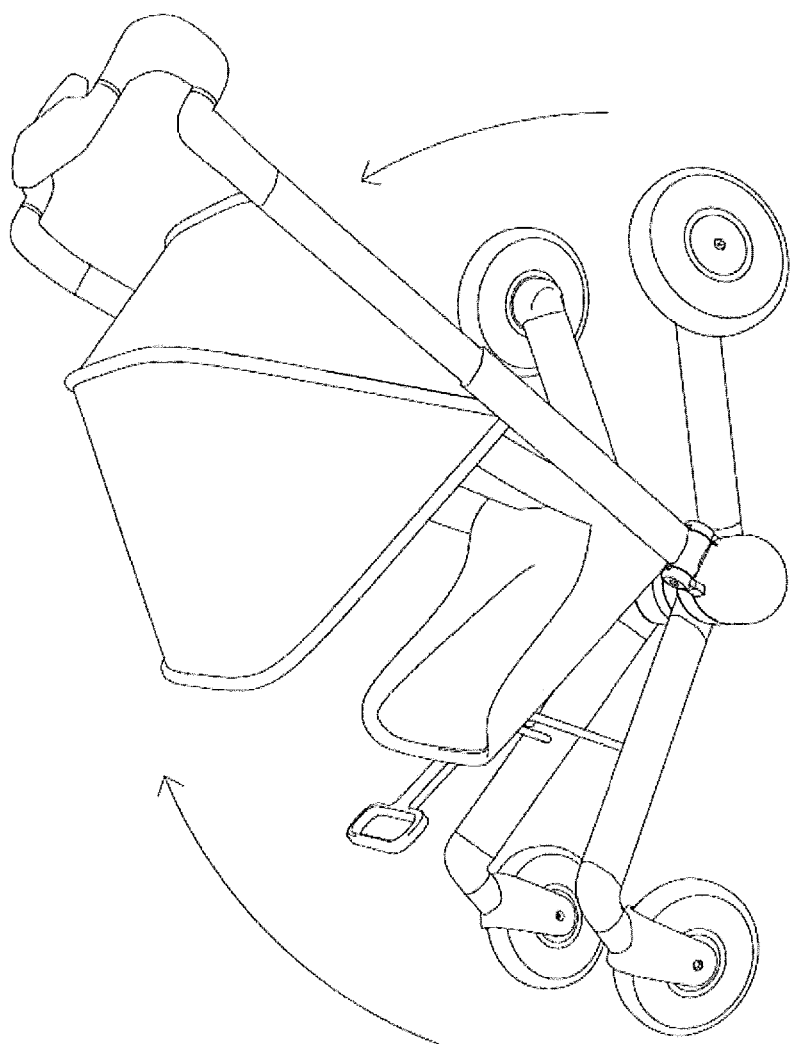

To close the push chair, the handle is pulled which disengages the latch and enables the push chair seat 348 to fold upwards towards the back 350 and via the connecting rods 342 to cause the legs to fold upwards as shown clearly in FIG. 23b. In this manual example, i.e. without inclusion of a motor it is preferred that the elastomeric element 327 described above with reference to FIGS. 21A and 21B is incorporated into the push chair. Whilst this might increase the force required to open the push chair, this opening process is typically gravity assisted in any event (the legs will be folding downwards) and so not difficult for a user. However, when it comes to closing the push chair, the stored elastic potential energy can make easier the process of closing the push chair.

Via the geared connection of the front and rear legs, the upwards movement of legs 344 and 346 to bring the chair to a closed position, will correspondingly cause the rear legs to move upwards as shown in FIG. 23b.

FIGS. 24a and 24b show schematic representations of alternative configurations for the assembly shown in FIGS. 10 to 16. As described above, in FIGS. 10 to 16, a shuttle is provided disposed within a core member and is axially translatable relatable to it. As the shuttle translates axially (axially meaning as explained above that it includes an axial component), typically under control of an actuator, a first projection from one or other of an internal surface of the first hub of the shuttle and an external surface of the shuttle passes through a slot to matingly engage with a helical surface on the other of the internal surface of the hub and external surface of the shuttle. Thus, via the axial translation of the shuttle, rotation of the first and second hub (to which legs will typically be attached) is achieved.

It will be understood that alternative configurations are possible. FIG. 24b shows a schematic view of such an arrangement. In this example, the shuttle need not be hollow, but could be a solid generally cylindrical (or otherwise appropriately shaped member) having provided on its outer surface a magnetic strip 352. Indeed, in this example, instead of having legs that are inserted and moved via a slot in the shuttle, legs are attached to or engage with the shuttle or indeed even the outer core by a magnetic connection. Thus, the engagement portion (in the example above of FIGS. 10 to 16, the tip portions 240) are provided as magnetic components to engage with a magnetic region on the shuttle. In this example, the core guides need not be slots since the magnetic interaction can be achieved through the core (without requiring an actual opening in the case of a peg in a slot).

A magnetic strip 352, typically S-shaped is provided which is arranged to guide the movement of the legs via a magnetic connection 354. The magnetic connection might typically be a piece of magnetic material or simply material that is capable of a magnetic interaction with the strip 352. Thus, it will be appreciated that either or both of the strip 352 and connector 354 on the leg, in this embodiment, will need to be magnetic.

In the example described above with reference to FIGS. 10 to 16, it is described that the axial translation of the shuttle causes rotation of the first and second hubs. In another example, instead of using axial translation of the shuttle, the legs are rotated directly under operation of a motor. This is similar to the example described above with reference to FIG. 20 in which plural individual motors are provided to control, respectively, each of the legs of the push chair.

FIGS. 25a and 25b show schematically an example in which instead of (or as well as) translational movement of the shuttle, a motor is arranged directly to cause rotation of the shuttle which is connected to the hub or directly to a wheel leg. FIGS. 26a and 26b show magnetic equivalents to the examples described above with reference to FIGS. 25a and 25b. In other words, again, motors are used to cause directly a rotation of the hub but instead of a connection that might for example be through a slot provided in the chassis, a magnetic connection on the leg is provided to interact magnetically with a corresponding magnetic coupler provided on the hubs or ends of the legs.

Finally, FIG. 27A shows a further example in which a solid shuttle member is provided is arranged to rotate and via interaction with a hook or other appropriate connector 356 provided on a leg 358 (with a connector 360 provided on the solid core) rotation of the leg can be achieved. The hook is an example of an engagement portion by which a hub or leg can engage with the shuttle in use. It will further be understood that in the situation in which a solid shuttle is used as shown in FIG. 27A, the movement of the shuttle within the core can be entirely rotational, i.e. not translational at all. In this situation if legs and/or hubs are to rotate in opposite directions around the central chassis or body a split shuttle will be provided and possible gearing between the different parts of the split shuttle to enable driving of more than one part of the split shuttle in opposite directions by the same motor.

In the examples described above with reference to, say, FIGS. 13a to 13c, the shuttle including the S-shaped slot is moved and via interaction with the peg 242 (see FIG. 13c) a rotation of the leg around the hub is achieved.

FIG. 29 is a schematic view of a shuttle for use in a leg folding mechanism. In the alternative embodiment of FIG. 29, instead of having the peg 242 coupled and driven by a slot provided in the shuttle, the shuttle is provided as a solid component 362 having a ridge 364 arranged to drive the rotational movement of the leg. It will be appreciated that a similar arrangement is provided in which the leg is rotationally coupled to a hub forming part of the chassis, but in this case, instead of the rotational movement of the leg being driven by the interaction of the end of the leg with the S-shaped slot in the shuttle, the rotational movement is driven by interaction of the leg with the ridge 364 provided on the cylindrical shuttle 362.

Indeed, a leg folding mechanism is provided in which any or all of the engagement portions comprise a cam and a cam follower. The cam which is effectively the ridge 364 engages with cam followers provided on the hubs or legs of connected directly. It will be understood that typically a corresponding ridge (not shown) will be provided on the rear side of the solid shuttle to control movement of another of the legs or hubs.

FIG. 30 shows a schematic view of a mechanism for locking the legs in either the open or closed position.

As described above, in the examples of, say, FIGS. 10 to 16, locking of the legs in the open or closed position is provided by the shape of the slot, which is typically S-shaped, and ensures that rotationally, when the leg is in alignment with one of the extended straight parts of the "S" it is effectively rotationally locked. In an alternative example, a gearing or cog mechanism 366 is provided. To enable unlocking, axial separation of a central locking part 368 is provided. When in the unlocked configuration (as seen in FIG. 30), the legs or hubs (labelled part 1 and part 3) of the front and rear legs, are able to rotate relative to the locking part 368. However, when they are then brought together such that there is no spacing axially between parts 1, 2 and 3 (as shown in FIG. 30) the angular position of the legs will effectively be locked.

The skilled person will understand that to achieve such a mechanism, it is possible to enable some axial movement of the hubs or components of the legs within the hubs.

Referring to parts 1, 2 and 3 shown in FIG. 30, these are arranged so that they are detachable through the movement of part 1 and part 3 sliding axially away from part 2. To lock the legs again, parts 1, 2 and 3 move axially together and preferably are arranged to click when engaging thereby indicating to a user that a lock state has been achieved. Teeth 367 provided on the parts enable relative rotational locking of the parts. Preferably the pattern of the teeth is such that locking will only occur at two specified relative angular positions between each pair of parts, thus enabling the legs easily to be locked in the open or closed configurations.

FIGS. 31a to 31d show an example of a variable-handle-bar or handle assembly for use with a push chair. The handle assembly can be used with a push chair or indeed other moveable items such as, e.g. a wheel chair, a shopping trolley, a golf trolley etc. In a preferred example the handle assembly is for use with a push chair comprising a subframe and a seat assembly. The handle assembly is preferably connected to the subframe or chassis of the push chair or can in an alternative configuration be connected to directly to the seat assembly. In general, the handle assembly includes first and second arms for connection to the subframe or seat assembly, and a handle crossbar assembly coupled to the first and second arms. The handle crossbar assembly has a first section which when presented to a user is a first height with respect to the seat assembly and a second section which when presented to a user is at a second different height with respect to the seat assembly. Preferably the handle crossbar assembly is stepped or turreted such that each step or turret present an engagement portion for a user's hand at a different height.

The handle assembly is shown in FIGS. 31a to 31d schematically connected to a V-shaped central body or chassis 370 but other components of the push chair are not shown.

In the examples shown, the handle assembly comprises a pair of side arms 374 and a handle crossbar assembly 376. The side arms 374 are pivotally coupled at pivoted connections 378 to the chassis 370 of the push chair. Each of the side arms 374 includes an extendable component which, in the example shown, is arranged telescopically extendable. Thus, as can be seen in the change from FIG. 31A to 31D, the side arms 374 include an upper region 380 and a lower region 382 that telescopically compress such that in FIG. 3D, the upper section 380 is substantially encased within the lower region 382.

As the arms have moved from the open position shown in FIG. 31A to FIG. 31D in which they are closed, the pivoted connection 378 has functioned to enable the arms to rotate vertically inwards.

Figures 31A, 31B, 31C, 31D:
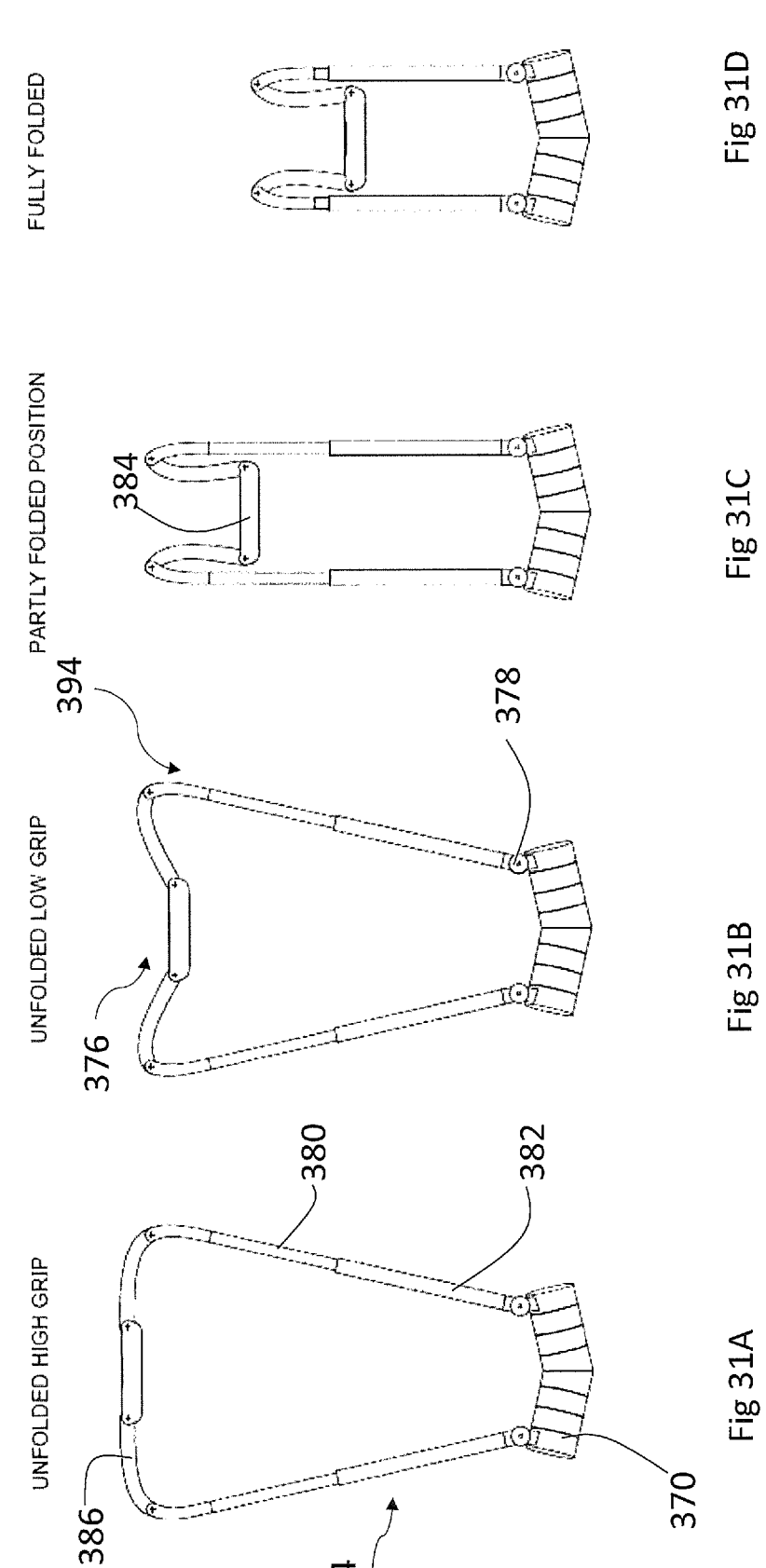

In the compacted fully folded configuration shown in FIG. 31D, the push chair is effectively small, confined and convenient to store.

An important aspect of the handle assembly is provided by the handle crossbar assembly 376. This itself is made up of plural components which are pivotally hinged together in this example. The plural components include a central member 384 and side components 386.

As can be seen, when the telescopic arms 374 are contracted, (see, for example the movement from the position shown in FIGS. 31A to 31B), to enable the smaller distance between the top sections of the arms 374 to be accommodated, there is some relative pivoting of a central component 384 and side components 386 of the handle cross bar assembly 376.

Thus, by providing thus multi section handle cross bar assembly 376, an handle assembly is provided that facilitates the easy folding and unfolding of the handle when the push chair is opened or closed itself.

An important aspect of the handle assembly shown in FIGS. 31A to 31D is the different heights that the handle provides when presented to a user.

The handle crossbar assembly has a step that in use defines a different height between its first and second sections. The step can be thought of as a turret since viewed in plan the shape of the handle crossbar assembly is substantially the shape of a castle turret. The central section of the turret is at a first height and side sections are at a second different height with respect to the seat assembly, or the ground on which the push chair is being used.

It is preferred that the handle crossbar assembly 376 is rotatably coupled to the first and second arms at distal ends 394 of the arms such that as a unit the handle crossbar assembly can be pivoted with respect to the first and second arms 374. The handle crossbar assembly is able to be pivoted from a first position relative to the first and second arms 374 and a second position relative to the first and second arms and to be lockable in each of the first and second positions.

In the example shown, the handle crossbar assembly has at least three sections, as explained above, in this example, a central component 384 and two side components 386.

The central component or step 384 is preferably itself pivotally connected to side components 386. In other examples it is possible that the handle crossbar assembly has only two sections.

In use, the central step is higher than the side steps 386, and in normal use closer (further forward) to the seat of the push chair. The side components 386 define lower steps such that when in use the central step provides an engagement region for one-handed control of the push chair by a user.

Pivoted connections 394 are provided in regions between the central step 384 and the side steps or components 386. It will be appreciated that the stepped shape of the handle crossbar assembly can be achieved in a number of ways and the specific detail of the articulation provided herein is merely one example. In this example each of the sections 384 and 386 may be substantially U-shaped, having an elongate central portion and shorter side regions, that connect with a side region of an adjacent component.

Figures 32A, 32B:
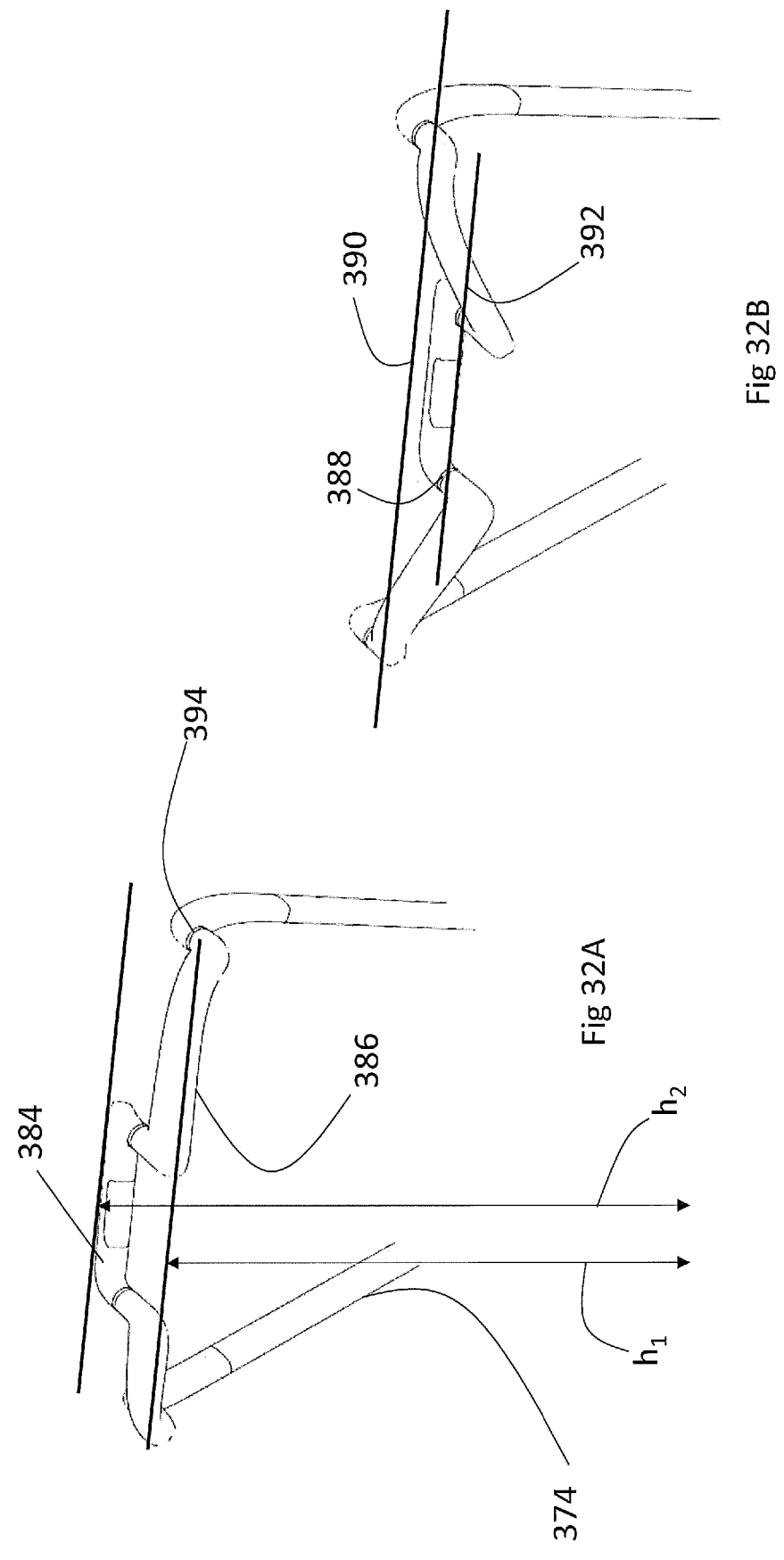

Looking at FIGS. 32A to 32B, an example of the handle in the fully open position is shown. In FIG. 32A, the central component 384 presents at a higher position relative to the ground upon which the push chair is pushed to the side components 386. Thus, by the arrangement of the handle in this multi component format, a number of different heights are provided which can be particularly useful to a pusher of the push chair. This is true irrespective of the height of the pusher themselves. It could be that at some point the same pusher would appreciate a higher handle for gripping and at other times a lower handle.

Connecting pivoted components 388 are provided which enable rotation of the components 384 and 386. In the example of FIG. 32B the pivots or pivoted components 388 have been activated such that the handle now assumes a different configuration from that of FIG. 32A. In this example, two different heights are now presented to a user (390 and 392). Thus, the handle provides a convenient and easy to use system by which the height of the handle relative to the chair can be easily controlled for convenience of the user.

In the examples of FIGS. 32A and 32B, it will be appreciated that the turreted or stepped nature of the handle further enables a user to interact with different parts of the handle which will maximise comfort and manoeuvrability. For example, a user could choose simply to hold the central component 384 which will provide for easy one-handed manoeuvrability or indeed any of the other sections which will similarly provide such functionality.

The handle is provided with locks (not shown) which enable the handle to be locked in any of the desired positions. Thus, the handle has a step in the centre which offers an easy one-hand push option with an integrated height variation.

Figures 32C, 32D, 32E:
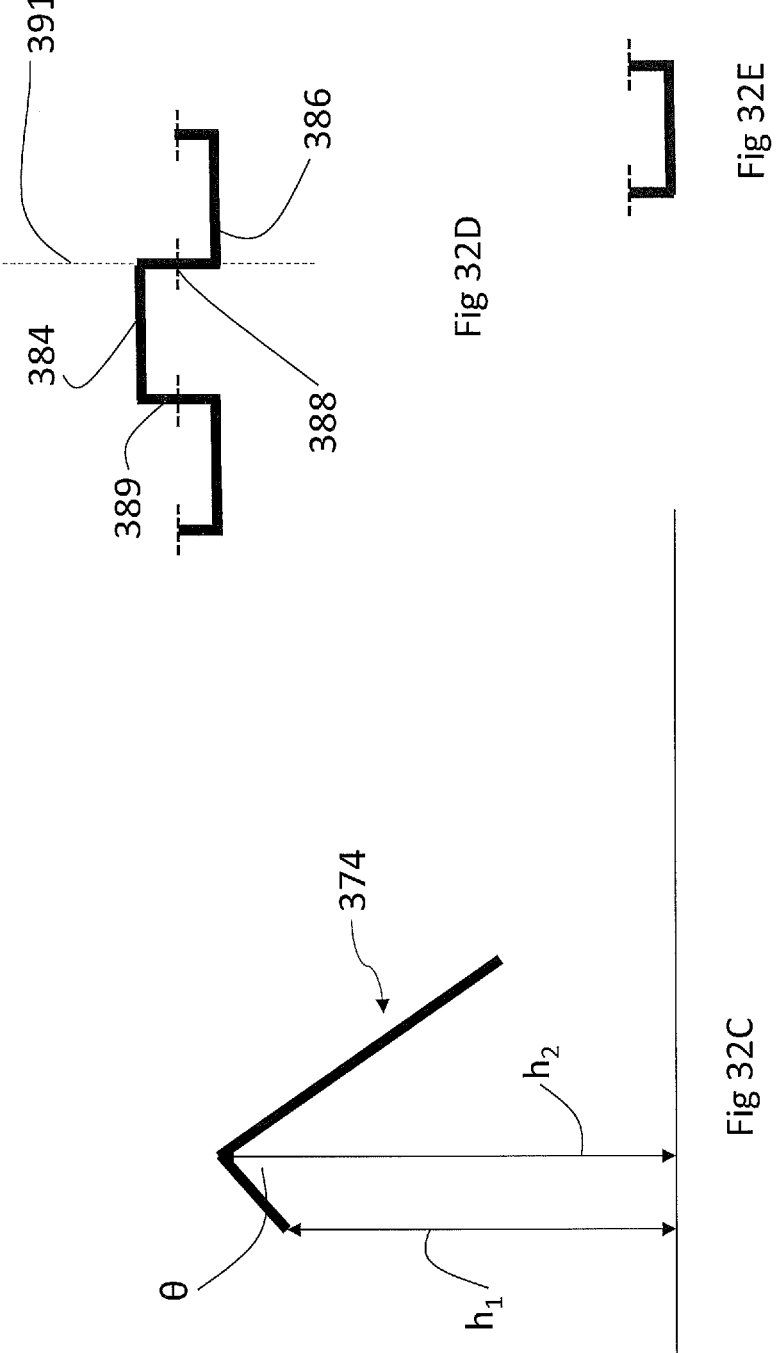

FIG. 32C shows a schematic side view of the handle assembly (without the push chair), and FIG. 32D shows a plan view of the handle crossbar assembly 376 separated from other components of the handle assembly. A can be seen in FIG. 32C the handle assembly provides a simple and effective mechanism by which different heights are presented to a user in normal use. A first height $h_1$ relative to the ground (shown schematically) is available for a user is the user chooses to engage with the side components 384, whereas a second higher height $h_2$ is available for a user if they choose to engage with the central component 384.

Looking at FIG. 32D, it can be seen that the overall handle assembly has an integrated or built in step. When the handle is viewed as a unitary component, the steps are formed of the cross bar sections (the sections that in use will be at the heights $h_1$ and $h_2$) with which a user will engage and also "vertical" sections 389 connecting the cross bar sections. The vertical sections 389 are, as explained above, provided with rotating joints 388 such that each vertical section is effectively made up of at least two connected subsections that can rotate about the longitudinal axis 391 of the vertical sections. It is this rotation that enables configuration as shown in FIG. 32B. In effect the handle cross bar 376 is made up in this example of 3 truncated U or trough shapes (see FIG. 32E). The relative sizes of the arms of the U or trough shapes are not limiting and as can be seen in say, FIG. 32B, need not be the same for each of the sections.

As can be seen in FIG. 32A the angle θ between the arm 374 and the handle cross bar assembly is typically determined by the shaped part of an end of the arm 374. Preferably this is generally 90 degrees although it will preferably be a curved section as can be seen such that the overall longitudinal axes of the components make an angle of 90 degrees even though the curve is gradual. Furthermore, in practice a different angle other than 90 degrees can be selected, which will have an effect on the height difference presented to a user between side components 384 and central component 386.

The handle bar assembly shown schematically and it will be appreciated that the contours of the handle can be changed for ergonomic or design purposes. In particular the contours or shaping of the surfaces of the handle are preferably contoured for ergonomic purposes.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A leg folding mechanism for a push chair, the leg folding mechanism comprising a core member having a longitudinal axis and first and second axially spaced core guides;
 a first rotatable hub for connection to a first leg member and rotatably mounted on the core member at the first core guide;
 a second rotatable hub for connection to a second leg member and rotatably mounted on the core member at the second core guide;
 a shuttle disposed within the core member and axially translatable relative thereto;
 wherein a first engagement portion from one or other of an internal surface of the first hub and an external surface of the shuttle engages with the first core guide to matingly engage with a corresponding first surface on the other of the internal surface of the first hub and the external surface of the shuttle, and a second engagement portion from one or other of an internal surface of the second hub and an external surface of the shuttle engages with the second core guide to matingly engage with a corresponding second surface on the other of the internal surface of the second hub and the external surface of the shuttle, such that in response to axial translation of the shuttle the first and second hubs are caused to rotate.

2. The leg folding mechanism according to claim 1, comprising an actuator configured to urge the shuttle to translate within the core member.

3. The leg folding mechanism according to claim 1, wherein the shuttle is arranged to move relative to the core having an axial component of movement.

4. The leg folding mechanism according to claim 3, in which the shuttle is disposed within the core member and is longitudinally axially translatable but rotationally fixed relative thereto.

5. The leg folding mechanism according to claim 3, wherein the shuttle includes at least one longitudinal rib on an exterior surface thereof and the core member includes at least one corresponding longitudinal groove in an internal surface thereof, or vice versa, to allow axial translation of the shuttle.

6. The leg folding mechanism according to claim 1, wherein the first and second surfaces are substantially helical surfaces on the shuttle and comprise respective first and second slots in the exterior surface thereof, and the corresponding matingly engaging internal surfaces of the hubs comprise respective first and second pegs and, wherein the first and second substantially helical slots are oriented oppositely, whereby axial translation of the shuttle causes the first hub to rotate in an opposite direction to the second hub.

7. The leg folding mechanism according to claim 6, wherein the first and second substantially helical slots include at least one straight end portion, parallel to the longitudinal axis.

8. The leg folding mechanism according to claim 6, wherein the first and second substantially helical slots each comprise an S-shaped curve between end portions thereof.

9. The leg folding mechanism according to claim 1, wherein the core member is substantially tubular and the first and second core guides are core slots and are circumferential slots, which are preferably rotationally offset from one another.

10. The leg folding mechanism according to claim 1, wherein the shuttle is substantially tubular.

11. The leg folding mechanism according to claim 2, wherein the actuator comprises a drive shaft at least partially housed within the shuttle and the core member and engaged with an internal portion of the shuttle, whereby rotation of the drive shaft is converted into axial translation of the shuttle within the core member and, wherein the drive shaft is the drive shaft of a motor fixedly connected to the core member.

12. The leg folding mechanism of claim 2, further comprising:
 a third axially spaced core guide on or extending through a surface of the core member in a plane perpendicular to the longitudinal axis;
 a third hub for connection to a third leg member and rotatably mounted on the core member at the third core guide; and
 a third projection from one or other of an internal surface of the third hub and an external surface of the shuttle, which engages with the third core guide slot to matingly engage with a corresponding third surface on the other of the internal surface of the third hub and the external surface of the shuttle, such that the axial translation of the shuttle as the actuator is operated is also converted into rotation of the third hub member.

13. The leg folding mechanism according to claim 1, in which any or all of the engagement portions comprise a cam and a cam follower.

14. The leg folding mechanism according to claim 13, in which a rib is provided on the shuttle and the cam follower is provided on the internal surface of each hub, the cam followers arranged to follow the rib on the shuttle as it translates.

15. A folding push chair comprising:
 a subframe;
 a handle assembly connected to the subframe for maneuvering the push chair; and
 a seat assembly connected to the subframe;
 wherein the subframe comprises a leg folding mechanism according to claim 1.

16. The folding push chair according to claim 15, wherein upon operation of an actuator in a first direction the leg folding mechanism is urged to rotate the legs from an open configuration to a folded configuration upwardly away from the ground towards the seat assembly and wherein operation of the actuator in a second direction, opposite to the first, the leg folding mechanism is urged to rotate the legs from the folded configuration to the open configuration downwardly away from the seat assembly towards the ground.

17. A folding push chair comprising:
 a subframe;

a handle assembly connected to the subframe for maneuvering the push chair; and a seat assembly connected to the subframe;

wherein the subframe comprises:

a first leg folding mechanism according to claim 1;

a first leg having a proximal end connected to the first hub and having a first wheel assembly mounted at a distal end;

a second leg having a proximal end connected to the second hub and having a second wheel assembly mounted at a distal end;

a second leg folding mechanism according to claim 1;

a third leg having a proximal end connected to the first hub of the second leg folding mechanism and having a third wheel assembly mounted at a distal end;

a fourth leg having a proximal end connected to the second hub of the second leg folding mechanism and having a fourth wheel assembly mounted at a distal end;

wherein the second and third legs extend forwardly away from the handle assembly (or vice versa) and the first and fourth legs extend rearwardly (or vice versa) beneath the chair assembly when in an open configuration for the respective wheel assemblies to engage the ground; wherein upon operation of an actuator in a first direction the leg folding mechanism urges rotation of the legs from the open configuration to a folded configuration upwardly away from the ground towards the seat assembly and optionally wherein operation of the actuator in a second direction, opposite to the first, urges the leg folding mechanism to rotate the legs from the folded configuration to the open configuration downwardly away from the seat assembly towards the ground.

18. The folding push chair according to claim 17, wherein the seat assembly is collapsible and wherein the first and fourth legs rotate in a first direction whilst the second and third legs rotate in an opposite direction, whereby when in the folded configuration the seat assembly is disposed in a collapsed condition between the first and fourth legs on a rearward side and the second and third legs on the forward side.

19. The folding push chair according to claim 15, wherein the first and second leg folding mechanisms are arranged symmetrically.

20. The folding push chair according to claim 3, wherein the axes of the first and second core members are co-axially arranged or wherein the first and second leg folding mechanisms are disposed in a V-shaped arrangement.

21. A leg folding mechanism, comprising:

a core member having a longitudinal axis and first and second axially spaced core guides;

a first leg rotatably mounted on the core member at the first core guide;

a second leg member rotatably mounted on the core member at the second core guide; and a shuttle within the core member and moveable within the core member to cause movement of the legs as the shuttle moves within the core member.

22. The leg folding mechanism according to claim 21, in which the first and second core guides are provided as slots in the core member.

23. The leg folding mechanism according to claim 22, wherein the first and second slots are helical and oriented oppositely, whereby axial translation of the shuttle causes a first hub for connection to the first leg member to rotate in an opposite direction to a second hub for connection to the second leg member.

24. The leg folding mechanism according to claim 21, further comprising a drive shaft of a motor fixedly connected to the core member.

25. The leg folding mechanism according to claim 21, wherein the shuttle includes an S-shaped rib on an exterior surface thereof.

26. The leg folding mechanism according to claim 21, further comprising an actuator configured to urge the shuttle to translate within the core member, wherein operation of the actuator in a second direction, opposite to a first, urges the leg folding mechanism to rotate the legs from a folded configuration to an open configuration.

* * * * *